United States Patent
Ang et al.

(10) Patent No.: US 10,098,093 B2
(45) Date of Patent: Oct. 9, 2018

(54) PARTITIONED CONTROL CHANNEL TECHNIQUES FOR TIME DIVISION DUPLEXING SUBFRAME PROCESSING

(71) Applicant: QUALCOMM Incorporated, San Diego, CA (US)

(72) Inventors: Peter Pui Lok Ang, San Diego, CA (US); Wei Zeng, San Diego, CA (US); Krishna Kiran Mukkavilli, San Diego, CA (US); Tao Luo, San Diego, CA (US); Tingfang Ji, San Diego, CA (US); Yang Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 15/268,207

(22) Filed: Sep. 16, 2016

(65) Prior Publication Data

US 2017/0171850 A1 Jun. 15, 2017

Related U.S. Application Data

(60) Provisional application No. 62/267,842, filed on Dec. 15, 2015, provisional application No. 62/268,014, filed on Dec. 16, 2015.

(51) Int. Cl.
*H04W 72/04* (2009.01)
*H04L 5/00* (2006.01)
*H04L 5/14* (2006.01)

(52) U.S. Cl.
CPC ....... *H04W 72/0406* (2013.01); *H04L 5/0055* (2013.01); *H04L 5/1469* (2013.01); *H04W 72/0413* (2013.01); *H04W 72/0446* (2013.01)

(58) Field of Classification Search
CPC ......... H04W 72/0406; H04W 72/0446; H04W 72/0413; H04L 5/0055; H04L 5/1469
See application file for complete search history.

(56) References Cited

U.S. PATENT DOCUMENTS

2010/0031117 A1* 2/2010 Lee ................ H04L 1/0025
714/752
2011/0274059 A1* 11/2011 Brown ............. H04L 27/0008
370/329

(Continued)

OTHER PUBLICATIONS

Ericsson, "5G—Key Component of the Networked Society," 3GPP RAN Workshop on 5G, RWS-150009, Phoenix, AZ, USA, Sep. 17-18, 2015, 55 pgs., XP051043759, 3rd Generation Partnership Project, Sophia-Antipolis Cedex, France.

(Continued)

*Primary Examiner* — Walli Z Butt
(74) *Attorney, Agent, or Firm* — Holland & Hart LLP

(57) ABSTRACT

Control information may be identified and provided to a user equipment (UE) that is formatted into a codeword that is transmitted in a first symbol of a downlink transmission to the UE. The control information may include an allocation of downlink or uplink resources for the UE and data processing parameters. The control information may be partitioned into first control information transmitted in a first codeword and second control information that may be formatted into a second codeword. The second control information may be determined based at least in part on the data acknowledgment from the UE. Such partitioned control information may allow a base station to perform some processing related to transmissions for a transmission time interval (TTI) prior to the start of the TTI, and allow the base station to perform some processing for the TTI after the start of the TTI.

91 Claims, 30 Drawing Sheets

(56) References Cited

U.S. PATENT DOCUMENTS

| | | | | |
|---|---|---|---|---|
| 2011/0310853 | A1* | 12/2011 | Yin | H04L 1/0009 370/335 |
| 2012/0026935 | A1* | 2/2012 | Park | H04L 1/1854 370/315 |
| 2013/0003672 | A1* | 1/2013 | Dinan | H04L 1/00 370/329 |
| 2013/0300591 | A1* | 11/2013 | Marpe | H03M 7/40 341/67 |
| 2015/0023235 | A1* | 1/2015 | Lightstone | H04W 52/0206 370/311 |
| 2016/0037524 | A1* | 2/2016 | Krzymien | H04L 1/1812 370/329 |
| 2018/0014315 | A1* | 1/2018 | Seo | H04W 72/12 |

OTHER PUBLICATIONS

ETSI/3GPP, "LTE; Evolved Universal Terrestrial Radio Access (E-UTRA); Multiplexing and Channel Coding, (3GPP TS 36.212 version 12.6.0 Release 12)," Technical Specification, Oct. 19, 2015, 96 pgs, ETSI TS 136 212 V12.6.0, XP055342056, European Telecomunnications Standards Institute (ETSI), 650 Route Des Lucioles, F-06921, Sophia-Antipolis Cedex, France.

ETSI/3GPP, "LTE; Evolved Universal Terrestrial Radio Access (E-UTRA); and Evolved Universal Terrestrial Radio Access Network (E-UTRAN); Overall Description; Stage 2, (3GPP TS 36.300 version 12.7.0 Release 12)," Technical Specification, Oct. 19, 2015, 264 pgs, ETSI TS 136 300 V12.7.0, XP055341893, European Telecomunnications Standards Institute (ETSI), 650 Route Des Lucioles, F-06921, Sophia-Antipolis Cedex, France.

Huawei et al., "Views on LTE Rel-14," 3GPP TSG RAN Meeting #69, RP-151356, Phoenix, USA, Sep. 14-16, 2015, 24 pgs., XP051043490, 3rd Generation Partnership Project, Sophia-Antipolis Cedex, France.

ISA/EP, International Search Report and Written Opinion of the International Searching Authority, Int'l Application No. PCT/US2016/065920, dated Feb. 27, 2017, European Patent Office, Rijswijk, NL, 16 pgs.

* cited by examiner

PARTITIONED CONTROL CHANNEL TECHNIQUES FOR TIME DIVISION DUPLEXING SUBFRAME PROCESSING

CROSS REFERENCES

The present application for patent claims priority to U.S. Provisional Patent Application No. 62/267,842 by Ang et al., entitled "Partitioned Control Channel Techniques For Time Division Duplexing Subframe Processing," filed Dec. 15, 2015 and U.S. Provisional Patent Application No. 62/268, 014 by Ang et al., entitled "Partitioned Control Channel Techniques For Time Division Duplexing Subframe Processing," filed Dec. 16, 2015, assigned to the assignee hereof, and hereby expressly incorporated by reference herein in their entirety.

INTRODUCTION

The present disclosure, for example, relates to wireless communication systems, and more particularly to control techniques for time division duplexing (TDD) subframe processing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

In some deployments, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In some deployments (e.g., in a next generation or 5G network), a wireless multiple access communication system may include a number of smart radio heads (radio heads) in communication with a number of access node controllers (ANCs), where a set of one or more radio heads, in communication with an ANC, defines an eNB. A base station or radio head may communicate with a set of UEs on downlink channels (e.g., for transmissions from a base station or radio head to a UE) and uplink channels (e.g., for transmissions from a UE to a base station or radio head).

In some cases, communications may be time division duplex (TDD) communications, in which a base station may transmit downlink information to a UE in downlink resources and a UE may transmit uplink information to a base station in uplink resources that are time division duplexed with the downlink resources. Control channel transmissions for uplink and downlink transmissions may include control information related to data in the transmissions, that in some cases may not be known prior to an acknowledgment of one or more prior transmissions. Thus efficient techniques for processing and conveying such control information may enhance operation of wireless communication systems.

SUMMARY

Various techniques provided herein describe transmission of control information within one or more symbols of downlink transmissions to a user equipment, and processing of such control information. In some examples, a base station may identify control information to be provided to a UE, and may format the control information into a codeword that is transmitted in a first symbol of a downlink transmission. The control information may include, for example, an allocation of downlink or uplink resources for the UE. The control information may be determined, in some examples, prior to receipt and processing of a data acknowledgment from the UE for a prior transmission. In some examples, the control information may be partitioned into first control information transmitted in the first codeword and second control information that may be formatted into a second codeword. The second control information may be based at least in part on the data acknowledgment from the UE, for example, and the second codeword may be transmitted in a second symbol transmitted to the UE. Such partitioned control information may allow a base station to perform some processing related to transmissions for a transmission time interval (TTI) prior to the start of the TTI (e.g., a resource allocation for the UE), and allow the base station to perform some processing for the TTI (e.g., determining if a retransmission is to be made to the UE) after the start of the TTI.

A UE may receive the codeword transmitted in the first symbol, process the control information, and use the control information for receiving or transmitting subsequent symbols. In examples where partitioned control information is transmitted by a base station, the UE may process first control information during a second symbol, and may process the second control information during a third symbol. The first control information may include, for example, information related to resources allocated to the UE for subsequent transmissions. The second control information may include, for example, information related processing parameters for subsequent transmissions (e.g., a modulation and coding scheme (MCS), redundancy version (RV), or a new data indicator (NDI)) for subsequent transmissions. In some examples, the control information may be for subsequent transmissions within a same subframe as the first symbol, such as subsequent transmissions in a downlink-centric or uplink-centric subframe.

A method of wireless communication is described. The method may include identifying control channel information for a first subframe to be transmitted to a UE, formatting at least a portion of the control channel information into a first codeword to be transmitted to the UE during a first symbol of the first subframe and transmitting the first symbol of the first subframe to the UE.

An apparatus for wireless communication is described. The apparatus may include means for identifying control channel information for a first subframe to be transmitted to a UE, means for formatting at least a portion of the control channel information into a first codeword to be transmitted to the UE during a first symbol of the first subframe and means for transmitting the first symbol of the first subframe to the UE.

A further apparatus is described. The apparatus may include a processor, memory in electronic communication with the processor, and instructions stored in the memory. The instructions may be operable to cause the processor to identify control channel information for a first subframe to be transmitted to a UE, format at least a portion of the control channel information into a first codeword to be transmitted to the UE during a first symbol of the first subframe and transmit the first symbol of the first subframe to the UE.

A non-transitory computer readable medium for wireless communication is described. The non-transitory computer-readable medium may include instructions to cause a processor to identify control channel information for a first subframe to be transmitted to a UE, format at least a portion of the control channel information into a first codeword to be transmitted to the UE during a first symbol of the first subframe and transmit the first symbol of the first subframe to the UE.

In some examples of the method, apparatus, or non-transitory computer-readable medium described above, the identifying control channel information comprises identifying a resource allocation for the UE for the first subframe and identifying one or more processing parameters for data to be transmitted in the first subframe. In some examples of the method, apparatus, or non-transitory computer-readable medium described above, the processing parameters comprise one or more of a modulation and coding scheme (MCS), a new data indicator (NDI), or redundancy version (RV), and where the formatting comprises formatting an indication of the resource allocation into the first codeword and formatting one or more of the MCS, NDI, or RV into a second codeword of control information to be transmitted to the UE during a second symbol of the first subframe.

Some examples of the method, apparatus, or non-transitory computer-readable medium described above may further include processes, features, means, or instructions for transmitting the second codeword to the UE during the second symbol. Some examples of the method, apparatus, or non-transitory computer-readable medium described above may further include processes, features, means, or instructions for transmitting one or more data resource blocks (RB) to the UE during at least a third symbol of the first subframe based on the resource allocation of the UE.

Some examples of the method, apparatus, or non-transitory computer-readable medium described above may further include processes, features, means, or instructions for receiving, prior to the first symbol, an acknowledgement (ACK) or negative acknowledgment (NACK) from the UE indicating successful or unsuccessful receipt of data transmitted in a previous subframe. Some examples of the method, apparatus, or non-transitory computer-readable medium described above may further include processes, features, means, or instructions for determining whether the data transmitted in the previous subframe is to be retransmitted in the first subframe based on the ACK or negative acknowledgement (NACK) from the UE, and wherein the one or more processing parameters are identified based on whether the data transmitted in the previous subframe is to be retransmitted in the first subframe.

In some examples of the method, apparatus, or non-transitory computer-readable medium described above, the determining whether the data transmitted in the previous subframe is to be retransmitted in the first subframe is performed at least partially during the first symbol of the first subframe.

In some examples of the method, apparatus, or non-transitory computer-readable medium described above, the identifying the resource allocation of the first subframe to be allocated to the UE is performed in a prior subframe to the first subframe. In some examples of the method, apparatus, or non-transitory computer-readable medium described above, the resource allocation is based on new data being present for transmission to the UE or an assumed retransmission of data transmitted during the prior subframe.

Some examples of the method, apparatus, or non-transitory computer-readable medium described above may further include processes, features, means, or instructions for identifying that no new data is present for transmission to the UE and that the data transmitted during the prior subframe is not to be retransmitted. Some examples of the method, apparatus, or non-transitory computer-readable medium described above may further include processes, features, means, or instructions for formatting an indication that no data is to be transmitted into the second codeword of control information to be transmitted to the UE.

Some examples of the method, apparatus, or non-transitory computer-readable medium described above may further include processes, features, means, or instructions for identifying that new data is present for transmission to the UE. Some examples of the method, apparatus, or non-transitory computer-readable medium described above may further include processes, features, means, or instructions for preprocessing at least a portion of the new data for transmission to the UE during the first subframe during the prior subframe.

In some examples of the method, apparatus, or non-transitory computer-readable medium described above, the preprocessing comprises generating a first waveform for transmission of at least the portion of the new data. In some examples of the method, apparatus, or non-transitory computer-readable medium described above, the preprocessing further comprises generating a second waveform for retransmission of the data transmitted during the prior subframe.

In some examples of the method, apparatus, or non-transitory computer-readable medium described above, the preprocessing comprises preprocessing the new data up to a rate-matching stage, a tone mapping stage, a modulation stage, a precoding stage, or an inverse fast Fourier transform (IFFT) stage. In some examples of the method, apparatus, or non-transitory computer-readable medium described above, the control channel information includes time-critical control information formatted into the first codeword and less time-critical control information that is formatted into a second codeword to be transmitted in a second symbol of the first subframe.

In some examples of the method, apparatus, or non-transitory computer-readable medium described above, the first codeword comprises physical downlink control channel (PDCCH) information, and the second codeword comprises physical (PHY) downlink (DL) [RI] channel (PDRICH) information.

Some examples of the method, apparatus, or non-transitory computer-readable medium described above may further include processes, features, means, or instructions for identifying a second UE that is to receive second control information formatted into a second codeword that spans one or more symbols of a second subframe. Some examples of the method, apparatus, or non-transitory computer-readable medium described above may further include processes, features, means, or instructions for multiplexing transmissions between the UE and the second UE.

Some examples of the method, apparatus, or non-transitory computer-readable medium described above may further include processes, features, means, or instructions for signaling the UE and the second UE indicating whether control information is to be transmitted in the first codeword within the first symbol or in the second codeword that spans the one or more symbols.

A method of wireless communication is described. The method may include receiving, at a UE, a first symbol of a subframe, the first symbol comprising a first codeword of control information associated with the subframe, identifying resources of the subframe allocated to the UE based at least in part on the first codeword of the control information and decoding one or more RBs of the subframe based at least in part on the resources of the subframe allocated to the UE.

An apparatus for wireless communication is described. The apparatus may include means for receiving, at a UE, a first symbol of a subframe, the first symbol comprising a first codeword of control information associated with the subframe, means for identifying resources of the subframe allocated to the UE based at least in part on the first codeword of the control information and means for decoding one or more RBs of the subframe based at least in part on the resources of the subframe allocated to the UE.

A further apparatus is described. The apparatus may include a processor, memory in electronic communication with the processor, and instructions stored in the memory. The instructions may be operable to cause the processor to receive a first symbol of a subframe, the first symbol comprising a first codeword of control information associated with the subframe, identify resources of the subframe allocated to the UE based at least in part on the first codeword of the control information and decode one or more RBs of the subframe based at least in part on the resources of the subframe allocated to the UE.

A non-transitory computer readable medium for wireless communication is described. The non-transitory computer-readable medium may include instructions to cause a processor to receive a first symbol of a subframe, the first symbol comprising a first codeword of control information associated with the subframe, identify resources of the subframe allocated to the UE based on the first codeword of the control information and decode one or more RBs of the subframe based on the resources of the subframe allocated to the UE.

Some examples of the method, apparatus, or non-transitory computer-readable medium described above may further include processes, features, means, or instructions for receiving, at the UE, a second symbol of the subframe, the second symbol comprising a second codeword of the control information associated with the subframe. Some examples of the method, apparatus, or non-transitory computer-readable medium described above may further include processes, features, means, or instructions for identifying one or more of a MCS, a new data indicator (NDI), or redundancy version (RV) for data transmitted in the subframe based on the second codeword of the control information.

Some examples of the method, apparatus, or non-transitory computer-readable medium described above may further include processes, features, means, or instructions for decoding one or more RBs of at least a third symbol of the subframe based on the resource allocation, MCS, NDI, or RV. Some examples of the method, apparatus, or non-transitory computer-readable medium described above may further include processes, features, means, or instructions for determining that data of the one or more RBs is successfully received. Some examples of the method, apparatus, or non-transitory computer-readable medium described above may further include processes, features, means, or instructions for generating an ACK of reception of the data based on the determining.

Some examples of the method, apparatus, or non-transitory computer-readable medium described above may further include processes, features, means, or instructions for transmitting the ACK in an uplink (UL) portion of the subframe.

In some examples of the method, apparatus, or non-transitory computer-readable medium described above, identifying the resources of the subframe allocated to the UE comprises: processing the first codeword during the receiving of a second symbol. Some examples of the method, apparatus, or non-transitory computer-readable medium described above may further include processes, features, means, or instructions for decoding a demodulation reference signal (DMRS) received in one or more of the first symbol or the second symbol based on the processing the first codeword.

Some examples of the method, apparatus, or non-transitory computer-readable medium described above may further include processes, features, means, or instructions for processing the DMRS during reception of a third symbol of the subframe. Some examples of the method, apparatus, or non-transitory computer-readable medium described above may further include processes, features, means, or instructions for processing one or more data RBs (RBs) received in the third symbol during reception of a fourth symbol of the subframe.

In some examples of the method, apparatus, or non-transitory computer-readable medium described above, the first codeword includes time-critical control information and a second codeword received in a second symbol of the subframe includes less time-critical control information than the first codeword. In some examples of the method, apparatus, or non-transitory computer-readable medium described above, the first codeword comprises PDCCH information, and the second codeword comprises PHY DL [RI] channel (PDRICH) information.

A method of wireless communication is described. The method may include receiving, at a UE, a first DL symbol of an uplink-centric subframe, the first DL symbol comprising a first codeword of control information associated with the uplink-centric subframe, identifying UL resources of the uplink-centric subframe allocated to the UE based at least in part on the first codeword of the control information and transmitting one or more UL symbols in the resources of the uplink-centric subframe allocated to the UE.

An apparatus for wireless communication is described. The apparatus may include means for receiving, at a UE, a first DL symbol of an uplink-centric subframe, the first DL symbol comprising a first codeword of control information associated with the uplink-centric subframe, means for identifying UL resources of the uplink-centric subframe allocated to the UE based at least in part on the first codeword of the control information and means for transmitting one or more UL symbols in the resources of the uplink-centric subframe allocated to the UE.

A further apparatus is described. The apparatus may include a processor, memory in electronic communication with the processor, and instructions stored in the memory. The instructions may be operable to cause the processor to receive a first DL symbol of an uplink-centric subframe, the first DL symbol comprising a first codeword of control information associated with the uplink-centric subframe, identify UL resources of the uplink-centric subframe allocated to the UE based at least in part on the first codeword of the control information and transmit one or more UL symbols in the resources of the uplink-centric subframe allocated to the UE.

A non-transitory computer readable medium for wireless communication is described. The non-transitory computer-readable medium may include instructions to cause a processor to receive a first DL symbol of an uplink-centric subframe, the first DL symbol comprising a first codeword of control information associated with the uplink-centric subframe, identify UL resources of the uplink-centric subframe allocated to the UE based on the first codeword of the control information and transmit one or more UL symbols in the resources of the uplink-centric subframe allocated to the UE.

Some examples of the method, apparatus, or non-transitory computer-readable medium described above may further include processes, features, means, or instructions for receiving, at the UE, a second DL symbol of the uplink-centric subframe, the second DL symbol comprising a second codeword of the control information associated with the uplink-centric subframe. Some examples of the method, apparatus, or non-transitory computer-readable medium described above may further include processes, features, means, or instructions for identifying one or more of a MCS, a new data indicator (NDI), or redundancy version (RV) for data transmitted in the one or more UL symbols of the uplink-centric subframe based on the second codeword of the control information.

In some examples of the method, apparatus, or non-transitory computer-readable medium described above, the one or more UL symbols are transmitted after an UL burst symbol that follows the DL symbol of the uplink-centric subframe.

Some examples of the method, apparatus, or non-transitory computer-readable medium described above may further include processes, features, means, or instructions for identifying the UL resources of the uplink-centric subframe allocated to the UE comprises processing the first codeword during a second symbol of the uplink-centric subframe, and wherein a first uplink-symbol of the uplink-centric subframe follows the second symbol.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
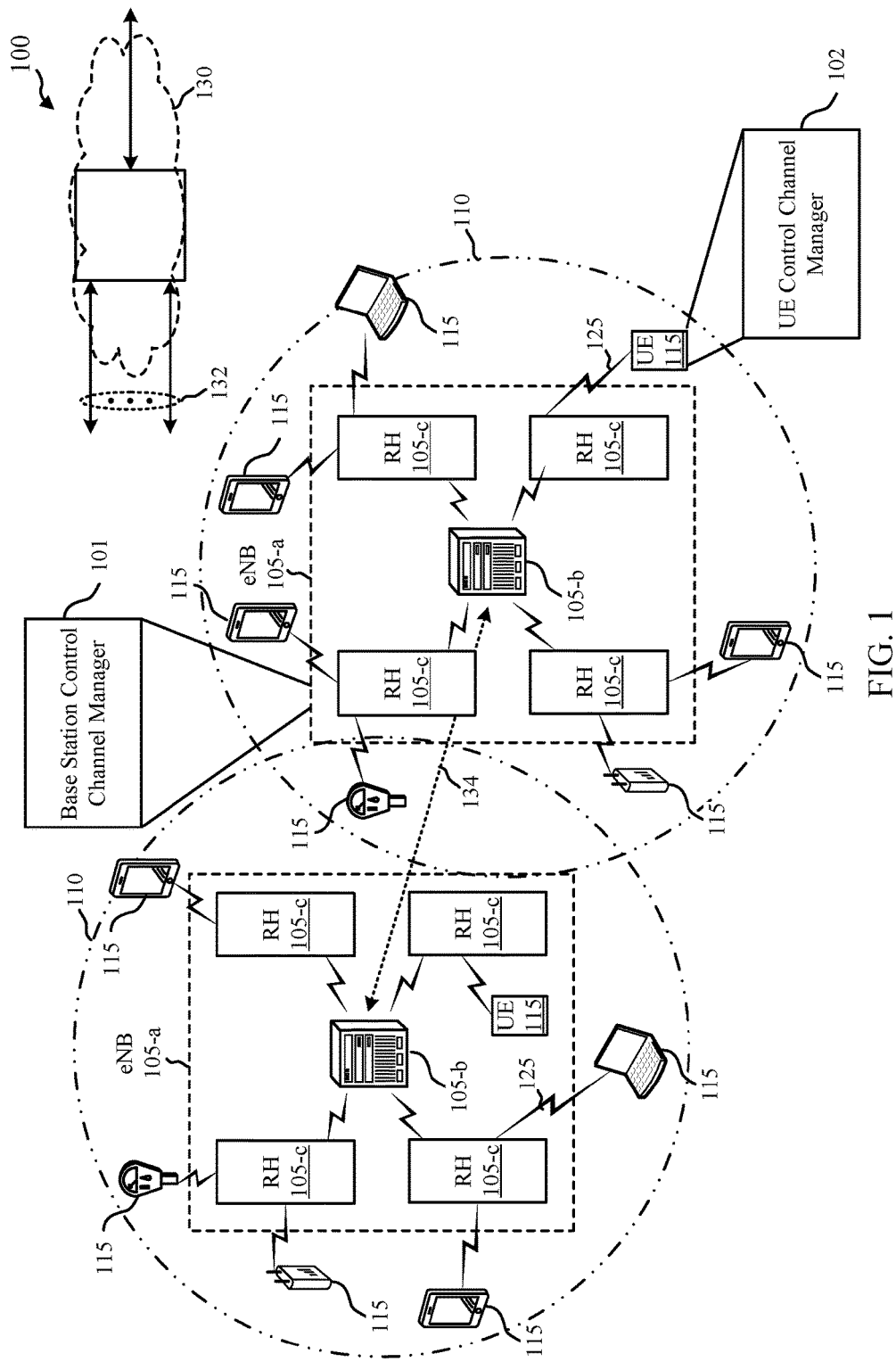
FIG. 1 illustrates an example of a wireless communications system that supports control channel techniques for TDD subframe processing in accordance with aspects of the present disclosure.

Various techniques described herein provide for transmission of control information within one or more symbols of downlink transmissions to a user equipment, and processing of such control information. In some examples, a base station and a user equipment (UE) may communicate according to time division duplexing (TDD) techniques. In some examples, downlink (DL)-centric subframes may include a number of DL symbols transmitted to a UE by a base station, and one or more uplink (UL) symbols transmitted to the base station by the UE. The UL symbol(s) of a DL-centric subframe may include, for example, an acknowledgment (ACK) or negative acknowledgment (NACK) of reception of downlink data in the DL-centric subframe. In some example, UL-centric subframes may include one or more DL symbols transmitted to a UE by a base station, and a number of UL symbols transmitted to the base station by the UE. The DL symbol(s) of a UL-centric subframe may include, for example, control information (e.g., resource allocation or processing parameters for uplink data) for transmission of the UL symbols of the UL-centric subframe.

In some examples, control information included in DL symbols may be formatted into a single codeword that does not span multiple symbols of a subframe. In some examples, control information may be partitioned into multiple symbols of the subframe. For example, control information may be partitioned into first control information transmitted in the first codeword and second control information that may be formatted into a second codeword. The first control information may include, for example, a resource allocation associated with subsequent symbols of the subframe, and a base station may determine the resource allocation prior to a transmission time interval (TTI) of the subframe, namely TTI(n). The second control information may be based at least in part on the data acknowledgment from the UE (e.g., a data acknowledgment for data transmitted to the UE in TTI(n−1)), for example, and the second codeword may be transmitted in a second symbol transmitted to the UE. Such partitioned control information may allow a base station to perform some processing related to transmissions for a TTI(n) prior to the start of TTI(n), and allow the base station to perform some processing for the TTI(n) (e.g., determining if a retransmission is to be made to the UE after the start of TTI(n). Such partitioned control information may allow for more efficient processing by the base station and UE for transmissions having relatively low latency requirements, by allowing a portion of the processing (e.g., processing related to data retransmissions following a NACK) to be performed concurrently with initial transmissions of a subframe.

A UE may receive the codeword transmitted in the first symbol, process the control information, and use the control information for receiving or transmitting subsequent symbols. In examples where partitioned control information is transmitted by a base station, the UE may process the first control information during a second symbol, and may process the second control information during a third symbol. The first control information may include, for example, information related to resources allocated to the UE for subsequent transmissions. The second control information may include, for example, information related processing parameters for subsequent transmissions (e.g., a modulation and coding scheme (MCS), redundancy version (RV), or a new data indicator (NDI)) for subsequent transmissions. In some examples, the control information may be for subsequent transmissions within a same subframe as the first symbol, such as subsequent transmissions in a downlink-centric or uplink-centric subframe.

Aspects of the disclosure are initially described in the context of a wireless communication system. Further examples are provided for single codeword and partitioned control information transmitted within DL resources to UEs. Aspects of the disclosure are further illustrated by and described with reference to apparatus diagrams, system diagrams, and flowcharts that relate to control channel techniques for TDD subframe processing.

FIG. 1 illustrates an example of a wireless communication system 100, in accordance with various aspects of the disclosure. The wireless communication system 100 may include network access devices (or base stations) 105, UEs 115, and a core network 130. UEs 115 and base stations 105 may, in some examples, communicate using TDD techniques in which at least a portion of control information may be communicated in a codeword that is transmitted in a single symbol. In some examples, base stations 105 may transmit partitioned control information in which a different portions of control information are transmitted in different downlink symbols to UEs 115.

The core network 130 may provide user authentication, access authorization, tracking, Internet Protocol (IP) connectivity, and other access, routing, or mobility functions. At least some of the network access devices 105 (e.g., network access device 105-a, which may be an example of an eNB or a base station, or network access device 105-b, which may be an example of an access node controller (ANC)) may interface with the core network 130 through backhaul links 132 (e.g., S1, S2, etc.) and may perform radio configuration and scheduling for communication with the UEs 115. The term base station, as used herein refers generally to a node at which scheduling for one or more UEs 115 may be performed. In various examples, the ANCs 105-b may communicate, either directly or indirectly (e.g., through core network 130), with each other over backhaul links 134 (e.g., X1, X2, etc.), which may be wired or wireless communication links.

Each ANC 105-b may also communicate with a number of UEs 115 through a number of other network access devices 105-c, where network access device 105-c may be an example of a smart radio head. In alternative configurations, various functions of each network access device 105 may be distributed across various network access devices 105 (e.g., radio heads and access network controllers) or consolidated into a single network access device 105 (e.g., a base station).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the network access devices 105-a and/or network access devices 105-c may have similar frame timing, and transmissions from different network access devices 105-a and/or network access devices 105-c may be approximately aligned in time. For asynchronous operation, the network access devices 105-a and/or network access devices 105-c may have different frame timings, and transmissions from different network access devices 105-a and/or network access devices 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network access device 105-c, network access device 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of network access devices 105-a, network access devices 105-c, base stations, access points, or other network access devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a network access device 105-c, and/or DL channels, from a network access device 105-c to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a TTI of a downlink channel may be distributed between different control regions in a cascaded manner (e.g., between a common control region and one or more UE-specific control regions).

A physical downlink control channel (PDCCH) may be used to carry downlink control information (DCI). DCI may include information regarding DL scheduling assignments, UL resource grants, transmission scheme, UL power control, hybrid automatic repeat request (HARD) information, MCS, NDI, RV, and other information. The size and format of the DCI messages can differ depending on the type and amount of information that is carried by the DCI. For example, if frequency multiplexing is supported, the size of the DCI message is large compared to contiguous frequency allocations. Similarly, for a system that employs multiple input multiple output (MIMO), the DCI must include additional signaling information. DCI size and format depend on the amount of information as well as factors such as bandwidth, the number of antenna ports, and duplexing mode.

One or more of the base stations 105 may include a base station control channel manager 101, which may provide control information (e.g., DCI) to UEs 115 in a single codeword that does not span multiple transmitted symbols, or may provide partitioned control information to UEs that may include different portions of control information in different control information codewords. In some examples, base station control channel manager 101 may determine that one or more UEs 115 have relatively low latency requirements, and may configure such UEs 115 to receive partitioned control information or single-codeword control information. The base station control channel manager 101 may determine that one or more other UEs 115 have less stringent latency requirements, and may configure such UEs 115 to receive control information that spans two or more symbols. In some examples, the base station control channel manager 101 may multiplex transmissions with UEs 115 having more and less stringent latency requirements. In some examples, base stations 105 may signal UEs 115 of partitioned or non-partitioned control via semi-static, semi-dynamic, or dynamic signaling.

One or more of the UEs 115 may include a UE control channel manager 102, which may receive and process control information provided by base stations 105. In some examples, UE control channel manager 102 may receive partitioned, or non-partitioned, control information and perform data reception and processing based on the control information. In some examples, UE control channel manager 102 may manage acknowledgments of received data and transmissions of ACK/NACK feedback to base stations 105 in one or more UL symbols at the end of a subframe. A base station 105 may receive the ACK/NACK feedback and configure data for retransmission based at least in part on the ACK/NACK feedback. In some examples, base stations 105 may transmit first control information in a first codeword within a first symbol that is independent of the ACK/NACK feedback, and may transmit second control information in a second codeword within a second symbol that is dependent on the ACK/NACK feedback. The second control information may include, for example, an indication of a data retransmission.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

As mentioned above, in some examples UEs 115 or base stations 105 may provide ACK/NACK feedback indicating whether data in a transmission is successfully received and decoded. Such feedback may be provided through, for example, hybrid automatic repeat request (HARQ) procedures, which may ensure that data is received correctly over a wireless communication link 125. HARQ may include a combination of error detection (e.g., using a CRC), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125.

Figure 2:
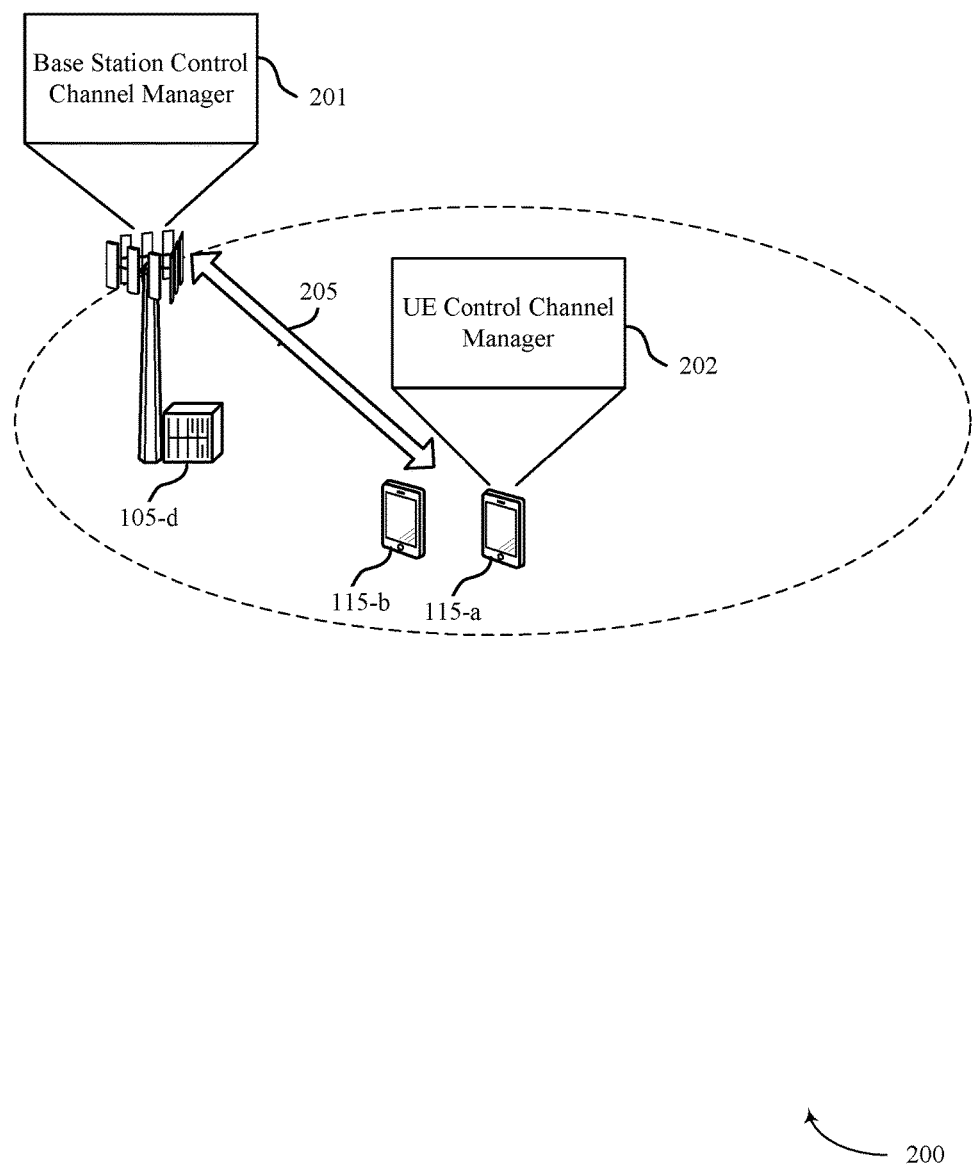
FIG. 2 illustrates an example of a wireless communications system that supports control channel techniques for TDD subframe processing in accordance with aspects of the present disclosure.

FIG. 2 illustrates an example of a wireless communications system 200 for partitioned control channel techniques for TDD subframe processing. Wireless communications system 200 may include base station 105-d and UE 115-a, which may be examples of the corresponding devices described with reference to FIG. 1. In some examples, the wireless communications system 200 may be a portion of a 5G or next generation wireless communications system in which frequencies of communications link 205 may not be paired, and thus base station 105-d and UE 115-a communicate using TDD techniques. In some examples, the TDD techniques may use DL-centric subframes and UL-centric subframes, in which a single subframe occupies a single TTI and includes a number of symbols (e.g., 14 symbols or 16 symbols). In DL-centric subframes, in some examples, 14 downlink symbols may be transmitted, followed by a guard period and an uplink pilot and an uplink ACK/NACK transmission. In some examples, the uplink pilot and uplink ACK/NACK may be transmitted in a split symbol, in which the uplink pilot may be transmitted in a first portion of an uplink duration and the ACK/NACK may be transmitted in a second portion of the uplink duration, as will be discussed in more detail below. In UL-centric subframes, in some examples, two downlink symbols may be transmitted, followed by a guard period and 13 uplink symbols. Resources for UL-centric and DL-centric subframes for some examples will be described in more detail below.

Such UL-centric subframes and DL-centric subframes may provide a self-contained TDD subframe structure, in which resource allocations and ACK/NACK feedback are provided within a single subframe. Such techniques may provide relatively low latency communications between UE 115-a and base station 105-d, allowing for retransmissions of unsuccessfully received subframes relatively quickly and, in some examples, in the following subframe. Further, base station 105-d, upon receiving ACK/NACK feedback for a subframe in TTI(n−1) may perform a retransmission of the data transmitted in TTI(n−1), if a NACK is received, in a subframe transmitted in TTI(n). Thus, base station 105-d needs to process the ACK/NACK feedback and prepare the necessary data within relatively constrained time periods. In some examples, as discussed above and as will be discussed in more detail below, partitioned control information may be used to provide processing opportunities in which the base station may provide control information and data according to low latency time periods.

Benefits to such multi-symbol control regions, in which multiple symbols at the beginning of a subframe and over a subset of frequency tones (i.e., may not cover the full system bandwidth) may include control information codewords that do not span symbols, which may provide both processing efficiencies and latency reduction. As mentioned, in some examples downlink control information may be partitioned, with different portions of the downlink control information provided in different symbols, processing may be streamlined to achieve tight processing deadlines for both DL-centric and UL-centric subframes. Furthermore, partitioned downlink control information for DL-centric subframes may facilitate single-interlace operation in which a retransmission may be transmitted in a next TTI following a NACK, by providing base station 105-d additional processing time to decode UL ACK/NACK transmitted near the end of a previous TTI, and prepare for retransmission. For UL-centric subframes, partitioned control information also may facilitate single-interlace operation, as it may provide base station 105-d additional time to decode the last UL data transmission in a previous subframe and prepare NDI/RV indicators. In some examples, for UL-centric subframes, a non-time-critical UL burst may be inserted between the last DL control symbol and the main UL data section, which also may provide additional processing time associated with an UL grant.

In some examples, when operating according single-interlace TDD, base station 105-d may have time-critical processing between receipt of an ACK/NACK transmission from UE 115-a and retransmission for a next subsequent TTI. In examples using partitioned control information, the first codeword of control information may include a resource allocation for the subframe that may be determined by base station 105-d prior to receiving the ACK/NACK transmission from the UE 115-a. The second codeword of control information may include one or more "data indicators," which may provide information related to whether the data is retransmitted data or new data. Furthermore, the NDI, MCS and RV of the transmitted data may depend upon whether new data or retransmitted data is sent in a subframe. Such data indicators may be generally referred to as processing information that may provide UE 115-a with information related to data and demodulation/decoding of the data. By transmitting the processing information in the second codeword in the second symbol, the base station 105-d may obtain a gain of at least one symbol of time for processing of the ACK/NACK feedback and retransmitting data if needed. It is to be noted that in various examples provided herein, reference may be made to first symbols and second symbols which may contain control information. When making reference to a first symbol or second symbol, this does not necessarily mean that the symbol is the first symbol in time transmitted during a TTI, but rather a relative position of the symbols, which may be transmitted one or more symbols in a TTI.

In some examples, the base station 105-d may determine a resource allocation for UE 115-a during a previous TTI (e.g., TTI(n−1)) that may be sufficient to accommodate either new data or a possible retransmission of the data transmitted in TTI(n−1). After receipt of the ACK/NACK from the UE 115-a for TTI(n−1), the base station 105-d may transmit a first codeword of control information that includes the resource allocation during an initial symbol transmitted during TTI(n). Thus, the base station 105-d has the guard period and at least one symbol of time (corresponding to the symbol used to transmit the first codeword) to decode the ACK/NACK transmission for TTI(n−1) and decide whether to send new data or retransmit data, and send the second codeword of control information that indicates new data or retransmission. In some examples, the base station 105-d may allocate resources to the UE 115-a even though new data may not be present for transmission to the UE 115-a. In such cases, if an ACK is received from the UE 115-a for TTI(n−1), the base station 105-d may transmit an indication that in the second codeword no data is to be transmitted for UE 115-a. In some further examples, base stations 105-d may schedule data to a different UE 115-b and transmit a codeword of control information to UE 115-b to indicate reassignment of the allocation from UE 115-a to UE 115-b. Such a reallocation of the uplink resources may increase efficiency by preventing at least some of the allocated resources becoming idle. If data is to be retransmitted, or if new data is to be transmitted, the base station 105-d then has another symbol of time to prepare the data waveform for transmission.

At the UE 115-a, the first codeword of control information may be received, and a resource allocation may be determined. Furthermore, during the initial symbol transmission of the subframe, the base station 105-d may transmit, and the UE 115-a may receive, one or more reference signals (RSs), such as a cell-specific RS (CRS) or a demodulation RS (DMRS). At the UE 115-a, DMRS processing may be dependent on the resource allocation and the RBs within a subframe that are allocated to the UE. Furthermore, DMRS processing may gate data symbol processing. If DMRS processing cannot start as soon as all DMRS symbols have been received, and/or if data processing cannot start as soon as the first data symbol has been fully received, the delay can be referred to as a "processing start delay." In some examples, processing start delay may be assumed to be zero, but if it is not zero it may drive an additional buffering requirement at UE 115-a. In order to provide an ACK/NACK indication following the last downlink symbol of a DL-centric the UE 115-a, in some examples, has a processing budget of about one symbol to generate the ACK/NACK feedback and prepare the associated waveform for transmission. In some examples, payload tapering may be implemented to provide relatively less payload in a last symbol in order to facilitate this processing budget.

In some examples, the base station 105-d may include a base station control channel manager 201, which may be an example of base station control channel manager 101 of FIG. 1, and which may provide control information to UE 115-a in a single codeword that does not span multiple transmitted symbols, or may provide partitioned control information to UEs that may include different portions of control information in different control information codewords. UE 115-a in this example may include UE control channel manager 202, which may be an example of UE control channel manager 102 if FIG. 1, and which may receive and process control information provided by base stations 105-d. As mentioned above, UE control channel manager 202 may receive partitioned, or non-partitioned, control information and perform data reception and processing based on the control information.

Figure 3:
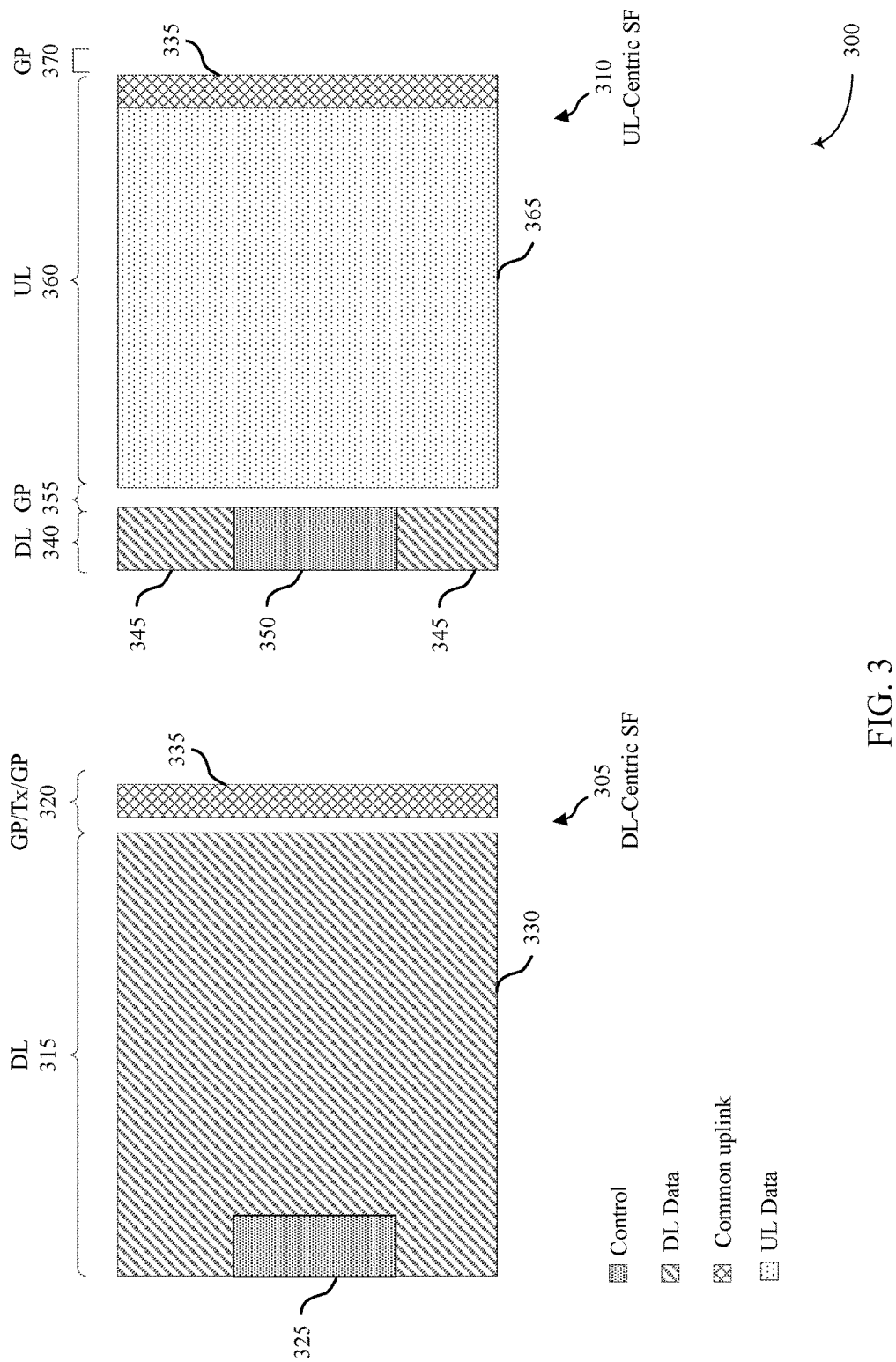
FIG. 3 illustrates an example of a downlink-centric subframe and an uplink-centric subframe that support control channel techniques for TDD subframe processing in accordance with aspects of the present disclosure.

FIG. 3 illustrates an example 300 of a DL-centric subframe 305 and a UL-centric subframe 310 that may support partitioned control channel techniques for TDD subframe processing. In some cases, example 300 may represent aspects of techniques performed by a UE 115 or base station 105 as described with reference to FIGS. 1-2.

As mentioned above, in some examples a self-contained TDD subframe structure may be used for communications between a UE and a base station. In the example of FIG. 3, DL-centric subframe 305 includes a DL portion 315, and a guard period (GP) UL transmission portion 320. Within the DL portion 315, DL control resources 325 may be located at the beginning of the subframe 305. In some examples, the DL control resources 325 include a subset of frequency resources that have a narrower bandwidth than the total bandwidth used for the communication channel between the base station and UE, and span multiple symbols. The relatively narrow bandwidth of DL control resources 325 may allow for reduced CRS overhead relative to a wider bandwidth, and also may allow for lower-tier UEs (e.g., machine-type communication (MTC) UEs) to access the network with reduced hardware complexity and reduced power consumption. The narrower DL control resources 325 bandwidth may be multiplexed in frequency, within the symbols used to transmit the DL control resources 325, with a DL data region 330, to utilize the entire channel bandwidth. The DL-centric subframe ends, in some examples, with an UL transmission 335, which may be referred to as a "UL common burst" because its structure is the same between DL-centric subframe 305 and UL-centric subframe 310. Scheduling of the UL transmission 335 may be independent of the main data section, or could be pre-scheduled, in some examples.

In the UL-centric subframe 310, a downlink portion 340 is located at the beginning of the UL-centric subframe 310, followed by a GP 355 during which circuitry may be switched from receive mode to transmit mode, followed by an uplink portion 360. A second GP 370 may follow the UL portion 360 to provide for switching of transmit/receive circuitry from a transmit mode back to receive mode in preparation for the initial DL transmissions of the following subframe. Within DL portion 340, a DL control information 350 may occupy a portion of the entire transmission bandwidth, similarly as discussed with respect to DL control resources 325. The DL control information 350 may be multiplexed with other DL data resources 345 in order to use the entire transmission bandwidth. The UL portion 360 may include UL data 365, and a UL common burst 335 similarly as discussed with respect to DL-centric subframe 305. Thus, both the DL-centric subframe 305 and UL-centric subframe 310 may provide self-contained TDD subframes.

Figure 4:
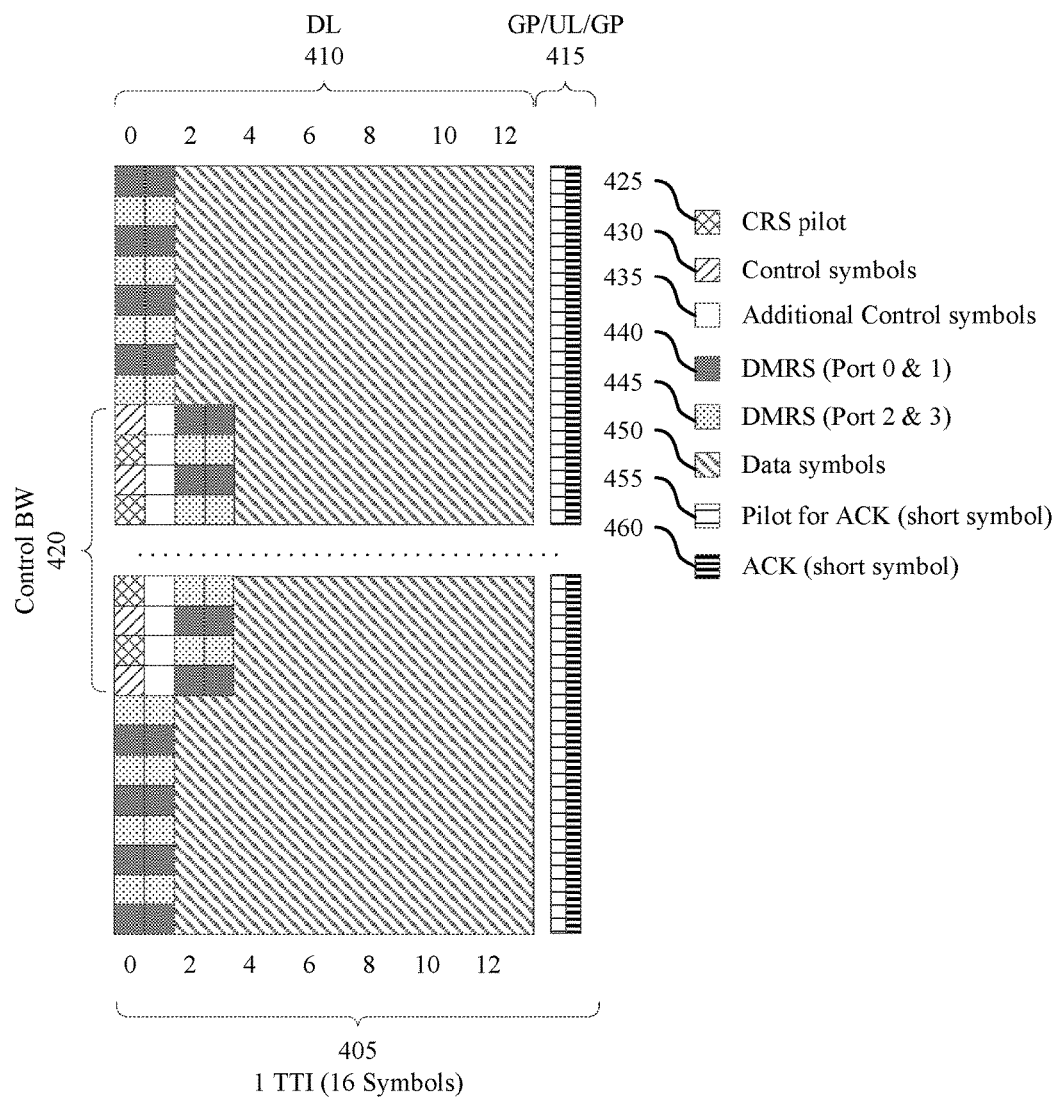
FIG. 4 illustrates an example of resources of a downlink-centric subframe that supports control channel techniques for TDD subframe processing in accordance with aspects of the present disclosure.

FIG. 4 illustrates an example of resources of a DL-centric subframe 400 that supports control channel techniques for TDD subframe processing. In some cases, DL-centric subframe 400 may represent aspects of communications performed by a UE 115 or base station 105 as described with reference to FIGS. 1-2.

As discussed above, DL-centric subframe 400 may be a self-contained TDD subframe that includes both a DL portion 410 and an UL portion 415. In the example of FIG. 4, the DL-centric subframe 400 may be transmitted as a number of symbols which in this examples is 16 symbols) in one TTI 405, although other examples may have different numbers of symbols in a TTI. Control information may be transmitted in a control bandwidth 420 that, in this example, occupies one-eighth of the system bandwidth. The control information may be transmitted in a two-symbol control region that may include CRS pilot resource elements (REs) 425, control symbol REs 430, additional control symbols 435, DMRS REs 440 for port zero and one transmissions, and DMRS REs 445 for port two and three transmissions. The two-symbol control region may provide that CRS overhead is amortized over more symbols, and may provide that data may be processed without additional delay following receipt of control symbols 430. Data symbols 450 may be transmitted beginning at symbol two for bandwidth outside of the control bandwidth 420, with the data REs multiplexed with DMRS REs 440 and 445 in symbols two and three. Starting with symbol four, and through symbol 13, data symbols 450 may be transmitted using the entire bandwidth of the DL transmissions. A GP may follow the last DL data symbol, followed by short symbol used to transmit a UL pilot 455 for a UL ACK/NACK transmission, which is followed by UL ACK/NACK symbol 460 itself. A short symbol such as used to transmit the UL pilot 455 and UL ACK/NACK symbol 460 may be achieved through doubling of tone spacing for the uplink portion 415, which may effectively create two symbols in time. In some examples, a short or split symbol may be used for the control information transmitted in the DL portion 410. Following the UL ACK/NACK symbol 460, a second GP may be provided to allow switching from UL to DL transmissions.

In some examples, control channel latency may be primarily driven by symbol placement. In some examples, control channel information may be provided in a codeword that spans a single symbol (or a single short symbol). Providing a codeword that spans a single symbol may not allow interleaving in time but provides that information in the single symbol codeword may be processed and decoded sooner, which may help to enhance completion of processing more quickly. In some examples, a single codeword may be used to carry all DL control information. In other examples, an amount of DL control information may result in a relatively large codeword occupying a single symbol, which may result in capacity constraints based on resources of the first symbol allocated to control bandwidth 420. In such examples, downlink control information may be partitioned into first control information that is provided in a first symbol that is relatively more time critical, and into second control information that is provided in a second symbol that is relatively less time critical.

Figure 5:
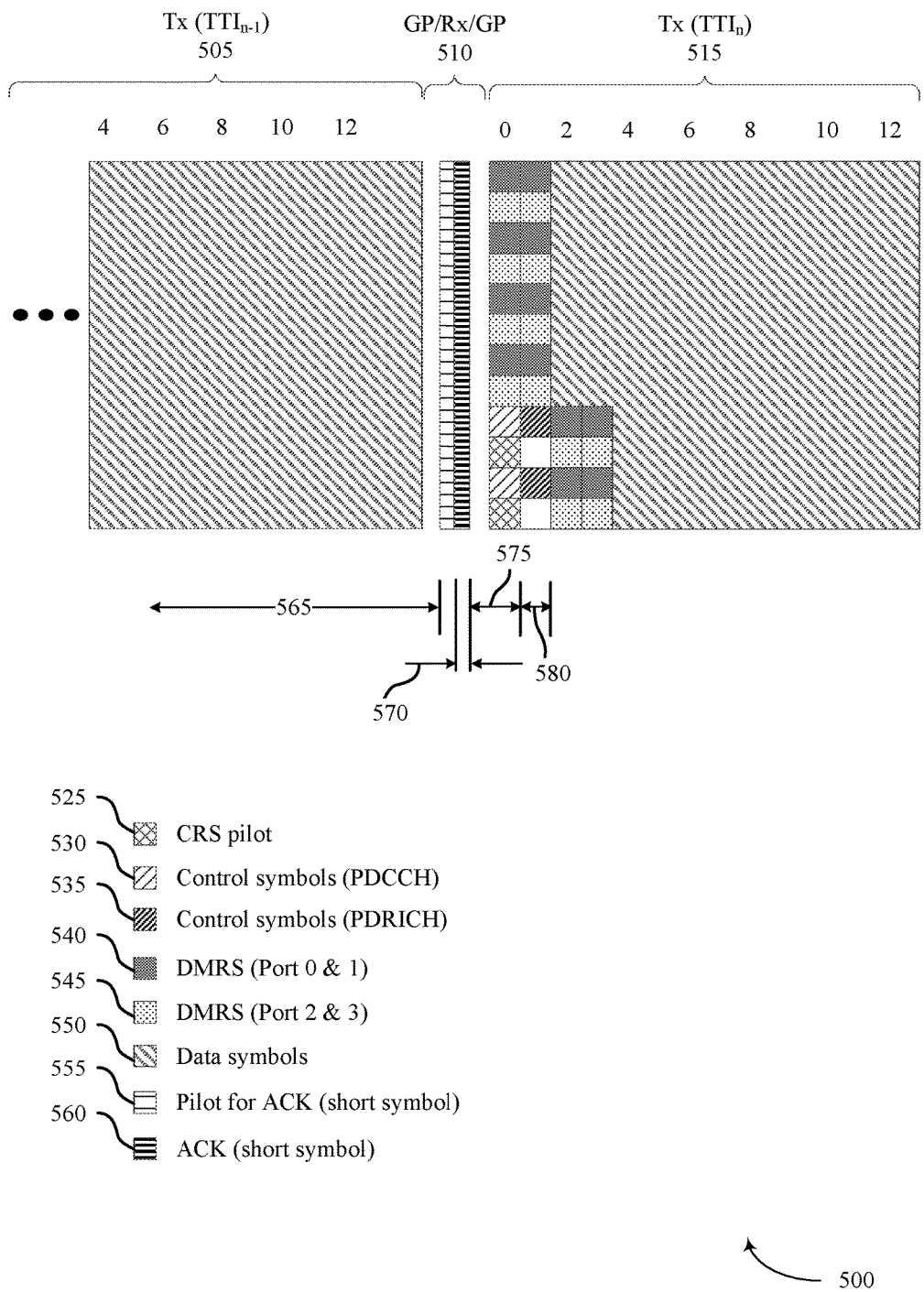
FIG. 5 illustrates an example of base station processing timelines and resources of a downlink-centric subframe that supports partitioned control channel techniques for TDD subframe processing in accordance with aspects of the present disclosure.

FIG. 5 illustrates an example of resources of consecutive TDD DL-centric subframes 500 that may provide partitioned control channel transmissions. In some cases, DL-centric subframes 500 may represent aspects of communications performed by a UE 115 or base station 105 as described with reference to FIGS. 1-2.

In the example of FIG. 5, data symbols 550 of first subframe DL transmissions 505 for TTI(n−1) may be transmitted by a base station, followed by a GP, a UL pilot 555 and UL ACK/NACK symbol 560 in uplink transmissions 510. A second DL-centric subframe is then transmitted in TTI(n) 515. The first symbol of TTI(n) 515 may include CRS pilot REs 525 and first control information 530, which may include PDCCH control information that may include, for example, a resource allocation to the UE for the DL-centric subframe of TTI(n) 515. A second symbol of TTI(n) 515 may include second control information 535, which may include PDRICH control information. PDRICH control information may include processing parameters, as discussed above, such as MCS, NDI, RV, and the like. The first and second symbols of TTI(n) 515 may also include DMRS REs 540 and 545 that are multiplexed with the control bandwidth, and the third and fourth symbols of TTI(n) 515 may include DMRS REs 540 and 545 for the control channel bandwidth. Data symbols 550 may be transmitted starting in symbol two of TTI(n) 515. Note that a cyclic prefix (CP) is also included as part of each symbol, although is not explicitly illustrated in the drawings.

At the base station, as mentioned above, single interlace operations may be supported, which may provide time-critical processing between reception of the ACK/NACK transmission 560 and potential retransmission of data from TTI(n−1) starting at symbol two of TTI(n). As mentioned, second control information in PDRICH symbols 535 may include processing information or "data indicators," that may be transmitted in symbol one, which may allow base station to gain one symbol of time for processing the ACK/NACK transmission 560 and preparing the second control information in PDRICH symbols 535. The first control information of control symbols 530, that may provide PDCCH symbols, may include control information without the data indicators, such as resource allocation for TTI(n).

The base station may include a scheduler that may run during TTI(n−1) to schedule resources to the UE for TTI(n), and in some examples the scheduler at the base station may run during time period 565 to determine the allocation of resources and, in some examples, preprocess and store a transmission waveform associated with new or retransmitted data, or both, for future transmission during TTI(n). The base station may perform UL pilot 555 processing during time period 570. During time period 575, the base station may perform processing of ACK/NACK transmission 560, and may format the PDRICH control symbols 535 for transmission. As mentioned above, the base station during time period 575 has greater that one symbol of time to decode ACK/NACK symbol 560, determine whether to send new data or retransmit TTI(n−1) data, format PDRICH control symbols 535n and begin transmitting PDRICH control symbols 535. The base station then has another symbol worth of time in time period 580 in which to format the data waveform for the first data symbols 550 in TTI(n).

Figure 6:
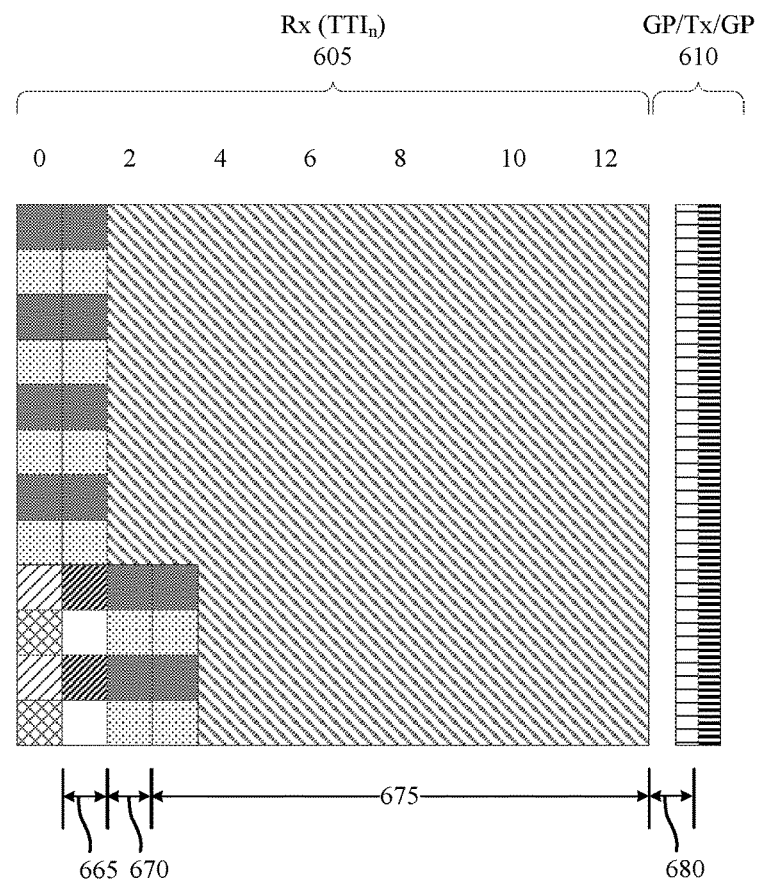
FIG. 6 illustrates an example of user equipment (UE) processing timelines and resources of a downlink-centric subframe that supports partitioned control channel techniques for TDD subframe processing in accordance with aspects of the present disclosure.

FIG. 6 illustrates an example of resources and UE process timing for a TDD DL-centric subframe 600 that may provide partitioned control channel transmissions. In some cases, DL-centric subframe 600 may represent aspects of communications performed by a UE 115 or base station 105 as described with reference to FIGS. 1-2.

In the example of FIG. 6, a downlink portion 605 of DL-centric subframe 600 may be received at a UE, followed by a GP and uplink portion 610 of the DL-centric subframe. Similarly as discussed above with respect to FIG. 5, the downlink portion 605 received at the UE may include a first symbol that may include CRS pilot REs 625 and first control information 630, which may include PDCCH control information that may include, for example, a resource allocation to the UE for the DL-centric subframe 600. A second symbol of TTI(n) may include second control information 635, which may include PDRICH control information. PDRICH control information, as discussed above, may include processing parameters such as MCS, NDI, RV, and the like. The first and second symbols of TTI(n) may also include DMRS REs 640 and 645 that are multiplexed with the control bandwidth, and the third and fourth symbols of the DL-centric subframe 600 may include DMRS REs 640 and 645 for the control channel bandwidth. Data symbols 650 may be transmitted starting in symbol two of the DL-centric subframe 600. After data symbols 650, the DL-centric subframe 600 may include a GP, a UL pilot 655 and UL ACK/NACK symbol 660 in uplink transmissions 610.

At the UE, as mentioned above, single interlace operations may be supported, which may provide time-critical processing between reception of the DMRS REs 640 and 645, and processing of the DMRS, the completion of which gates data symbol 650 processing. As mentioned, the first control information in control symbols 630 may include a resource allocation that the UE may use to determine DMRS processing, which is dependent upon RB allocation. In the example of FIG. 6, CRS pilot 625 and PDCCH control symbol 630 processing may be performed by the UE during time period 665. Before processing of CRS pilot 625 and PDCCH control symbol 630, the allocated RBs are not known to the UE and all tones may be buffered for processing. Once the resource allocation for the UE is known, the UE may perform DMRS processing and PDRICH processing during time period 670, which may provide the UE with NDI and RV information for data receptions. During time period 675, the UE may process PDSCH data symbols 650 from symbols 2 through 12. The UE may process the last data symbol 650, and generate the ACK/NACK transmission waveform during time period 680. When performing PDSCH processing two symbols may be buffered at the UE, in some examples, namely the in-flight symbol and the symbol being processed. The UE, in examples, may perform pipelined processing in which one symbol is processed within one symbol time. In some examples, within symbol pipelining may be performed, in which all processing stages for a received symbol are completed within one symbol of time. In other examples, across symbol pipelining (2-symbol) may be performed, which may provide more flexibility to pipeline the processing stages but may require payload tapering at the final symbol in order to complete processing within the processing time budget before ACK/NACK is transmitted.

Figure 7:
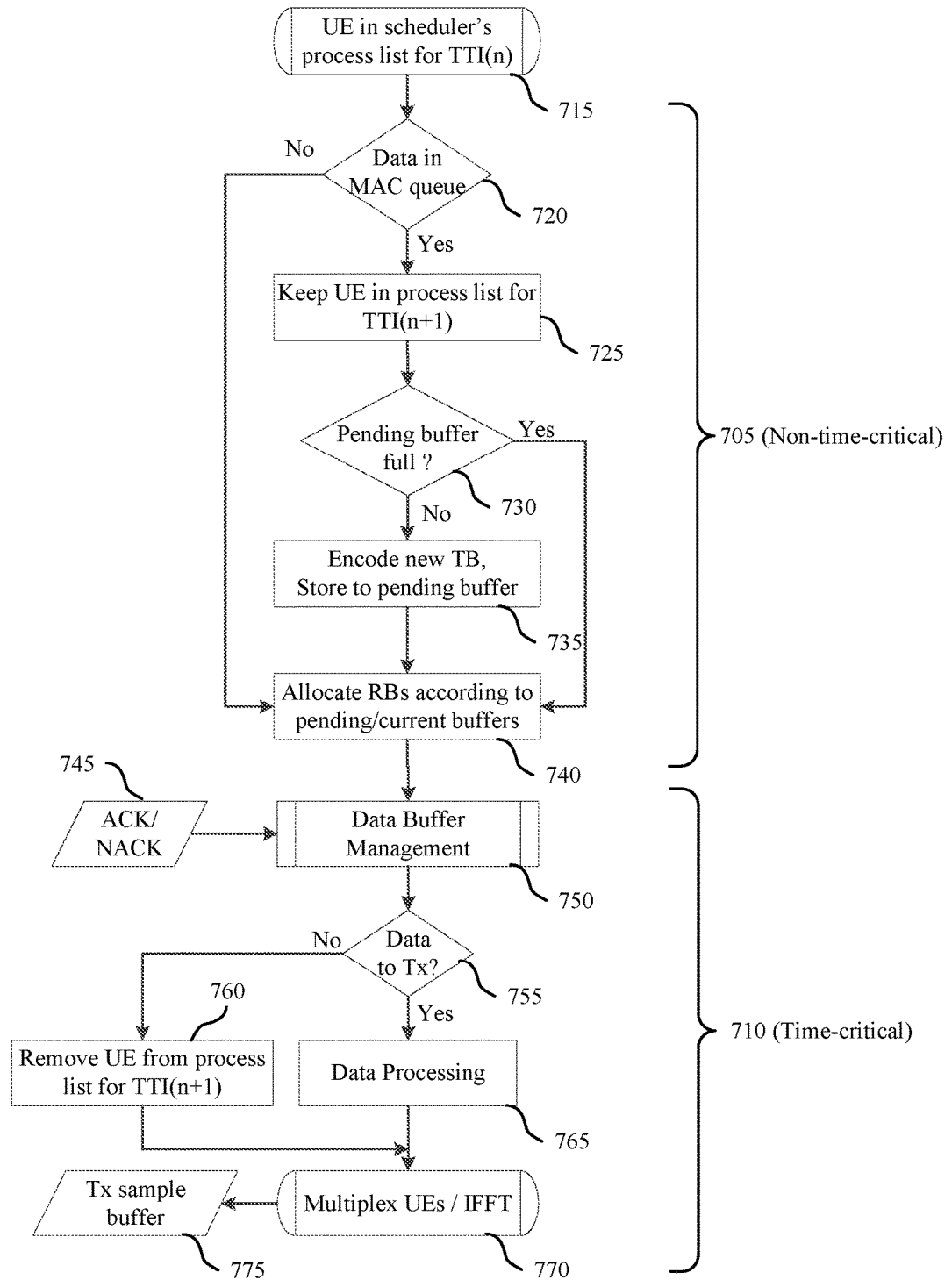
FIG. 7 illustrates an example of a base station processing operations that support partitioned control channel techniques for TDD subframe processing in accordance with aspects of the present disclosure.

FIG. 7 illustrates a flow chart 700 of exemplary operations of a scheduler at a base station that may employ control channel techniques for TDD subframe processing in accordance with aspects of the disclosure. In some cases, flow chart 700 may represent aspects of techniques performed by a base station 105 as described with reference to FIGS. 1-2. In this example, a scheduler that may run at a base station may perform non-time critical operations 705, which may be performed in advance of a subframe for a particular TTI, such as in TTI(n−1) in preparation for transmissions in TTI(n), for example. The non-time critical operations 705 may include, for example, determining a resource allocation for a UE during TTI(n). The scheduler may perform time-critical operations 710 as well, which may start once an ACK/NACK transmission is received at the base station, as discussed above.

In the example of FIG. 7, the scheduler at the base station may, for each UE in the scheduler's process list for TTI(n), initiate a scheduling operation, as indicated at block 715. As discussed above, the scheduler may run during TTI(n−1) to perform scheduling for TTI(n) (e.g., during time period 565 of FIG. 5). A UE that is to be scheduled may be included in the scheduler's "process list." In some examples, a UE may be scheduled unless there UE is in a "No data to Tx" state and there is no new data in the MAC queue for the UE. Arrival of new data to MAC queue may trigger a UE to be added to the scheduler's process list, and entering the "No data to Tx" state may remove the UE from the process list. In some examples, as will be discussed in more detail below with respect to FIG. 8, a UE may be included in the process list even if new data is not in the MAC queue for the UE, in order to allocate resources for retransmission under the assumption that a NACK will be received for a previous data transmission. Thus, such a resource allocation for TTI(n) may be a pre-scheduled resource allocation that is scheduled prior to receiving the ACK/NACK from the UE indicating successful or unsuccessful receipt of data transmitted in TTI(n−1). The UE may enter the "No data to Tx" in such cases if an ACK is received or if a maximum number of retransmissions is reached (and there is no new data in the MAC queue). In some examples, if no data is to be transmitted after an allocation of RBs to the UE, the base station may send nothing in the data portion of the subframe, in order to reduce interference to other cells. In other examples, the base station may transmit redundant retransmissions or padding in the allocated RBs. In some examples, if no data is to be transmitted after an allocation to the UE, the base station may dynamically reassign the allocation (or a subset thereof) to another UE (or multiple other UEs). The selection of another UE as a candidate for reassignment may be done during the non-time-critical operations 705 if, during scheduling for the particular UE, there is no new data in the MAC queue and the pending buffer is empty. The criteria for selection of a UE for reassignment of resources, in some examples, may be based on spatial proximity in case the same DMRS must be used, or based on other constraints.

At block 720, the base station may determine whether there is data for the UE in the medium access control (MAC) queue. If data is present in the MAC queue, the base station may keep the UE in the process list for a subsequent TTI(n+1), as indicated at block 725. At block 730, the base station may determine if a pending buffer is full. If the pending buffer is not full, the base station may encode a new transport block (TB) and store the TB to the pending buffer, as indicated at block 735. In some examples, rather than provide a pending buffer, the base station may redo such preprocessing for each TTI, which may allow the MCS to change. Following storing the TB to the pending buffer at block 735, a determination that data is not present in the MAC queue at block 720, or a determination that the pending buffer is full at block 730, the base station may allocate RBs to the UE according to the pending/current buffers for the UE, as indicated at block 740. In some examples, the allocation of RBs may be formatted into first control information that may be provided to the UE in DL control information, such as in first control information of partitioned control information.

Following the non-time critical operations 705, time-critical operations 710 may begin upon reception of an ACK/NACK communication at block 745. Following the ACK/NACK reception at 745, the base station may perform a data buffer management routine, as indicated at block 750 and that will be described in more detail below with reference to FIG. 8. At block 755, the base station may determine if there is data to transmit in TTI(n). If there is no new data to transmit the base station may remove the UE from the process list for TTI(n+1), as indicated at block 760. In some examples, as discussed above with reference to FIG. 7, the allocated RB may be dynamically reassigned for data transmission to another UE. If there is data to transmit at block 755, the base station may perform data processing at block 765. The data processing may include, for example, rate matching, modulation, and precoding of the data to be transmitted. In some examples, data processing of block 765 may be moved to non-time-critical operations 705 which would result in a same RB allocation for retransmissions as for the previous transmission. The base station may, at block 770, multiplex UEs and perform inverse fast Fourier transform (IFFT) on the processed data, and may move the data to the transmit sample buffer as indicated at block 775.

As discussed with respect to block 765, the base station may perform processing of data in the non-time critical operations 705, in the time-critical operations 710, or both. In some examples, if a UE is scheduled due to new data in the MAC queue, the data for transmission may be pre-processed in order to reduce the amount of processing needed in the time-critical operations 710. In some examples, data may be pre-processed up to (but not including) a rate-matching stage. Because rate matching may be performed for retransmissions and new transmissions, such examples may allow the RB allocation to change to support a different number of REs for retransmissions as compared to new data transmissions. Additionally, scrambling may be subframe specific, and may be adjusted based on whether data is to be retransmitted or new data is to be transmitted. In other examples, additional pre-processing up to (but not including) a tone-mapping stage may be performed by the base station. Such examples may further reduce the processing to be performed by the base station during time-critical operations 710 although this may not allow for a number of RBs in an allocation, or scrambling, to change. In some examples, the RB allocation could be adjusted so long as a same number of RBs are allocated with a same RB type (i.e. same number of REs). In further examples, the base station may perform pre-processing of everything up to an IFFT stage. Such examples still further reduce processing during time-critical operations 710, but either with reduced flexibility in RB allocation, or potentially wasted preprocessing work and potentially preforming some of the processing stages at time critical operations.

In some examples, pre-processed data up to the selected level of preprocessing may be stored for future retransmissions. Two waveforms may be stored in some examples, a first waveform for new data, and a second waveform for retransmission data, with the particular waveform selected for transmission based on the ACK/NACK feedback received from the UE. Such waveforms may be managed as data in in a pending buffer and current buffer (active for HARQ process). The pending buffer for new data to be transmitted, in cases where pre-processing of new data is done for each TTI, may lead to the same new data being preprocessed multiple times due to multiple retransmissions of data prior to the new data being transmitted. Preprocessing for each TTI may have a benefit of allowing flexibility to change MCS between successive TTIs.

As discussed above, in some examples partitioned control information may be transmitted in DL control symbols. Such partitioned control information may provide processing timelines during transition to and in TTI(n) that determine what information may be provided at different points during TTI(n). For example, when a UL pilot is received in the UL portion of a DL-centric subframe, the UL pilot may be processed within a half-symbol time, in some examples, while symbols of the ACK/NACK transmission from the UE are in-flight. The time between reception of the ACK/NACK transmission for TTI(n−1) and first DL symbols of TTI(n) may not provide a sufficient amount of processing to be performed to provide complete control information (e.g., including NDI, RV, and MCS) for TTI(n) by the time the initial DL symbols are transmitted in TTI(n). Thus, partitioned control information may provide PDCCH is pre-processed (after scheduler runs) and ready prior to start of the initial TTI(n) DL transmission. In some examples, as discussed above, control information for symbol zero of TTI(n) may include an RB allocation information (via PDCCH) which is determined by the base station scheduler during TTI(n−1), and DMRS may be transmitted in non-control channel REs of symbol zero, which may be determined based on CQI feedback (non-time critical) and the RB allocation. The control information for symbol one of TTI(n) may include PDRICH information, and the base station may process PDRICH information during this symbol zero, which should provide sufficient time for processing of the ACK/NACK for TTI(n−1). The PDRICH information may include, for example, data processing parameters such as MCS, NDI, and RV, which may be determined based at least in part on the ACK/NACK feedback for TTI(n−1). The base station, during symbol one of TTI(n), may perform final stages of PDSCH processing for the first data symbol (transmitted in symbol 2 of TTI(n)). The actual stages of PDSCH processing that need to be performed is dependent on the amount of preprocessing performed on the data to be transmitted, as discussed above. The base station may perform, for subsequent DL data symbols until the end of the DL portion of TTI(n), final processing stages in a pipelined manner.

Figure 8:
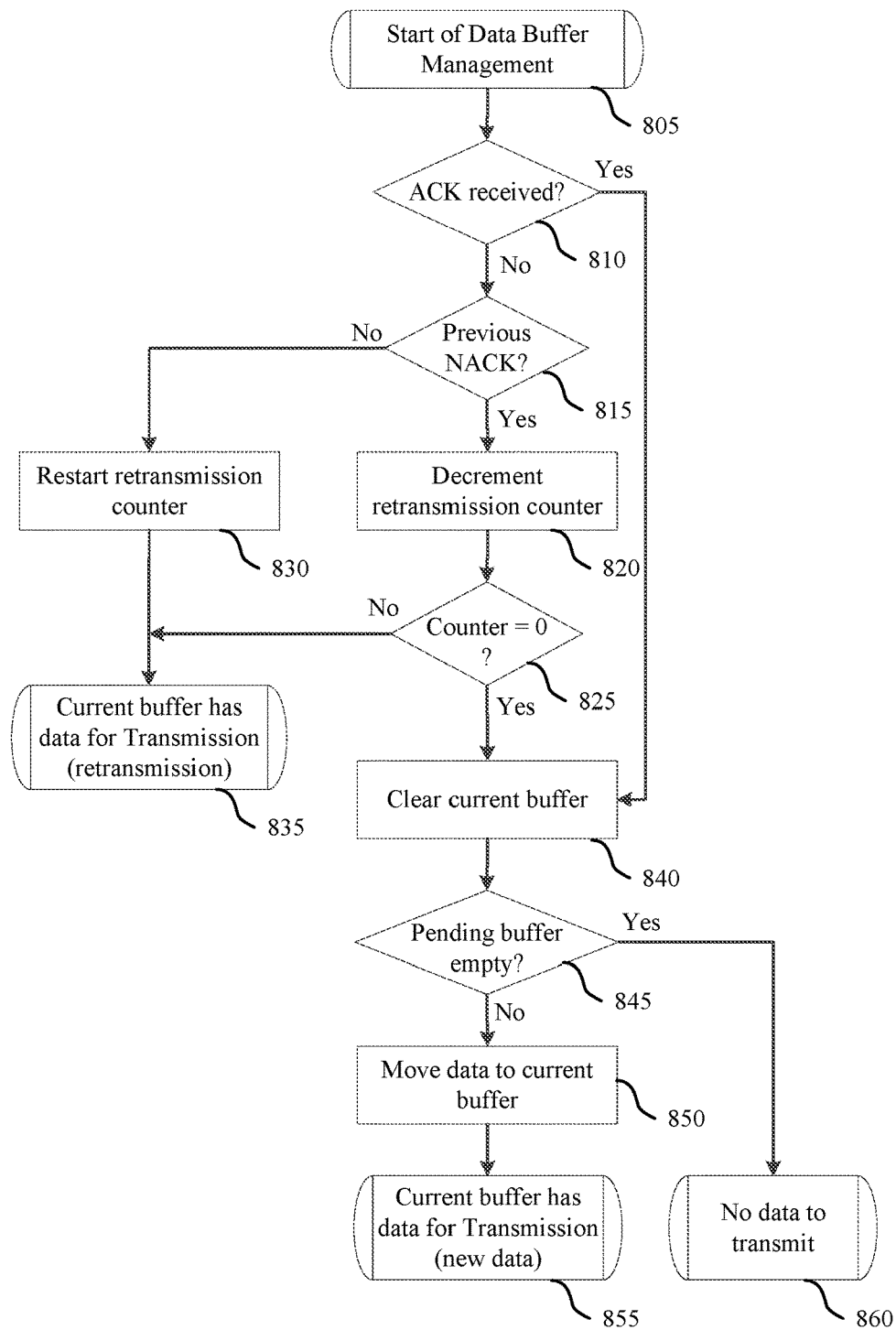
FIG. 8 illustrates an example of a data buffer management at a base station that supports partitioned control channel techniques for TDD subframe processing in accordance with aspects of the present disclosure.

FIG. 8 illustrates a flow chart 800 of exemplary data buffer management operations at a base station that may employ control channel techniques for TDD subframe processing in accordance with aspects of the disclosure. In some cases, flow chart 800 may represent aspects of techniques performed by a base station 105 as described with reference to FIGS. 1-2.

At block 805, the base station may initiate data buffer management for TTI(n). At block 810, the base station may determine if an ACK is received for prior TTI(n−1). If an ACK is not received, it is determined at block 815 if a previous NACK was received for the data transmitted in TTI(n−1). If a previous NACK has been received for this data, the base station may decrement a retransmission counter, as indicated at block 820. At block 825, the base station may determine if the retransmission counter equals zero (indicating a retransmission limit has been reached). If, at block 815, a previous NACK has not been received for the data, a retransmission counter is restarted from an initial value for a retransmission limit, as indicated at block 830. Following restart of the retransmission counter at block 835, or a determination that the retransmission counter has not decremented to zero at block 825, the content buffer at the base station is set to have data for transmission that is retransmission data, as indicated at block 835.

At block 840, if the retransmission counter has decremented to zero at block 825 or if an ACK is received at block 810, the base station may clear the current buffer. The base station may determine, at block 845, if the pending buffer is empty. If the pending buffer is empty, the base station may move the UE to a no data to transmit state, as indicated at block 860. If the pending buffer is not empty at block 845, the base station may move data from the pending buffer to the current buffer (e.g., by copying the data from the pending buffer to the current buffer or by changing a logical buffer association of the data), as indicated at block 850. At block 855, the base station may set the current buffer to have data for transmission that is new data.

Figure 9:
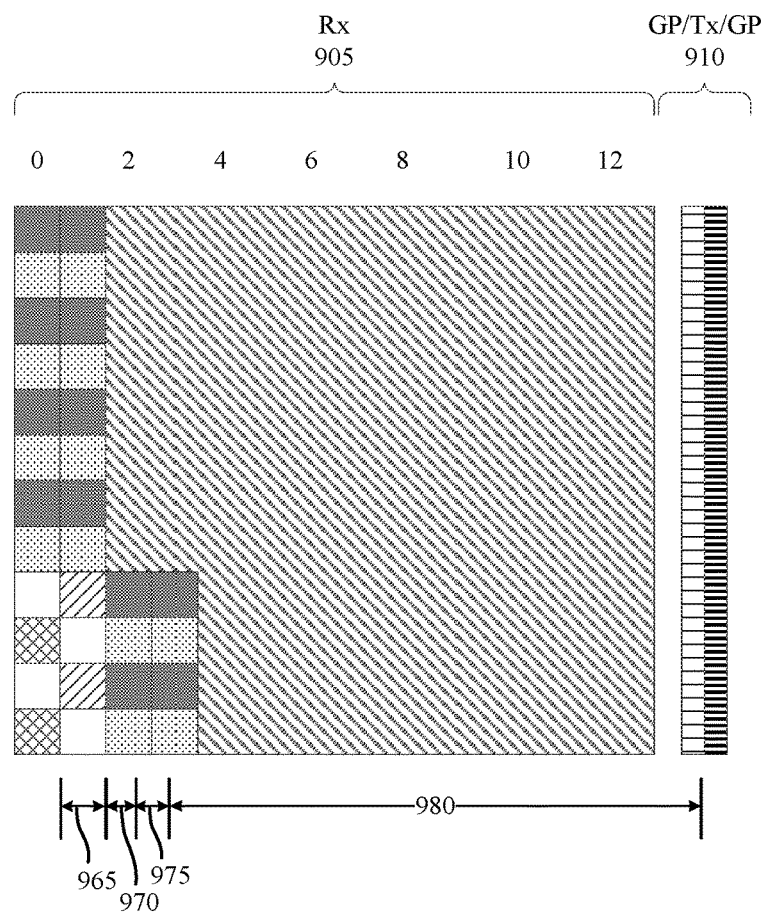
FIG. 9 illustrates an example of UE processing timelines and resources of a downlink-centric subframe that support control channel techniques for TDD subframe processing in accordance with aspects of the present disclosure.

FIG. 9 illustrates an example of resources and UE process timing for a TDD DL-centric subframe 900 that may provide non-partitioned control channel transmissions. In some cases, DL-centric subframe 900 may represent aspects of communications performed by a UE 115 or base station 105 as described with reference to FIGS. 1-2.

In the example of FIG. 9, a downlink portion 905 of DL-centric subframe 900 may be received at a UE, followed by a GP and uplink portion 910 of the DL-centric subframe. The downlink portion 905 received at the UE in this example may include a first symbol that may include CRS pilot REs 925 and DMRS REs 940 and 945. The second symbol received at the UE in this example may include control information REs 930 and DMRS REs 940 and 945. The control information REs 930 may include PDCCH information that includes a resource allocation and processing parameters such as MCS, NDI, and RV, for data symbols 950. In some examples, other control symbols 935 may be included in control bandwidth but may not contain PDCCH or PDRICH information. After data symbols 950, the DL-centric subframe 900 may include a GP, a UL pilot 955 and UL ACK/NACK symbol 960 in uplink transmissions 910.

In some examples, the UE may be configured for non-single interlace operations based on latency requirements of transmissions between the base station and UE. In the example of FIG. 9, CRS pilot 925 processing may be performed by the UE during time period 965, during symbol one of the subframe. PDCCH processing for control information 930 may be performed during time period 970, during symbol two of the subframe, at which point the resource allocation may be determined. Once the resource allocation for the UE is known, the UE may perform DMRS processing during time period 975. During time period 980, the UE may process PDSCH data symbols 950 from symbols 2 through 13. In some examples, the processing of data symbols 950 may span into the UL pilot 955 transmission, and not allow ACK/NACK for the data symbols 950 to be transmitted within the same TTI, and the UL ACK/NACK symbol 960 may include ACK/NACK information from a prior TTI. In another example, the data processing hardware could be designed to be able to "catch up" on the delayed start of data processing, and able to process 12 data symbols in roughly 11.5 symbol time, and send the acknowledgement for data symbols 950 in UL ACK/NACK symbol 960 within the same TTI. While PDCCH control symbols 930 of this example are illustrated as transmitted in a single symbol, other examples may provide two-symbol control information in which the PDCCH spans symbols zero and one, or may provide the PDCCH information in symbol zero. At the UE, such non-partitioned control may result in the UE not supporting single interlace operations, and having more relaxed processing timelines.

In some examples, UEs may be multiplexed that have partitioned and non-partitioned control information. For example, UEs that that can tolerate higher latency may operate with two-interlace non-partitioned control, and UEs that have lower latency requirements may operate with single-interlace partitioned control. In some examples, signaling may be provided to UEs by a base station to indicate the type of control and single versus two-interlace operation. Such signaling may be semi-static signaling that may be configured per radio resource control (RRC) connection. In other examples, signaling may be semi-dynamic signaling that may be changes through layer one (L1) signaling during a RRC connection. In further examples, such signaling may be dynamic, in which a DCI format that corresponds to the first symbol of partitioned control information is searched first by the UE, followed by DCI formats that correspond to non-partitioned control. In such examples, if partitioned control information is transmitted, the UE will be able to find it first and determine that single-interlace operation applies for the TTI, otherwise the UE will determine that non-single interlace operation applies for the TTI.

Figure 10:
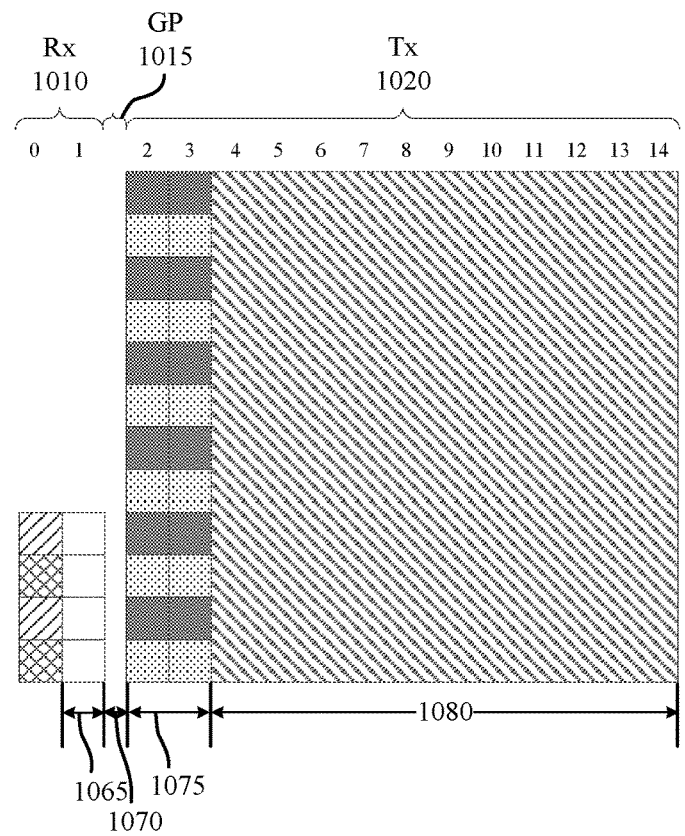
FIG. 10 illustrates an example of UE processing timelines and resources of an uplink-centric subframe that support control channel techniques for TDD subframe processing in accordance with aspects of the present disclosure.

FIG. 10 illustrates an example of an UL-centric subframe 1000 that may be transmitted using control channel techniques for TDD subframe processing as described herein. In some cases, UL-centric subframe 1000 may represent aspects of techniques performed by a UE 115 or base station 105 as described with reference to FIGS. 1-2.

In the example of FIG. 10, a downlink portion 1010 of UL-centric subframe 1000 may be received at a UE, followed by a GP 1015 and uplink portion 1020 of the UL-centric subframe 1000. The downlink portion 1010 received at the UE in this example may include a first symbol that may include CRS pilot REs 1025 and control symbols 1030 with an uplink grant for the UE. The second symbol received at the UE in this example may include additional control symbols 1035. Following GP 1015, DMRS REs 1040 and 1045 may be transmitted in the first two uplink symbols, followed by UL data symbols 1050. In the example of FIG. 10, the control symbols 1030 may include non-partitioned control information that is included within a single codeword within a single symbol. During time period 1065, in symbol one of the subframe 1000, the UE may perform CRS processing of CRS pilot 1025 and PDCCH processing of the control information 1030, and determine an allocation of uplink resources. During time period 1070, in GP 1015, the UE may perform RF switching to switch RF components from a receive mode to a transmit mode. In time period 1075, the UE may perform processing to set up the UL symbol processing pipeline to process and transmit data symbols 1050. The UE may process and transmit data symbols 1050 in time period 1080, corresponding to the remaining portion of UL portion 1020.

In the example of FIG. 10, time critical processing at the UE may include CRS and PDCCH processing, which should finish during symbol one in order to decode the UL grant. DMRS symbols 1040 and 1045 may be transmitted during symbols 2 and 3 of the subframe, which may be dependent on the RB allocation although portions of the DMRS waveform may be preprocessed in some examples. During symbols two and three (the first two UL symbols), the UE data symbol processing pipeline may be started and the waveform for the first data symbol ready, with subsequent data symbols transmitted from symbols 5-14. In some examples, control symbols 1030 may be capacity limited and formatting the necessary information within a single codeword to be transmitted within a single symbol may not be feasible. In such cases, partitioned control may be used for UL-centric subframes as well.

Figure 11:
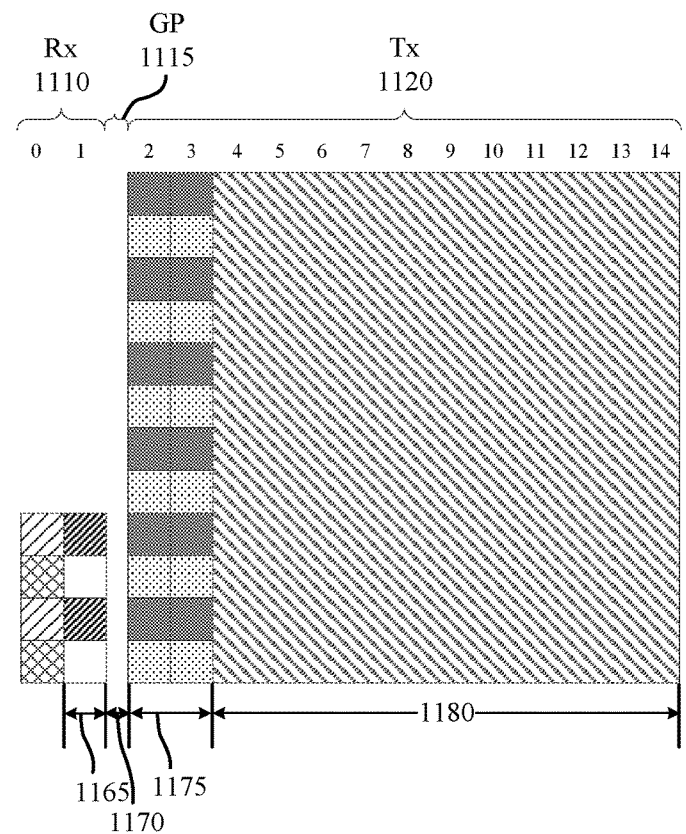
FIG. 11 illustrates an example of UE processing timelines and resources of an uplink-centric subframe that support partitioned control channel techniques for TDD subframe processing in accordance with aspects of the present disclosure.

FIG. 11 illustrates an example of an UL-centric subframe 1100 that may be transmitted using partitioned control channel techniques for TDD subframe processing as described herein. In some cases, UL-centric subframe 1100 may represent aspects of techniques performed by a UE 115 or base station 105 as described with reference to FIGS. 1-2.

In the example of FIG. 11, a downlink portion 1110 of UL-centric subframe 1100 may be received at a UE, followed by a GP 1115 and uplink portion 1120 of the UL-centric subframe 1100. The downlink portion 1110 received at the UE in this example may include a first symbol that may include CRS pilot REs 1125 and first control symbols 1130 that include a first portion of control information, such as an uplink grant for the UE. The second symbol received at the UE in this example may include second control symbols 1135 that may include additional control information for the UE, such as processing parameters (e.g., MCS, RV, NDI). Following GP 1115, DMRS REs 1140 and 1145 may be transmitted in the first two uplink symbols, followed by UL data symbols 1150.

In the example of FIG. 11, the first control symbols 1130 may include a first portion of partitioned control information that is included within a single codeword within a single symbol. During time period 1165, during symbol one of the subframe 1100, the UE may perform CRS processing of CRS pilot 1125 and PDCCH processing of the first control symbols 1130 to determine an allocation of uplink resources. During time period 1170, during GP 1115, the UE may perform RF switching to switch RF components from a receive mode to a transmit mode, and may perform processing of the second control symbols 1135 to determine processing parameters for the UL transmissions. In time period 1175, the UE may perform processing to set up the UL symbol processing pipeline to process and transmit data symbols 1150. The UE may process and transmit data symbols 1150 in time period 1180, corresponding to the remaining duration of UL portion 1120.

In the example of FIG. 11, time critical processing at the UE may include CRS and PDCCH processing of the first portion of the control information, which should finish during symbol one, in order to decode the UL grant RB allocation information and rank information for DMRS symbols 1140 and 1145. RF switching from Rx to Tx occurs during the GP 1115, concurrently with processing of the second portion of the control information that may include processing information or data indicators (e.g. MCS/RV/NDI). If this processing extends into symbol two, the data symbol pipeline processing start may be delayed. DMRS symbols 1140 and 1145 may be transmitted during symbols 2 and 3 of the subframe, which may be dependent on the RB allocation although portions of the DMRS waveform may be preprocessed in some examples. During symbols two and three (the first two UL symbols), the UE data symbol processing pipeline may be started and the waveform for the first data symbol ready, with subsequent data symbols transmitted from symbols 5-14. Partitioned control information such as described may enable single-interlace operation similarly as discussed above with respect to DL-centric subframes. In some examples, the base station may have an additional symbol duration of time to process a last received UL data symbol in previous TTI, and update NDI/RV indicators for inclusion in the second portion of the control information, and facilitating single-interlace operation. Similarly as discussed above, multiplexing of transmissions with partitioned and non-partitioned control may also be implemented.

Figure 12:
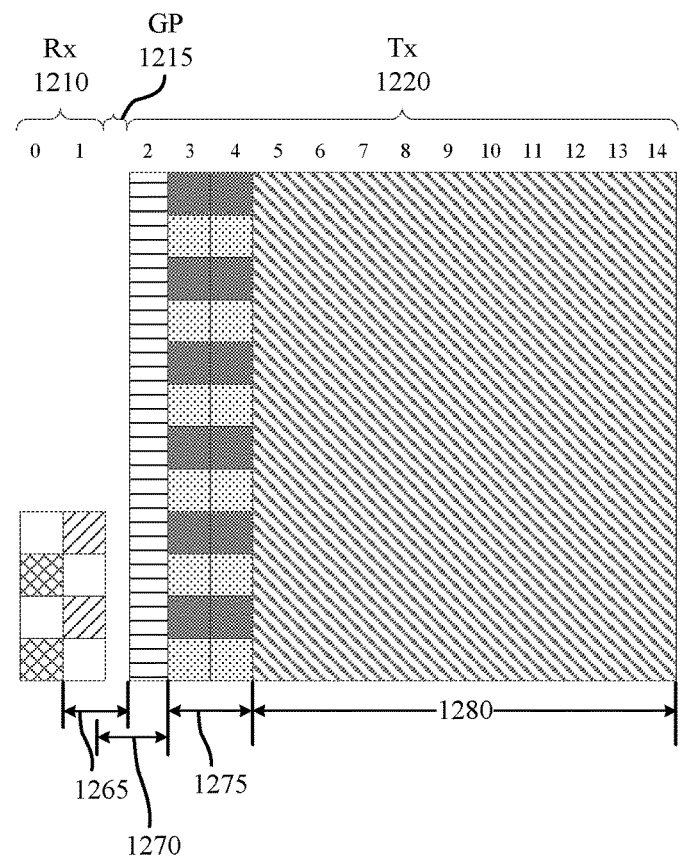
FIG. 12 illustrates an example of UE processing timelines and resources of an uplink-centric subframe that support control channel techniques for TDD subframe processing in accordance with aspects of the present disclosure.

FIG. 12 illustrates an example an UL-centric subframe 1200 that may be transmitted using partitioned control channel techniques for TDD subframe processing as described herein. In some cases, UL-centric subframe 1200 may represent aspects of techniques performed by a UE 115 or base station 105 as described with reference to FIGS. 1-2.

In the example of FIG. 12, a downlink portion 1210 of UL-centric subframe 1200 may be received at a UE, followed by a GP 1215 and uplink portion 1220 of the UL-centric subframe 1200. The downlink portion 1210 received at the UE in this example may include a first symbol that may include CRS pilot REs 1225. The second symbol received at the UE in this example may include and control symbols 1230 that include a control information such as an uplink grant and processing parameters (e.g., MCS/NDI/RV) for the UE. Following GP 1215, a non-time critical UL burst 1235 may be provided, followed by DMRS REs 1240 and 1245 that may be transmitted starting in the second uplink symbol, followed by UL data symbols 1250.

In the example of FIG. 12, the control symbols 1230 may include non-partitioned control information. During time period 1265, during symbol one and GP 1215 of the subframe 1200, the UE may perform CRS processing of CRS pilot 1225 and RF switching. During time period 1270, the UE may perform PDCCH processing of the control symbols 1230 to determine an allocation of uplink resources and associated processing parameters, and may prepare DMRS symbols 1240 and 1245 for transmission. In time period 1275, the UE may perform processing to set up the UL symbol processing pipeline to process and transmit data symbols 1250. The UE may process and transmit data symbols 1250 in time period 1280, corresponding to the remaining duration of UL portion 1220.

The insertion of UL burst symbol 1235 may relax processing timelines at both the UE and base station. The non-time-critical UL burst symbol 1235, in some examples, may carry unscheduled (or a-priori scheduled) UL transmissions, such as SRS or CQI, for example. Transmission of control information in the second DL symbol allows the base station additional time after a last UL symbol to prepare the control information, and the UL burst symbol 1235 may provide the UE with additional time for PDCCH processing and DMRS preparation.

Figure 13:
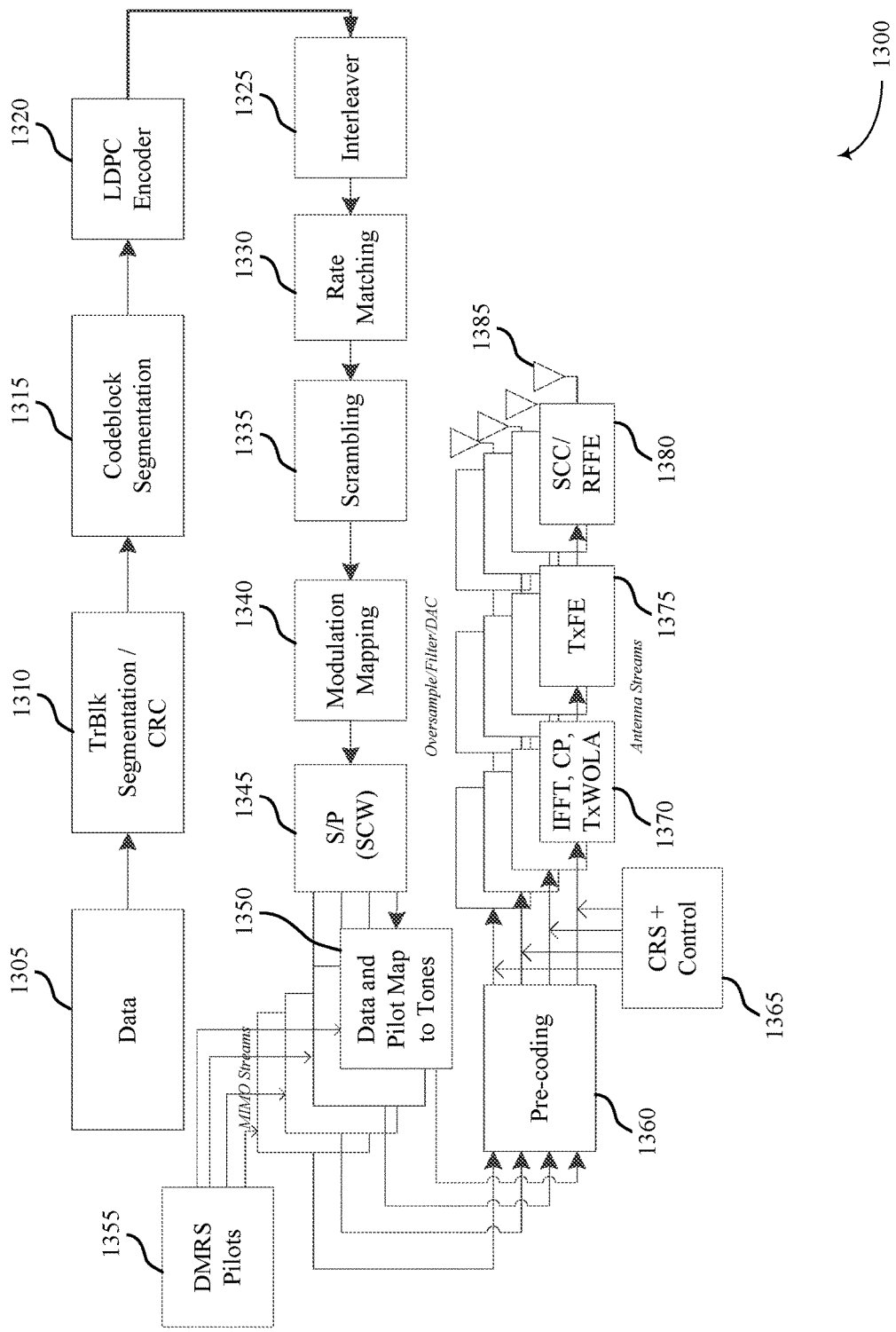
FIG. 13 illustrates an example of base station processing components that support control channel techniques for TDD subframe processing in accordance with aspects of the present disclosure.

FIG. 13 illustrates an example of base station processing components 1300 that support control channel techniques for TDD subframe transmission processing in accordance with aspects of the present disclosure. In some cases, base station processing components 1300 may perform aspects of techniques used by a UE 115 or base station 105 as described with reference to FIGS. 1-2. A data source 1305, such as a data buffer, may be coupled with a transport block segmentation and cyclic redundancy (CRC) component 1310 that may perform transport block segmentation and CRC generation for data from the data source 1305. Code block segmentation component 1315 may receive the transport blocks and perform code block (CB) segmentation. In this example, a low density parity check (LDPC) encoder may encode parity information for the CBs, and interleaver 1325 may interleave CBs.

Rate matching component 1330 may perform rate matching for data of the interleaved CBs according to a transmission rate supported by a MCS for a transmission. Scrambling component 1335 may scramble the data provided from the rate matching components 1330 according to a scrambling sequence generation technique (e.g., pseudo-random sequences for scrambling/descrambling that may be fixed across subframes or that may be dependent upon a subframe number). Modulation mapping component 1340 may perform modulation mapping of the scrambled sequence. Serial to parallel (S/P) converter 1345 may perform serial to parallel conversion for single codewords (SCW) and output the parallel codewords to tone mapper 1350 that may map data and pilots from DMRS pilot generator 1355 to tones. Pre-coder 1360 may perform precoding on the mapped tones. The precoded tones and CRS and control from CRS and control component 1365 may be provided to IFFT components 1370 that may perform IFFT, insert a CP, and perform a windowing technique such as weighted overlap and add (WOLA) for each precoded data stream, for example, and output an antenna stream to a transmitter front ends 1375. The transmitter front ends 1375 may preform signal processing on antenna streams and provide the streams to RF front end (RFFE) that may transmit the signals via antennas 1385.

Figure 14:
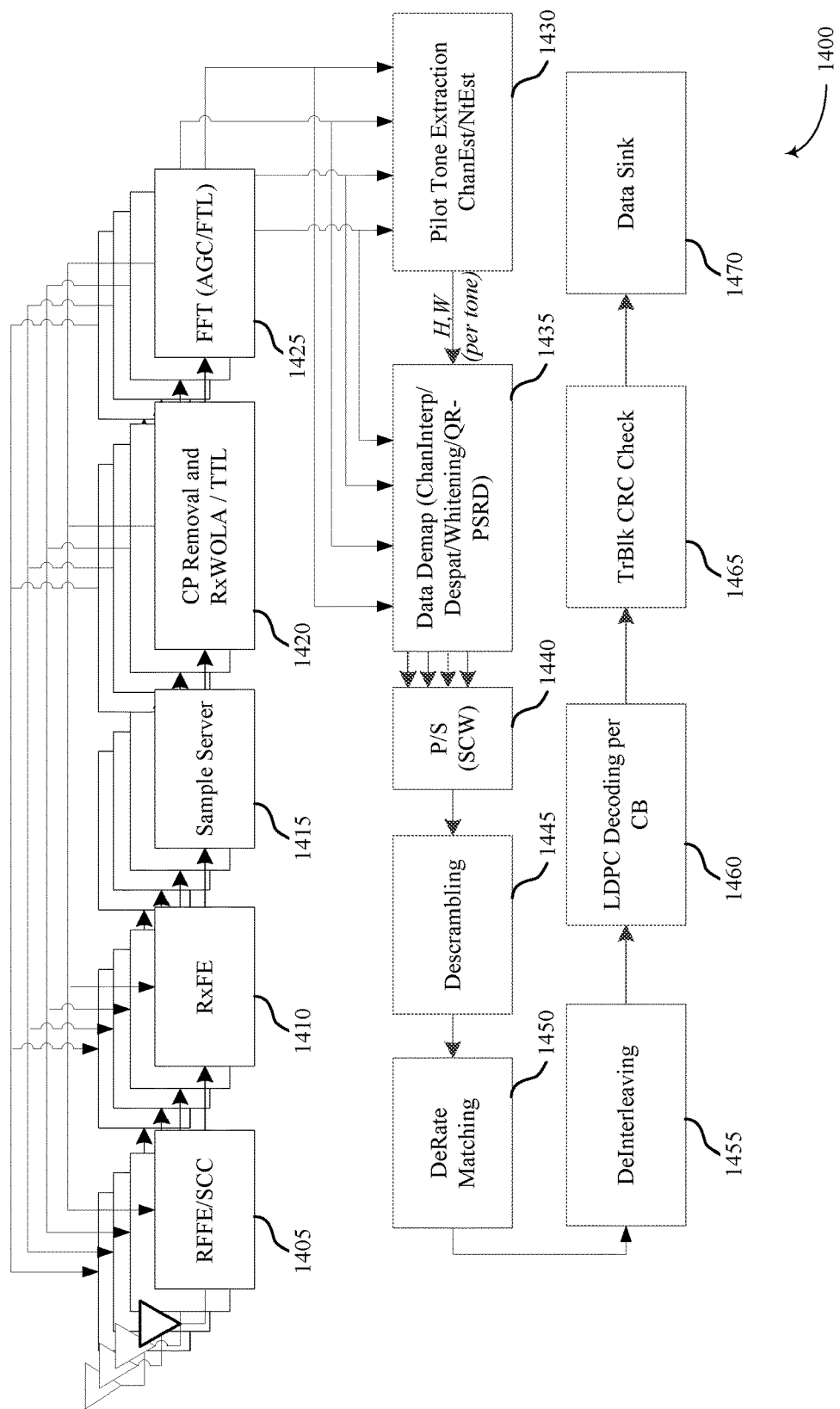
FIG. 14 illustrates an example of UE processing components that support control channel techniques for TDD subframe processing in accordance with aspects of the present disclosure.

FIG. 14 illustrates an example UE processing components 1400 that support control channel techniques for TDD subframe reception processing in accordance with aspects of the present disclosure. In some cases, UE processing components 1400 may perform aspects of techniques used by a UE 115 or base station 105 as described with reference to FIGS. 1-2. RF signals from antennas may be received at RFFE 1405 which may perform amplification and processing of received signals and provide the signals to a receiver front end (RxFE) 1410. The RxFE 1410 may perform further processing, such as digital variable gain amplification (DVGA) on the signals and provide the processed signals to a sample server 1415 that may provide samples to processor 1420 for CP removal, receive WOLA, and time tracking loop (TTL) operations on the samples. The processed samples may be provided to FFT processor 1425 that may perform FFT, automatic time offset control (ATC) and frequency tracking loop (FTL) operations. The FFT output may be provided to pilot tone extraction, channel estimation and thermal noise ($N_t$) estimation component 1430 as well as to a data demapping component 1435. Output from demapping component 1435 may be provided to a parallel to serial (P/S) converter 1440 which may output a serial codeword stream for descrambling at descrambler 1445. The descrambled codewords may be provided to derate matching component 1450 that de-rate matches the data and provides the descrambled and de-rate matched codewords to deinterleaver 1455. The deinterleaved signal is provided to LDPC decoder 1460 for LDPC decoding per code block, with decoded code blocks are provided to transport block processor 1465 for desegmantation of transport blocks and CRC checking. The output data is provided to data sink 1470 at the UE, such as an application that is receiving the data.

Figure 15:
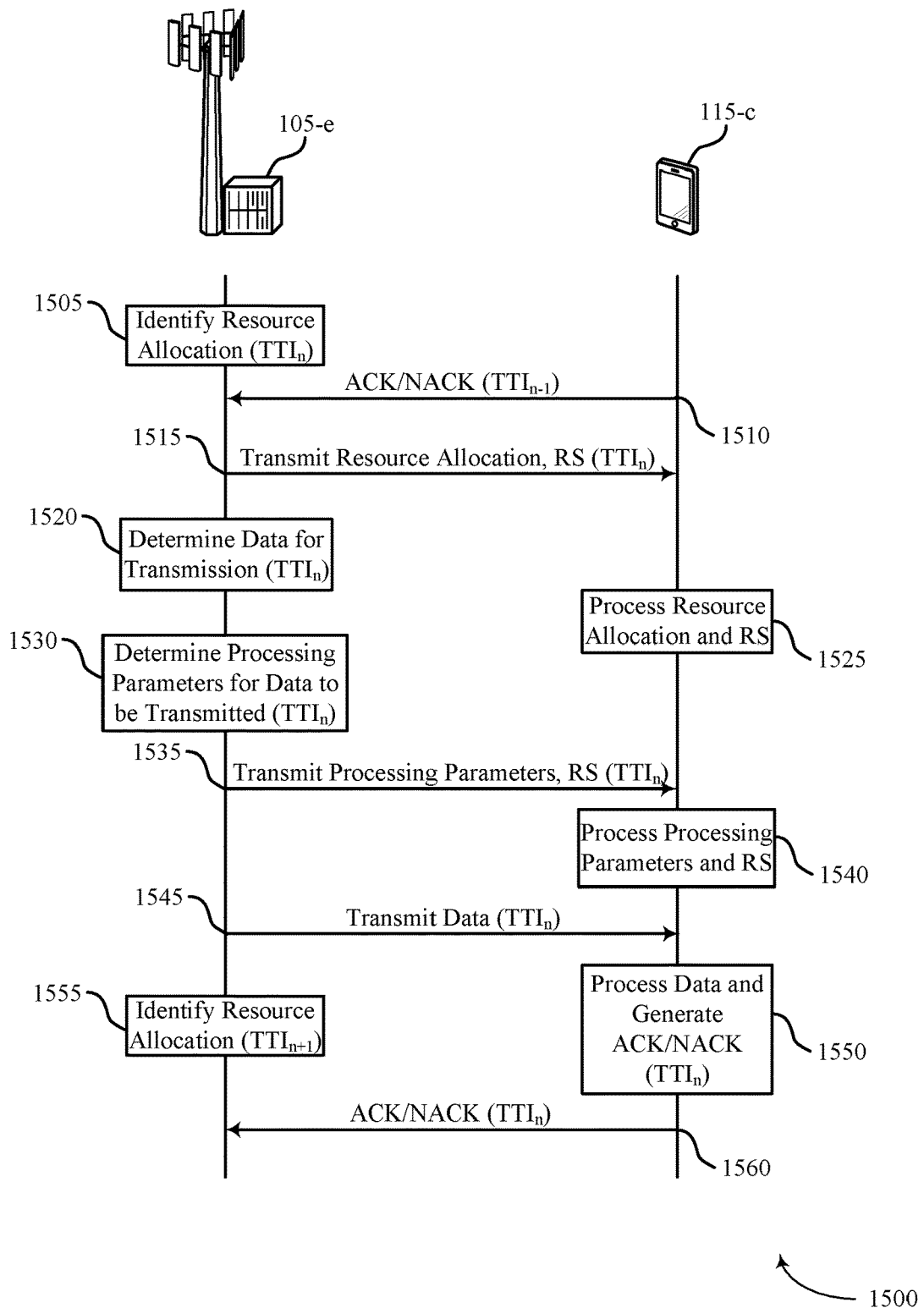
FIG. 15 illustrates an example of a process flow in a system that supports partitioned control channel techniques for TDD subframe processing in accordance with aspects of the present disclosure.

FIG. 15 illustrates an example of a process flow 1500 for partitioned control channel techniques for DL-centric TDD subframe processing in accordance with various aspects of the present disclosure. Process flow 1500 may include base station 105-*e* and UE 115-*c*, which may be examples of the corresponding devices described with reference to FIG. 1-2. The base station 105-*e*, at block 1505, may identify a resource allocation for TTI(n). This identification may be performed as part or pre-processing or non-time critical processing operations as discussed above. The base station 105-*e* may receive an ACK/NACK transmission 1510 from UE 115-*b* for TTI(n−1). Following reception of ACK/NACK transmission 1510 and after a GP, the base station 105-*e* may transmit control information including a resource allocation, and a reference signal (e.g., DMRS/CRS) 1515 to the UE 115-*c* in a first downlink symbol.

At block 1520, the base station may determine data for transmission in TTI(n). Such a determination may be made at least in part based on the ACK/NACK transmission 1510, which may be used to determine that a retransmission of prior data is needed or that new data may be transmitted. The UE 115-*c* may, at block 1525, may process the control information to determine the resource allocation. The base station, at block 1530 may determine processing parameters (e.g., MCS/NDI/RV) for the data to be transmitted in TTI(n). The may transmit processing parameters and a reference signal 1535. In some examples the processing parameters may be transmitted in a PDRICH that is transmitted in a second codeword in a second control symbol to the UE 115-*c*.

At block 1540, the UE 115-*c* may process the processing parameters and reference signals, and prepare to receive data transmissions based at least in part on allocated resources and processing parameters. The base station 105-*e* may transmit data 1545 for TTI(n). The UE 115-*c* may receive the data, process the data and generate and ACK/NACK signal for TTI(n), as indicated at block 1550. During transmission of data symbols, the base station 105-*e* may identify resources for an allocation in TTI(n+1), as indicated at block 1555. The UE 115-*c* may transmit ACK/NACK 1560 for TTI(n) based on the processing of the data symbols.

Figure 16:
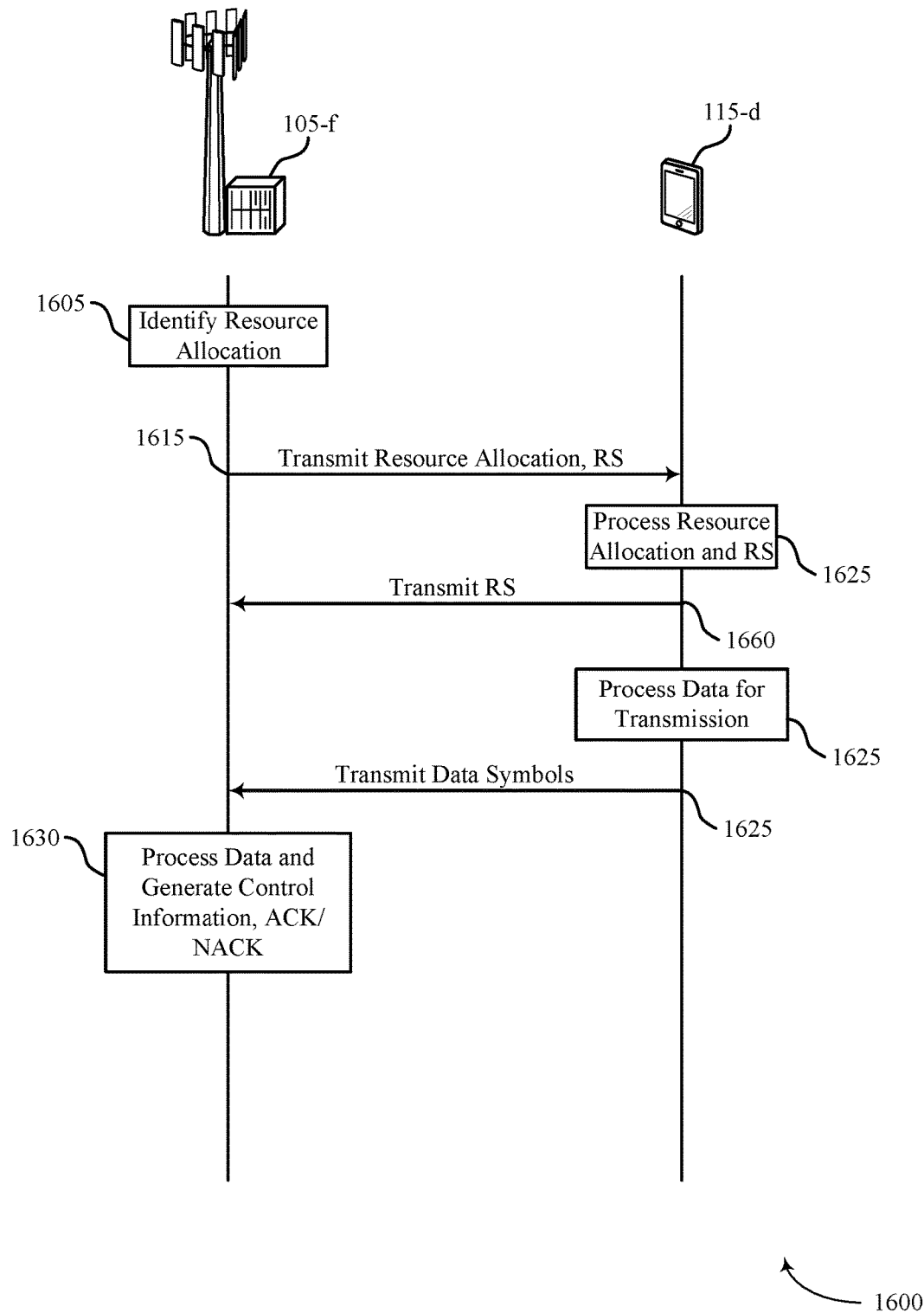
FIG. 16 illustrates another example of a process flow in a system that supports partitioned control channel techniques for TDD subframe processing in accordance with aspects of the present disclosure.

FIG. 16 illustrates an example of a process flow 1600 for partitioned control channel techniques for UL-centric TDD subframes in accordance with various aspects of the present disclosure. Process flow 1600 may include base station 105-*f* and UE 115-*d*, which may be examples of the corresponding devices described with reference to FIG. 1-2.

The base station 105-*f*, at block 1605, may identify a resource allocation for TTI(n) that may include uplink resources that UE 115-*d* may use for uplink transmissions. The base station 105-*f* may transmit the resource allocation and a reference signal 1615 to UE 115-*d*. The UE 115-*d*, at block 1625 may process the resource allocation and reference signal. The UE 115-*d*, based at least in part on the resource allocation, may transmit a reference signal 1660, such as a DMRS, to the base station in an uplink portion of the UL-centric subframe. The UE 115-*d*, at block 1625, may process data for transmission in the UL portion of the UL-centric subframe, and after processing may transmit data symbols 1625 to base station 105-*f*. The base station 105-*f* may process the UL data symbols at block 1630 and generate ACK/NACK feedback and control information based on the processed UL data symbols. The base station 105-*f*, while receiving UL symbols, may also identify a resource allocation for the UE for a subsequent subframe, which may be incorporated along with ACK/NACK information into the control information. that may be provided to the UE 115-*d* in a subsequent subframe.

Figure 17:
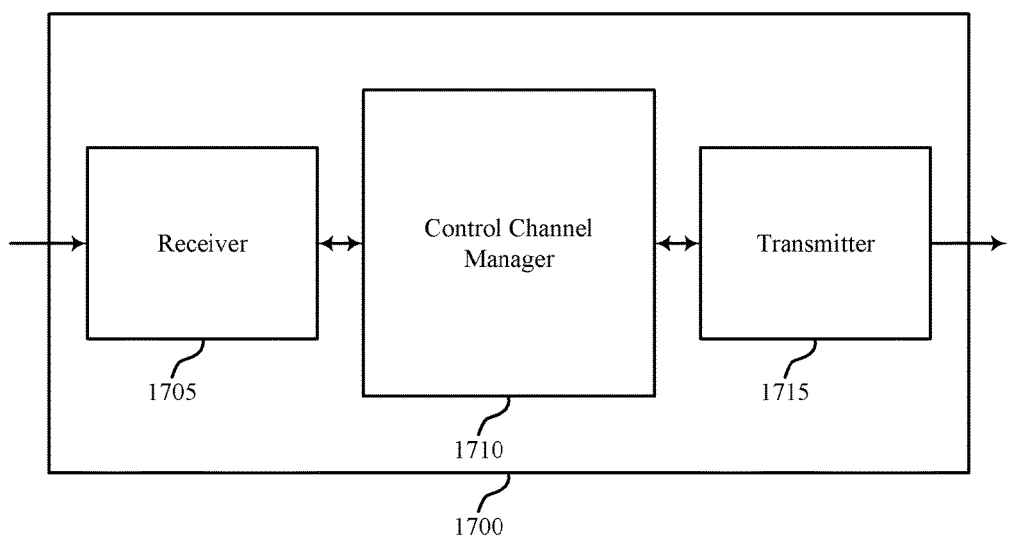
FIGS. 17 through 19 show block diagrams of a wireless device that supports control channel techniques for TDD subframe processing in accordance with aspects of the present disclosure.

FIG. 17 shows a block diagram of a wireless device 1700 that supports control channel techniques for TDD subframe processing in accordance with various aspects of the present disclosure. Wireless device 1700 may be an example of aspects of a base station 105 described with reference to FIGS. 1, 2, 15, and 16. Wireless device 1700 may include receiver 1705, control channel manager 1710 and transmitter 1715. Wireless device 1700 may also include a processor. Each of these components may be in communication with each other.

The receiver 1705 may receive information such as packets, user data, or control information associated with various information channels (e.g., control channels, data channels, and information related to partitioned control channel techniques for TDD subframe processing, etc.). Information may be passed on to other components of the device. The receiver 1705 may be an example of aspects of the transceiver 2025 described with reference to FIG. 20.

The control channel manager 1710 may identify control channel information for a first subframe to be transmitted to a UE, format at least a portion of the control channel information into a first codeword to be transmitted to the UE during a first symbol of the first subframe, and manage transmission of the first symbol of the first subframe to the UE. The control channel manager 1710 may also be an example of aspects of the base station control channel manager 101, 201, and 2005 described with reference to FIGS. 1, 2, and 20.

The transmitter 1715 may transmit signals received from other components of wireless device 1700. In some examples, the transmitter 1715 may be collocated with a receiver in a transceiver module. For example, the transmitter 1715 may be an example of aspects of the transceiver 2025 described with reference to FIG. 20. The transmitter 1715 may include a single antenna, or it may include a plurality of antennas.

Figure 18:
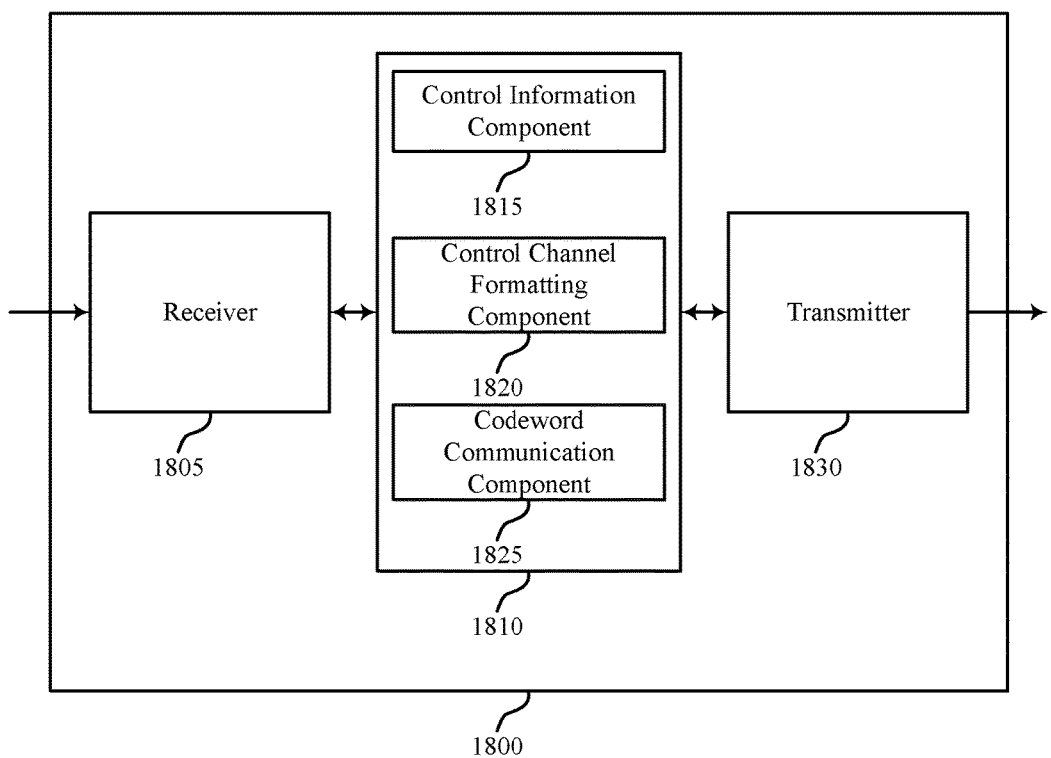

FIG. 18 shows a block diagram of a wireless device 1800 that supports partitioned control channel techniques for TDD subframe processing in accordance with various aspects of the present disclosure. Wireless device 1800 may be an example of aspects of a wireless device 1700 or a base station 105 described with reference to FIGS. 1, 2 and 15-17. Wireless device 1800 may include receiver 1805, control channel manager 1810 and transmitter 1830. Wireless device 1800 may also include a processor. Each of these components may be in communication with each other.

The receiver 1805 may receive information which may be passed on to other components of the device. The receiver 1805 may also perform the functions described with reference to the receiver 1705 of FIG. 17. The receiver 1805 may be an example of aspects of the transceiver 2025 described with reference to FIG. 20.

The control channel manager 1810 may be an example of aspects of control channel manager 1710 described with reference to FIG. 17. The control channel manager 1810 may include control information component 1815, control channel formatting component 1820 and codeword communication component 1825. The control channel manager 1810 may be an example of aspects of the base station control channel manager 101, 201, and 2005 described with reference to FIGS. 1, 2, and 20.

The control information component 1815 may identify control information that is to be provided to a UE, that may include partitioned control information that is transmitted in first and second codewords that may be transmitted to the UE in first and second DL symbols of a first subframe. In some examples, the control information component may identify a second UE that is to receive second control information formatted into a second codeword that spans one or more symbols of a second subframe. In some cases, the control information may include resource allocation information that may be identified in a prior subframe to the first subframe. In some cases, the resource allocation is based on new data being present for transmission to the UE or an assumed retransmission of data transmitted during the prior subframe.

In some cases, the control channel information includes time-critical control information formatted into the first codeword and less time-critical control information that is formatted into a second codeword to be transmitted in a second symbol of the first subframe. In some cases, the first codeword comprises PDCCH information, and the second codeword comprises PDRICH information. In some cases, the identifying control channel information comprises identifying a resource allocation for the UE for the first subframe and identifying one or more processing parameters (e.g., MCS/NDI/RV) for data to be transmitted in the first subframe.

The control channel formatting component 1820 may format at least a portion of the control channel information into a first codeword to be transmitted to the UE during a first symbol of the first subframe. In some examples, control channel formatting component 1820 may format a resource allocation for the first subframe into the first codeword for transmission in the first control symbol and may format data processing parameters into a second codeword to be transmitted in the second control symbol.

The codeword communication component 1825 may transmit the first codeword in the first symbol of the first subframe and may transmit the second codeword in the second symbol of the first subframe. In some cases, the processing parameters provided in the first codeword and second codeword comprise one or more of a MCS, a new data indicator (NDI), or redundancy version (RV), and an indication of the resource allocation may be formatted into the first codeword and one or more of the MCS, NDI, or RV may be formatted into a second codeword of control information to be transmitted to the UE during a second symbol of the first subframe.

The transmitter 1830 may transmit signals received from other components of wireless device 1800. In some examples, the transmitter 1830 may be collocated with a receiver in a transceiver module. For example, the transmitter 1830 may be an example of aspects of the transceiver 2025 described with reference to FIG. 20. The transmitter 1830 may utilize a single antenna, or it may utilize a plurality of antennas.

Figure 19:
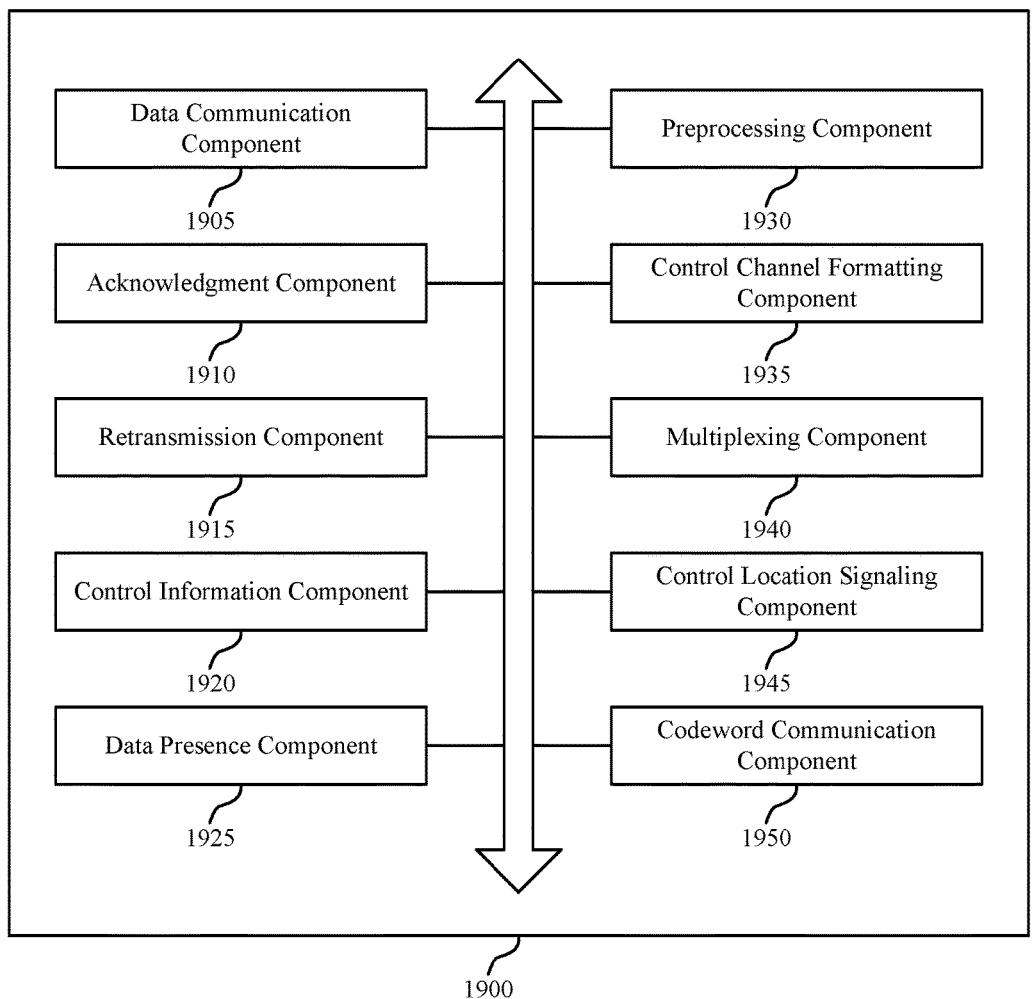

FIG. 19 shows a block diagram of a control channel manager 1900 which may be an example of the corresponding component of wireless device 1700 or wireless device 1800. That is, control channel manager 1900 may be an example of aspects of control channel manager 1710 or control channel manager 1810 described with reference to FIGS. 17 and 18. The control channel manager 1900 may also be an example of aspects of the base station control channel manager 101, 201, and 2005 described with reference to FIGS. 1, 2, and 20.

The control channel manager 1900 may include data communication component 1905, acknowledgment component 1910, retransmission component 1915, control information component 1920, data presence component 1925, preprocessing component 1930, control channel formatting component 1935, multiplexing component 1940, control location signaling component 1945 and codeword communication component 1950. Each of these modules may communicate, directly or indirectly, with one another (e.g., via one or more buses).

The data communication component 1905 may transmit one or more data RBs to the UE during at least a third symbol of the first subframe based on the resource allocation of the UE. The acknowledgment component 1910 may receive, prior to the first symbol, an ACK or NACK from the UE indicating successful or unsuccessful receipt of data transmitted in a previous subframe.

The retransmission component 1915 may determine whether the data transmitted in the previous subframe is to be retransmitted in the first subframe based on the ACK or NACK from the UE, and the one or more processing parameters may be identified based on whether the data transmitted in the previous subframe is to be retransmitted in the first subframe. In some cases, the determining whether the data transmitted in the previous subframe is to be retransmitted in the first subframe is performed at least partially during the first symbol of the first subframe.

The control information component 1920 may identify control channel information for a first subframe to be transmitted to a UE, and in some examples may identify a second UE that is to receive second control information formatted into a second codeword that spans one or more symbols of a second subframe. The data presence component 1925 may identify that no new data is present for transmission to the UE and that the data transmitted during the prior subframe is not to be retransmitted, and may format an indication that no data is to be transmitted into the second codeword of control information to be transmitted to the UE.

The preprocessing component 1930 may manage preprocessing at least a portion of the new data for transmission to the UE during the first subframe during the prior subframe. In some cases, the preprocessing comprises generating a first waveform for transmission of at least the portion of the new data using at least some of base station transmission components 1300 described above with respect to FIG. 13. In some cases, the preprocessing further comprises generating a second waveform for retransmission of the data transmitted during the prior subframe. In some cases, the preprocessing comprises preprocessing the new data up to a rate-matching stage, a tone mapping stage, a modulation stage, a precoding stage, or an inverse fast Fourier transform (IFFT) stage, such as through components discussed with respect to FIG. 13.

The control channel formatting component 1935 may format at least a portion of the control channel information into a first codeword to be transmitted to the UE during a first symbol of the first subframe, and in some examples may format a second portion of the control channel information into a second codeword to be transmitted to the UE during a second symbol of the first subframe. The codeword communication component 1950 may transmit the first codeword to the UE during the first symbol, and may transmit the second codeword to the UE during the second symbol.

The multiplexing component 1940 may multiplex transmissions between UEs that may use partitioned and non-partitioned control. The control location signaling component 1945 may signal a UE indicating whether control information is to be transmitted in the first codeword within the first symbol or in the second codeword that spans the one or more symbols.

Figure 20:
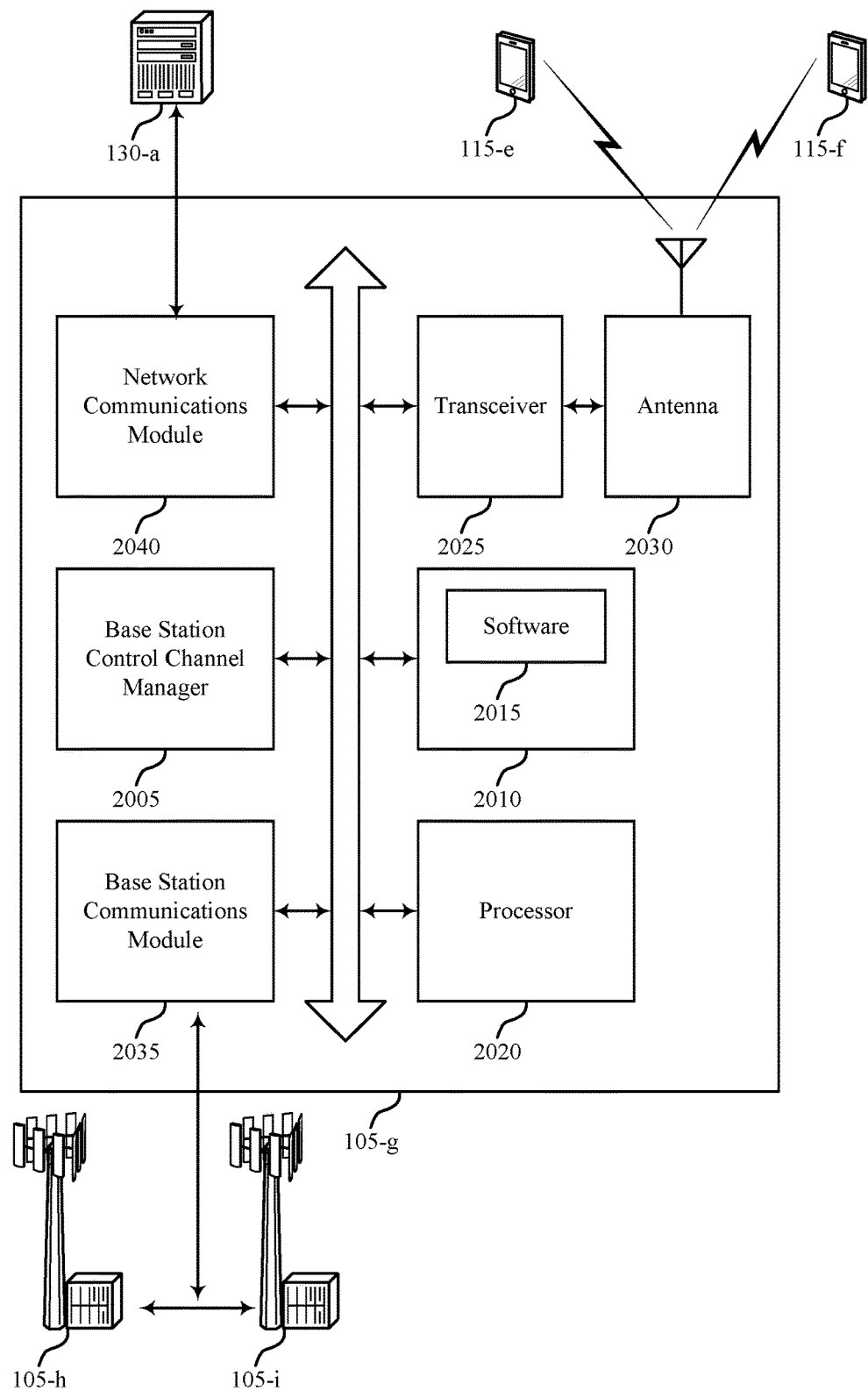
FIG. 20 illustrates a block diagram of a system including a base station that supports control channel techniques for TDD subframe processing in accordance with aspects of the present disclosure.

FIG. 20 shows a diagram of a wireless system 2000 including a device configured that supports control channel techniques for TDD subframe processing in accordance with various aspects of the present disclosure. For example, system 2000 may include base station 105-g, which may be an example of a wireless device 1700, a wireless device 1800, or a base station 105 as described with reference to FIGS. 1, 2 and 15 through 19. Base station 105-g may also include components for bi-directional voice and data communications including components for transmitting communications and components for receiving communications, such as components described with reference to FIG. 13. For example, base station 105-g may communicate bi-directionally with one or more UEs 115.

Base station 105-g may include base station control channel manager 2005, memory 2010, processor 2020, transceiver 2025, antenna 2030, base station communications module 2035 and network communications module 2040. Each of these modules may communicate, directly or indirectly, with one another (e.g., via one or more buses). The base station control channel manager 2005 may be an example of a control channel manager as described with reference to FIGS. 17 through 19, or base station control channel manager as descried with reference to FIGS. 1-2.

The memory 2010 may include random access memory (RAM) and read only memory (ROM). The memory 2010 may store computer-readable, computer-executable software including instructions that, when executed, cause the processor to perform various functions described herein (e.g., partitioned control channel techniques for TDD subframe processing, etc.). In some cases, the software 2015 may not be directly executable by the processor but may cause a computer (e.g., when compiled and executed) to perform functions described herein. The processor 2020 may include an intelligent hardware device, (e.g., a central processing unit (CPU), a microcontroller, an application specific integrated circuit (ASIC), etc.)

The transceiver 2025 may communicate bi-directionally, via one or more antennas, wired, or wireless links, with one or more networks, as described above. For example, the transceiver 2025 may communicate bi-directionally with a base station 105 or a UE 115. The transceiver 2025 may also include a modem to modulate the packets and provide the modulated packets to the antennas for transmission, and to demodulate packets received from the antennas. In some cases, the wireless device may include a single antenna 2030. However, in some cases the device may have more than one antenna 2030, which may be capable of concurrently transmitting or receiving multiple wireless transmissions.

The base station communications module 2035 may manage communications with other base station 105, and may include a controller or scheduler for controlling communications with UEs 115 in cooperation with other base stations 105. For example, the base station communications module 2035 may coordinate scheduling for transmissions to UEs 115 for various interference mitigation techniques such as beamforming or joint transmission. In some examples, base station communications module 2035 may provide an X2 interface within wireless communication network technology to provide communication between base stations 105.

The network communications module 2040 may manage communications with the core network (e.g., via one or more wired backhaul links). For example, the network communications module 2040 may manage the transfer of data communications for client devices, such as one or more UEs 115.

Figure 21:
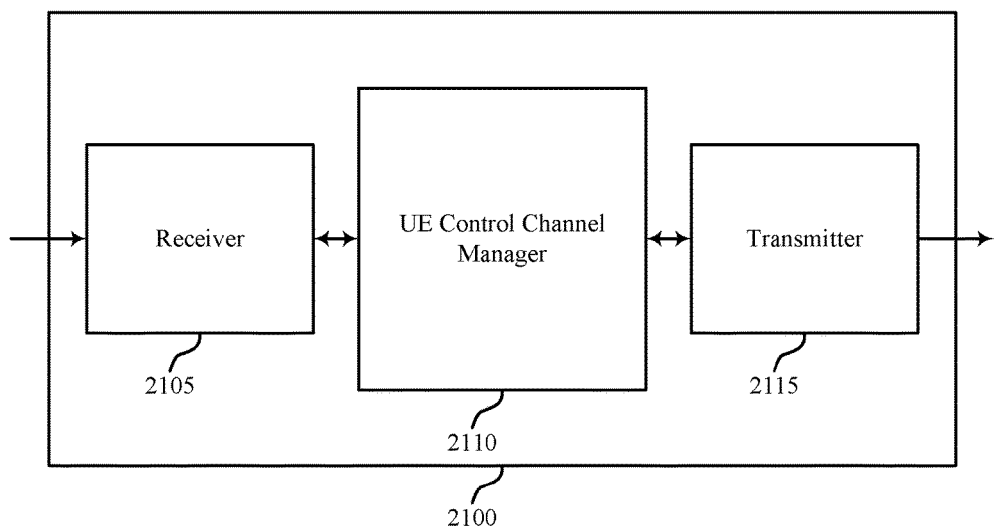
FIGS. 21 through 23 show block diagrams of a wireless device that supports control channel techniques for TDD subframe processing in accordance with aspects of the present disclosure.

FIG. 21 shows a block diagram of a wireless device 2100 that supports control channel techniques for TDD subframe processing in accordance with various aspects of the present disclosure. Wireless device 2100 may be an example of aspects of a UE 115 described with reference to FIGS. 1, 2, and 15-16. Wireless device 2100 may include receiver 2105, UE control channel manager 2110 and transmitter 2115. Wireless device 2100 may also include a processor. Each of these components may be in communication with each other.

The receiver 2105 may receive information such as packets, user data, or control information associated with various information channels (e.g., control channels, data channels, and information related to partitioned control channel techniques for TDD subframe processing, etc.). Information may be passed on to other components of the device. The receiver 2105 may be an example of aspects of the transceiver 2425 described with reference to FIG. 24.

The UE control channel manager 2110 may receive a first symbol of a subframe, the first symbol comprising a first codeword of control information associated with the subframe, identify resources of the subframe allocated to the UE based on the first codeword of the control information, and decode one or more RBs of the subframe based on the resources of the subframe allocated to the UE.

The UE control channel manager 2110 may also receive a first DL symbol of an uplink-centric subframe, the first DL symbol comprising a first codeword of control information associated with the uplink-centric subframe, identify UL resources of the uplink-centric subframe allocated to the UE based on the first codeword of the control information, and transmit one or more UL symbols in the resources of the uplink-centric subframe allocated to the UE. The UE control channel manager 2110 may also be an example of aspects of the UE control channel manager 2405 described with reference to FIG. 24 or UE control channel manager 102 and 202 described with reference to FIGS. 1-2.

The transmitter 2115 may transmit signals received from other components of wireless device 2100. In some examples, the transmitter 2115 may be collocated with a receiver in a transceiver module. For example, the transmitter 2115 may be an example of aspects of the transceiver 2425 described with reference to FIG. 24. The transmitter 2115 may include a single antenna, or it may include a plurality of antennas.

Figure 22:
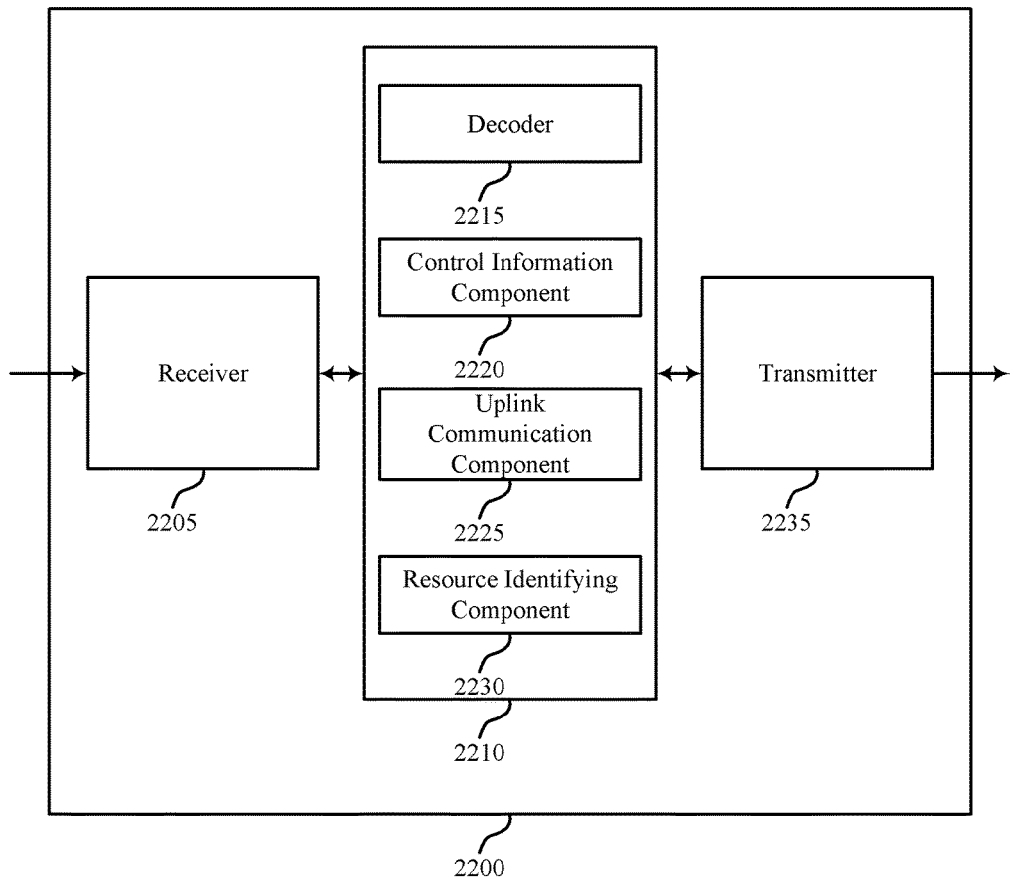

FIG. 22 shows a block diagram of a wireless device 2200 that supports control channel techniques for TDD subframe processing in accordance with various aspects of the present disclosure. Wireless device 2200 may be an example of aspects of a wireless device 2100 or a UE 115 described with reference to FIGS. 1, 2, 15, 16, and 21. Wireless device 2200 may include receiver 2205, UE control channel manager 2210 and transmitter 2235. Wireless device 2200 may also include a processor. Each of these components may be in communication with each other.

The receiver 2205 may receive information which may be passed on to other components of the device. The receiver 2205 may also perform the functions described with reference to the receiver 2105 of FIG. 21. The receiver 2205 may be an example of aspects of the transceiver 2425 described with reference to FIG. 24.

The UE control channel manager 2210 may be an example of aspects of control channel manager 2110 described with reference to FIG. 21. The UE control channel manager 2210 may include decoder 2215, control information component 2220, uplink communication component 2225 and resource identifying component 2230. The UE control channel manager 2210 may be an example of aspects of the UE control channel manager 2405 described with reference to FIG. 24 or UE control channel manager 102 and 202 described with reference to FIGS. 1-2.

The decoder 2215 may decode one or more RBs of the subframe based on the resources of the subframe allocated to the UE. In some examples, the decoder 2215 may decode data symbols starting at a third symbol of the subframe, based on the resource allocation received in first control information in a first symbol, and based on MCS, NDI, or RV information received in second control information in a second symbol.

The control information component 2220 may receive a first symbol of a subframe, the first symbol comprising a first codeword of control information associated with the subframe, and receive a second symbol of the subframe, the second symbol comprising a second codeword of the control information associated with the subframe. The control information component 2220 may identify one or more of a MCS, NDI, or RV for data transmitted in the subframe based on the second codeword of the control information.

The control information component 2220 may also receive a first DL symbol of an uplink-centric subframe, the first DL symbol comprising a first codeword of control information associated with the uplink-centric subframe, receive a second DL symbol of the uplink-centric subframe that comprises a second codeword of the control information associated with the uplink-centric subframe, and identify one or more of a MCS, a NDI, or RV for data transmitted in the one or more UL symbols of the uplink-centric subframe based on the second codeword of the control information.

In some cases, the first codeword includes time-critical control information and the second codeword includes less time-critical control information than the first codeword. In some cases, the first codeword comprises PDCCH information, and the second codeword comprises PDRICH information.

The uplink communication component 2225 may transmit one or more UL symbols in the resources of the uplink-centric subframe allocated to the UE. In some cases, the one or more UL symbols are transmitted after a UL burst symbol that follows the DL symbol of the uplink-centric subframe. The resource identifying component 2230 may identify resources of the subframe allocated to the UE based on the first codeword of the control information.

The transmitter 2235 may transmit signals received from other components of wireless device 2200. In some examples, the transmitter 2235 may be collocated with a receiver in a transceiver module. For example, the transmitter 2235 may be an example of aspects of the transceiver 2425 described with reference to FIG. 24. The transmitter 2235 may utilize a single antenna, or it may utilize a plurality of antennas.

Figure 23:
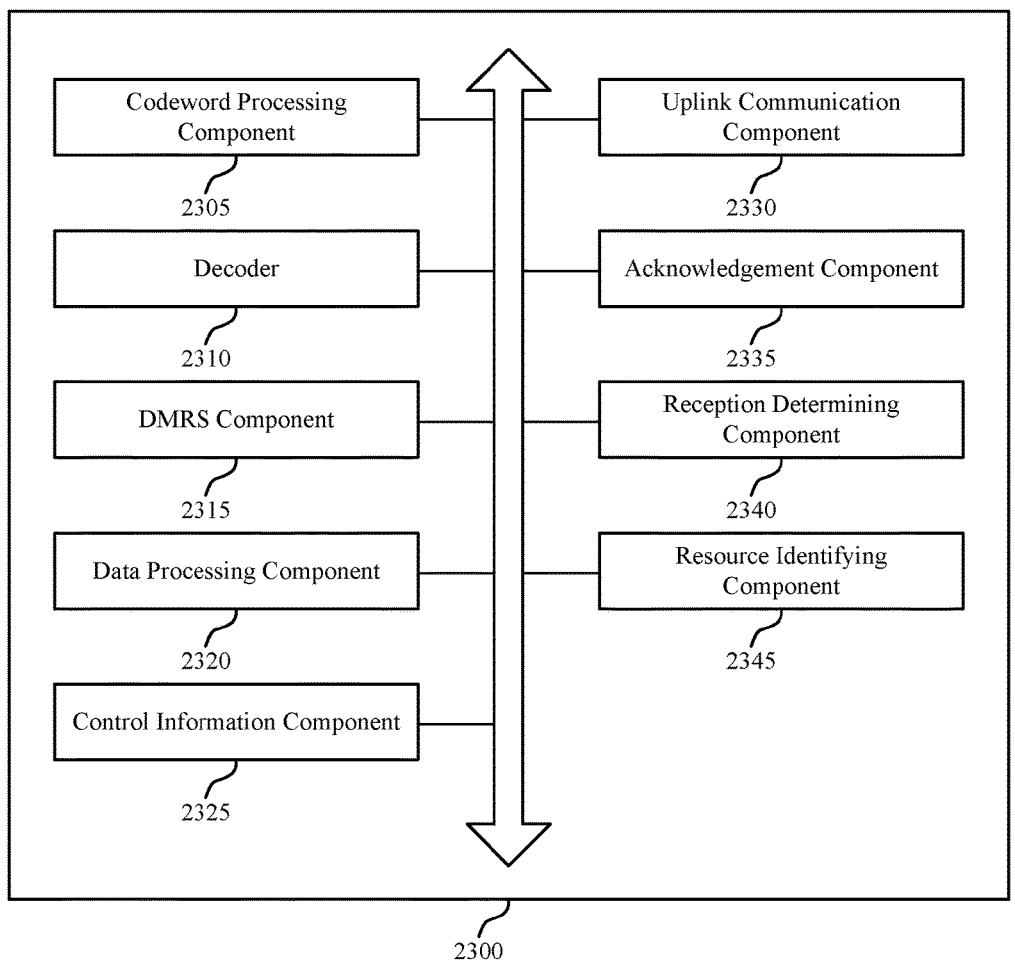

FIG. 23 shows a block diagram of a UE control channel manager 2300 which may be an example of the corresponding component of wireless device 2100 or wireless device 2200. That is, UE control channel manager 2300 may be an example of aspects of UE control channel manager 2110 or UE control channel manager 2210 described with reference to FIGS. 21 and 22. The UE control channel manager 2300 may also be an example of aspects of the UE control channel manager 2405 described with reference to FIG. 24 or UE control channel manager 102 and 202 described with reference to FIGS. 1-2.

The UE control channel manager 2300 may include codeword processing component 2305, decoder 2310, DMRS component 2315, data processing component 2320, control information component 2325, uplink communication component 2330, acknowledgement component 2335, reception determining component 2340 and resource identifying component 2345. Each of these modules may communicate, directly or indirectly, with one another (e.g., via one or more buses).

The codeword processing component 2305 may in some cases, identify the resources of the subframe allocated to the UE based on control information in received codewords. The resources may be identified by, for example, processing the first codeword during the receiving of a second symbol. The decoder 2310 may decode one or more RBs of the subframe based on the resources of the subframe allocated to the UE, starting at a third symbol of the subframe based on the resource allocation, and processing parameters such as MCS, NDI, or RV.

The DMRS component 2315 may decode a DMRS received in one or more of the first symbol or the second symbol based on the processing the first codeword, and process the DMRS during reception of a third symbol of the subframe. The data processing component 2320 may process one or more data RBs received starting in the third symbol during reception of a fourth symbol of the subframe.

The control information component 2325 may receive a first symbol of a subframe that includes a first codeword of control information associated with the subframe, and receive a second symbol of the subframe that includes a second codeword of the control information associated with the subframe. A resource allocation may be identified based on the first codeword and one or more of a MCS, NDI, or RV for data transmitted in the subframe may be identified based on the second codeword of the control information.

The control information component 2325 may also receive a first DL symbol of an UL-centric subframe that includes a first codeword of control information associated with the UL-centric subframe, and receive a second DL symbol of the UL-centric subframe that includes a second codeword of the control information associated with the UL-centric subframe. The control information component 2325 also may identify one or more of a MCS, NDI, or RV for data transmitted in the one or more UL symbols of the UL-centric subframe based on the second codeword of the control information.

The uplink communication component 2330 may transmit one or more UL symbols in the resources of the UL-centric subframe allocated to the UE. In some cases, the one or more UL symbols are transmitted after an UL burst symbol that follows the DL symbol of the uplink-centric subframe.

The acknowledgement component 2335 may generate an ACK or NACK of reception of the data, and transmit the ACK/NACK in an UL portion of the subframe. The reception determining component 2340 may determine that data of the one or more RBs is successfully received.

The resource identifying component 2345 may identify resources of the subframe allocated to the UE based on the first codeword of the control information. Such identification may be performed by processing the first codeword during a second symbol of the subframe.

Figure 24:
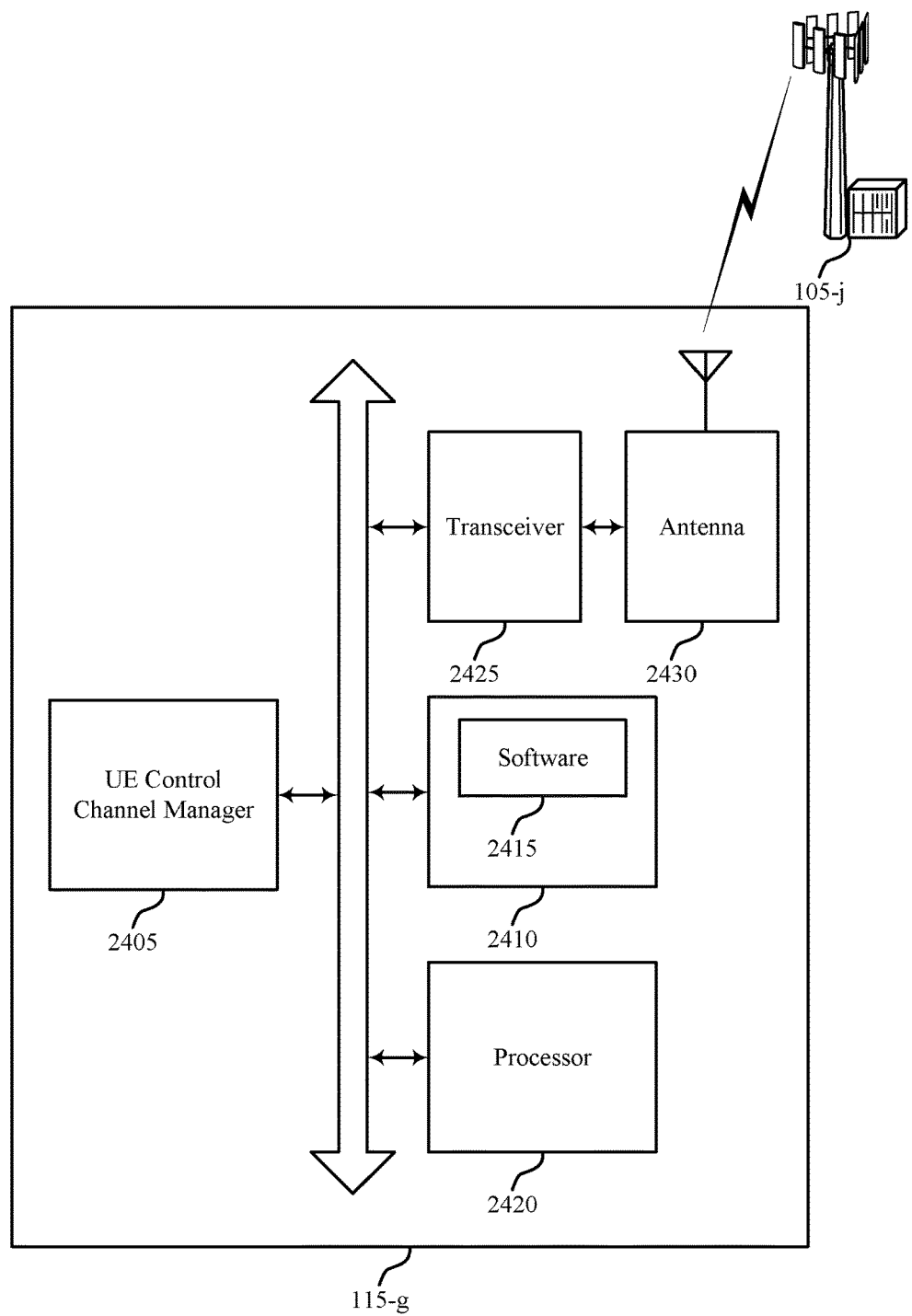
FIG. 24 illustrates a block diagram of a system including a UE that supports control channel techniques for TDD subframe processing in accordance with aspects of the present disclosure.

FIG. 24 shows a diagram of a system 2400 including a device that supports partitioned control channel techniques for TDD subframe processing in accordance with various aspects of the present disclosure. For example, system 2400 may include UE 115-g, which may be an example of a wireless device 2100, a wireless device 2200, or a UE 115 as described with reference to FIGS. 1, 2, 15, 16, and 21 through 23.

UE 115-g may also include UE control channel manager 2405, memory 2410, processor 2420, transceiver 2425, antenna 2430 and additional module 2435. Each of these modules may communicate, directly or indirectly, with one another (e.g., via one or more buses). The UE control channel manager 2405 may be an example of a control channel manager as described with reference to FIGS. 21 through 23.

The memory 2410 may include RAM and ROM. The memory 2410 may store computer-readable, computer-executable software including instructions that, when executed, cause the processor to perform various functions described herein (e.g., partitioned control channel techniques for TDD subframe processing, etc.). In some cases, the software 2415 may not be directly executable by the processor but may cause a computer (e.g., when compiled and executed) to perform functions described herein. The processor 2420 may include an intelligent hardware device, (e.g., a CPU, a microcontroller, an ASIC, etc.)

The transceiver 2425 may communicate bi-directionally, via one or more antennas, wired, or wireless links, with one or more networks, as described above. For example, the transceiver 2425 may communicate bi-directionally with a base station 105 or a UE 115. The transceiver 2425 may also include a modem to modulate the packets and provide the modulated packets to the antennas for transmission, and to demodulate packets received from the antennas. In some cases, the wireless device may include a single antenna 2430. However, in some cases the device may have more than one antenna 2030, which may be capable of concurrently transmitting or receiving multiple wireless transmissions. In some examples, transceiver 2425 may include one or more components as described with reference to FIG. 14.

Figure 25:
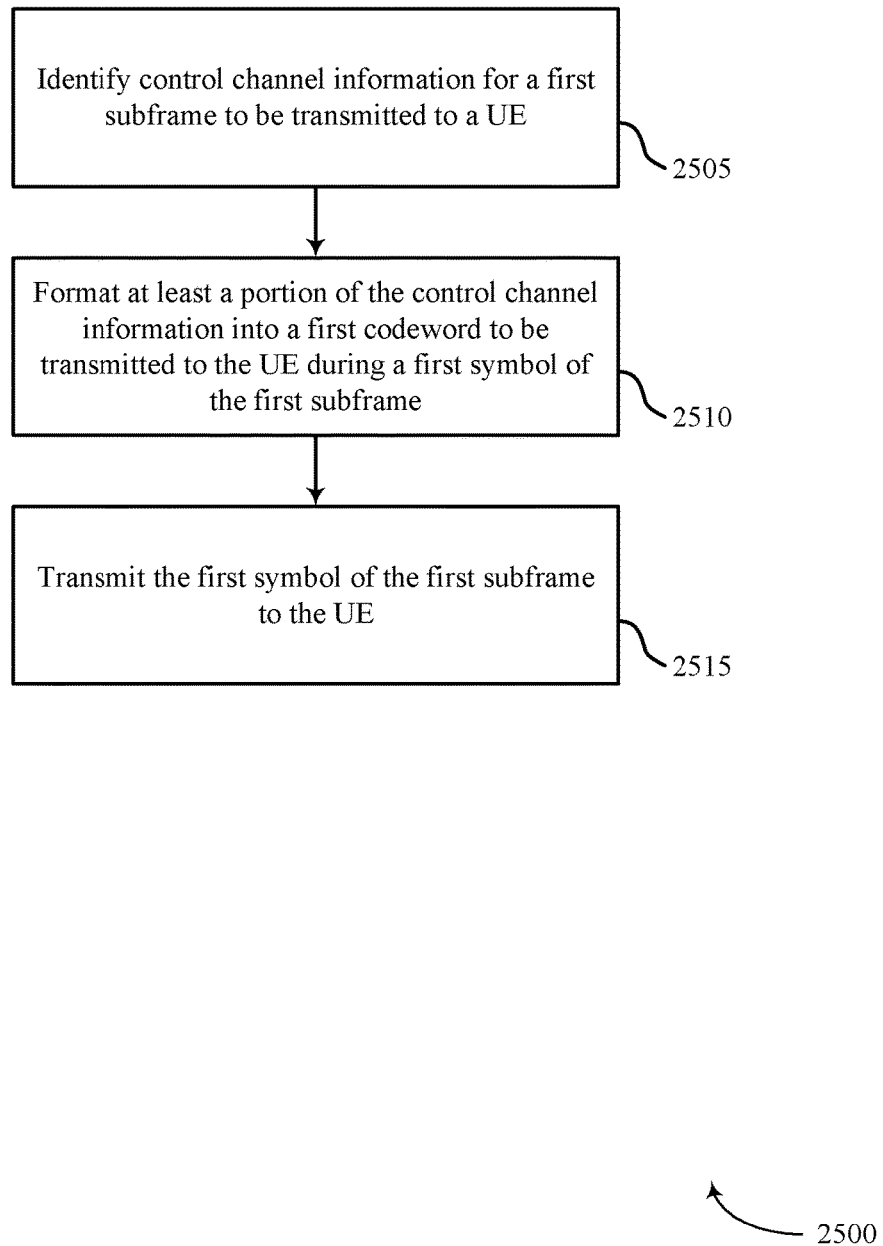
FIGS. 25 through 30 illustrate methods for control channel techniques for TDD subframe processing in accordance with aspects of the present disclosure.

FIG. 25 shows a flowchart illustrating a method 2500 for partitioned control channel techniques for TDD subframe processing in accordance with various aspects of the present disclosure. The operations of method 2500 may be implemented by a device such as a base station 105 or its components as described with reference to FIGS. 1 and 2. For example, the operations of method 2500 may be performed by the base station control channel manager as described herein. In some examples, the base station 105 may execute a set of codes to control the functional elements of the device to perform the functions described below. Additionally or alternatively, the base station 105 may perform aspects the functions described below using special-purpose hardware.

At block 2505, the base station 105 may identify control channel information for a first subframe to be transmitted to a UE as described above with reference to FIGS. 2 through 16. In certain examples, the operations of block 2505 may be performed by the control information component as described with reference to FIGS. 18 and 19.

At block 2510, the base station 105 may format at least a portion of the control channel information into a first codeword to be transmitted to the UE during a first symbol of the first subframe as described above with reference to FIGS. 2 through 16. In certain examples, the operations of block 2510 may be performed by the control channel formatting component as described with reference to FIGS. 18 and 19.

At block 2515, the base station 105 may transmit the first symbol of the first subframe to the UE as described above with reference to FIGS. 2 through 16. In certain examples, the operations of block 2515 may be performed by the codeword communication component as described with reference to FIGS. 18 and 19.

Figure 26:
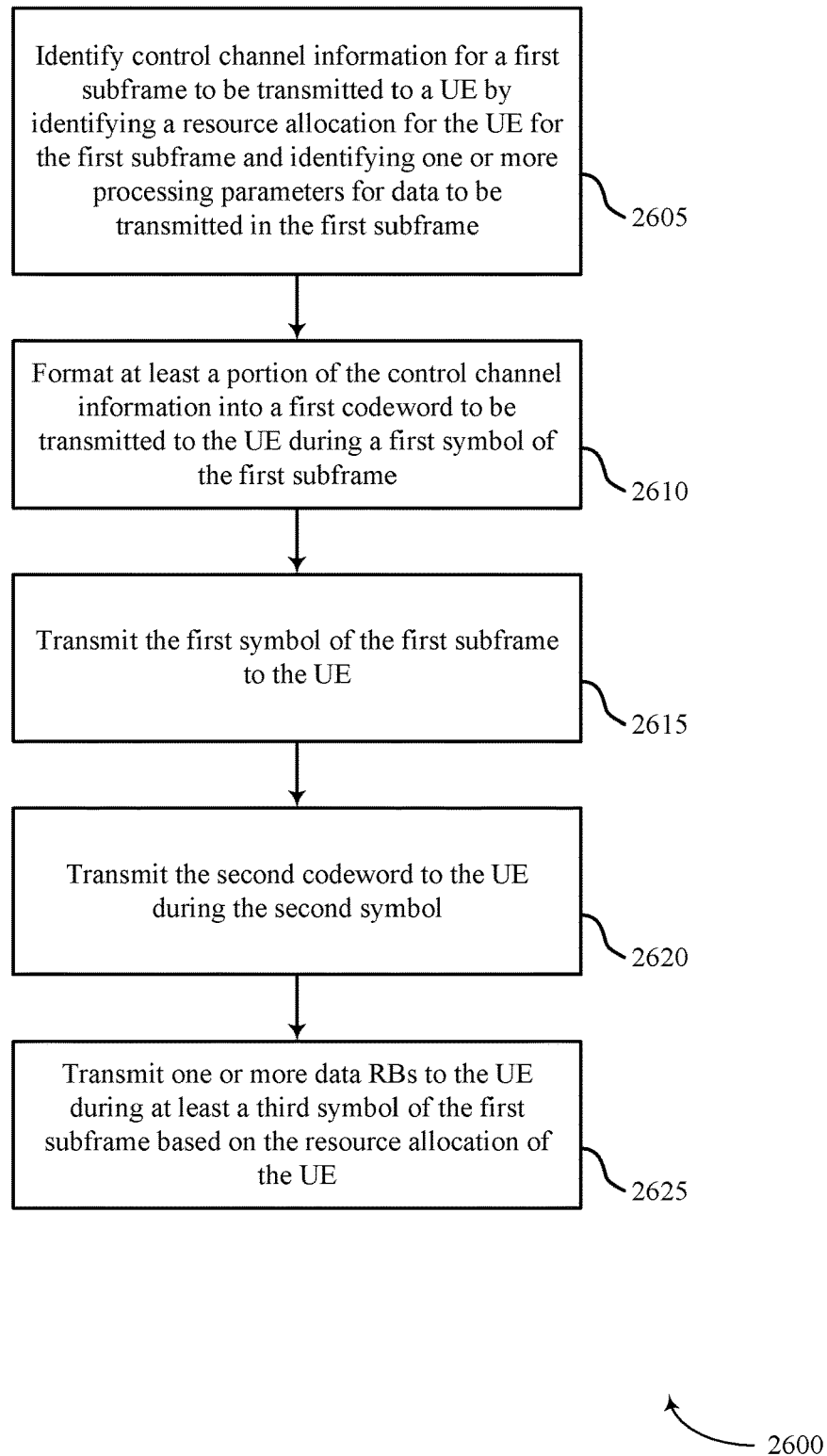

FIG. 26 shows a flowchart illustrating a method 2600 for partitioned control channel techniques for TDD subframe processing in accordance with various aspects of the present disclosure. The operations of method 2600 may be implemented by a device such as a base station 105 or its components as described with reference to FIGS. 1 and 2. For example, the operations of method 2600 may be performed by the base station control channel manager as described herein. In some examples, the base station 105 may execute a set of codes to control the functional elements of the device to perform the functions described below. Additionally or alternatively, the base station 105 may perform aspects the functions described below using special-purpose hardware.

At block 2605, the base station 105 may identify control channel information for a first subframe to be transmitted to a UE as described above with reference to FIGS. 2 through 16. In some cases, the identifying control channel information comprises identifying a resource allocation for the UE for the first subframe and identifying one or more processing parameters for data to be transmitted in the first subframe. In certain examples, the operations of block 2605 may be performed by the control information component as described with reference to FIGS. 18 and 19.

At block 2610, the base station 105 may format at least a portion of the control channel information into a first codeword to be transmitted to the UE during a first symbol of the first subframe as described above with reference to FIGS. 2 through 16. In certain examples, the operations of block 2610 may be performed by the control channel formatting component as described with reference to FIGS. 18 and 19.

At block 2615, the base station 105 may transmit the first symbol of the first subframe to the UE as described above with reference to FIGS. 2 through 16. In certain examples, the operations of block 2615 may be performed by the codeword communication component as described with reference to FIGS. 18 and 19.

At block 2620, the base station 105 may transmit the second codeword to the UE during the second symbol as described above with reference to FIGS. 2 through 16. In certain examples, the operations of block 2620 may be performed by the codeword communication component as described with reference to FIGS. 18 and 19.

At block 2625, the base station 105 may transmit one or more data RBs to the UE during at least a third symbol of the first subframe based on the resource allocation of the UE as described above with reference to FIGS. 2 through 16. In certain examples, the operations of block 2625 may be performed by the data communication component as described with reference to FIGS. 18 and 19.

Figure 27:
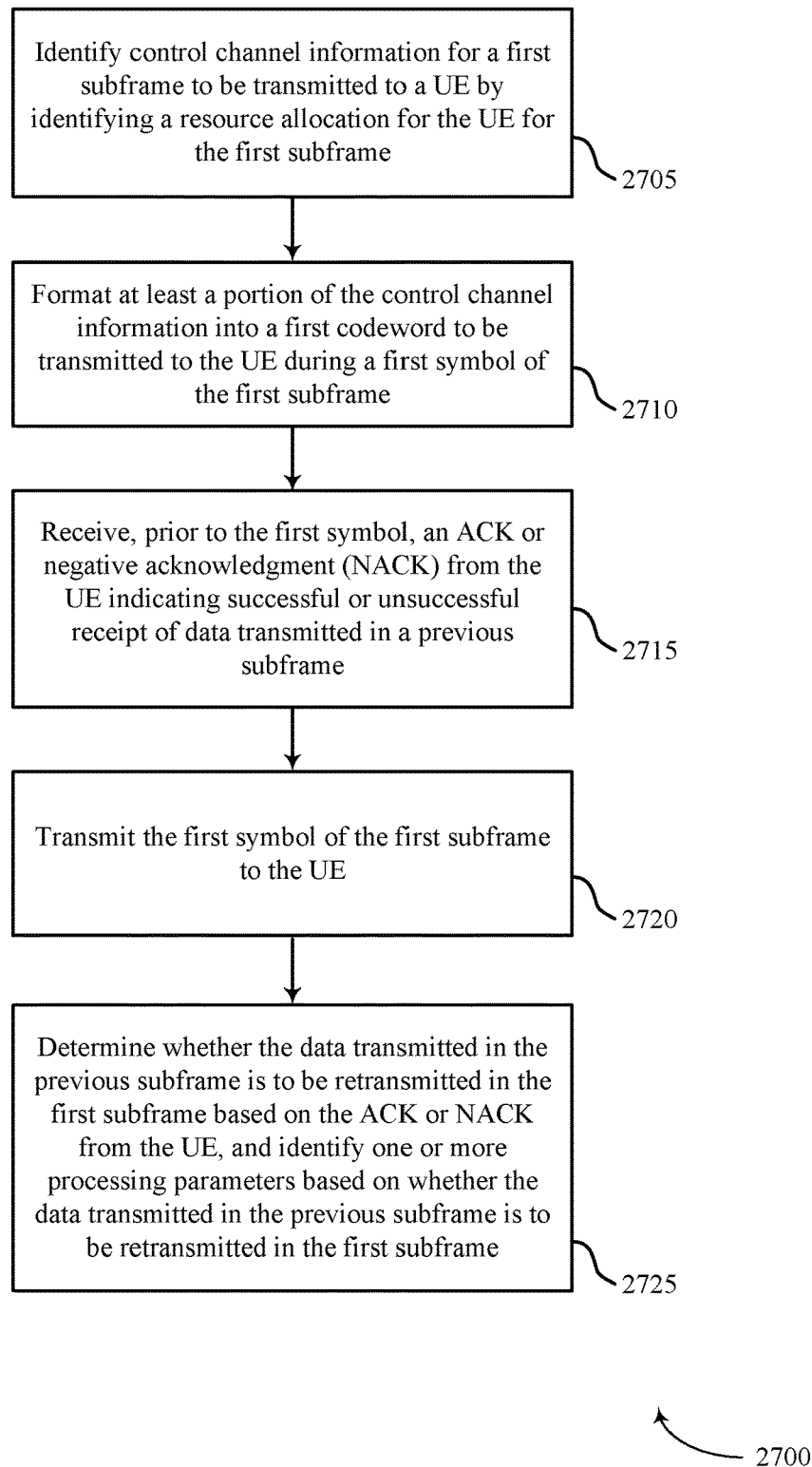

FIG. 27 shows a flowchart illustrating a method 2700 for partitioned control channel techniques for TDD subframe processing in accordance with various aspects of the present disclosure. The operations of method 2700 may be implemented by a device such as a base station 105 or its components as described with reference to FIGS. 1 and 2. For example, the operations of method 2700 may be performed by the base station control channel manager as described herein. In some examples, the base station 105 may execute a set of codes to control the functional elements of the device to perform the functions described below. Additionally or alternatively, the base station 105 may perform aspects the functions described below using special-purpose hardware.

At block 2705, the base station 105 may identify control channel information for a first subframe to be transmitted to a UE as described above with reference to FIGS. 2 through 16. In some cases, the identifying control channel information comprises identifying a resource allocation for the UE for the first subframe and identifying one or more processing parameters for data to be transmitted in the first subframe. In certain examples, the operations of block 2705 may be performed by the control information component as described with reference to FIGS. 18 and 19.

At block 2710, the base station 105 may format at least a portion of the control channel information into a first codeword to be transmitted to the UE during a first symbol of the first subframe as described above with reference to FIGS. 2 through 16. In certain examples, the operations of block 2710 may be performed by the control channel formatting component as described with reference to FIGS. 18 and 19.

At block 2715, the base station 105 may receive, prior to the first symbol, an ACK or negative acknowledgment (NACK) from the UE indicating successful or unsuccessful receipt of data transmitted in a previous subframe as described above with reference to FIGS. 2 through 16. In certain examples, the operations of block 2715 may be performed by the acknowledgment component as described with reference to FIGS. 18 and 19.

At block 2720, the base station 105 may transmit the first symbol of the first subframe to the UE as described above with reference to FIGS. 2 through 16. In certain examples, the operations of block 2720 may be performed by the codeword communication component as described with reference to FIGS. 18 and 19.

At block 2725, the base station 105 may determine whether the data transmitted in the previous subframe is to be retransmitted in the first subframe based on the ACK or NACK from the UE, and identify one or more processing parameters based on whether the data transmitted in the previous subframe is to be retransmitted in the first subframe, as described above with reference to FIGS. 2 through 16. In certain examples, the operations of block 2725 may be performed by the retransmission component as described with reference to FIGS. 18 and 19.

Figure 28:
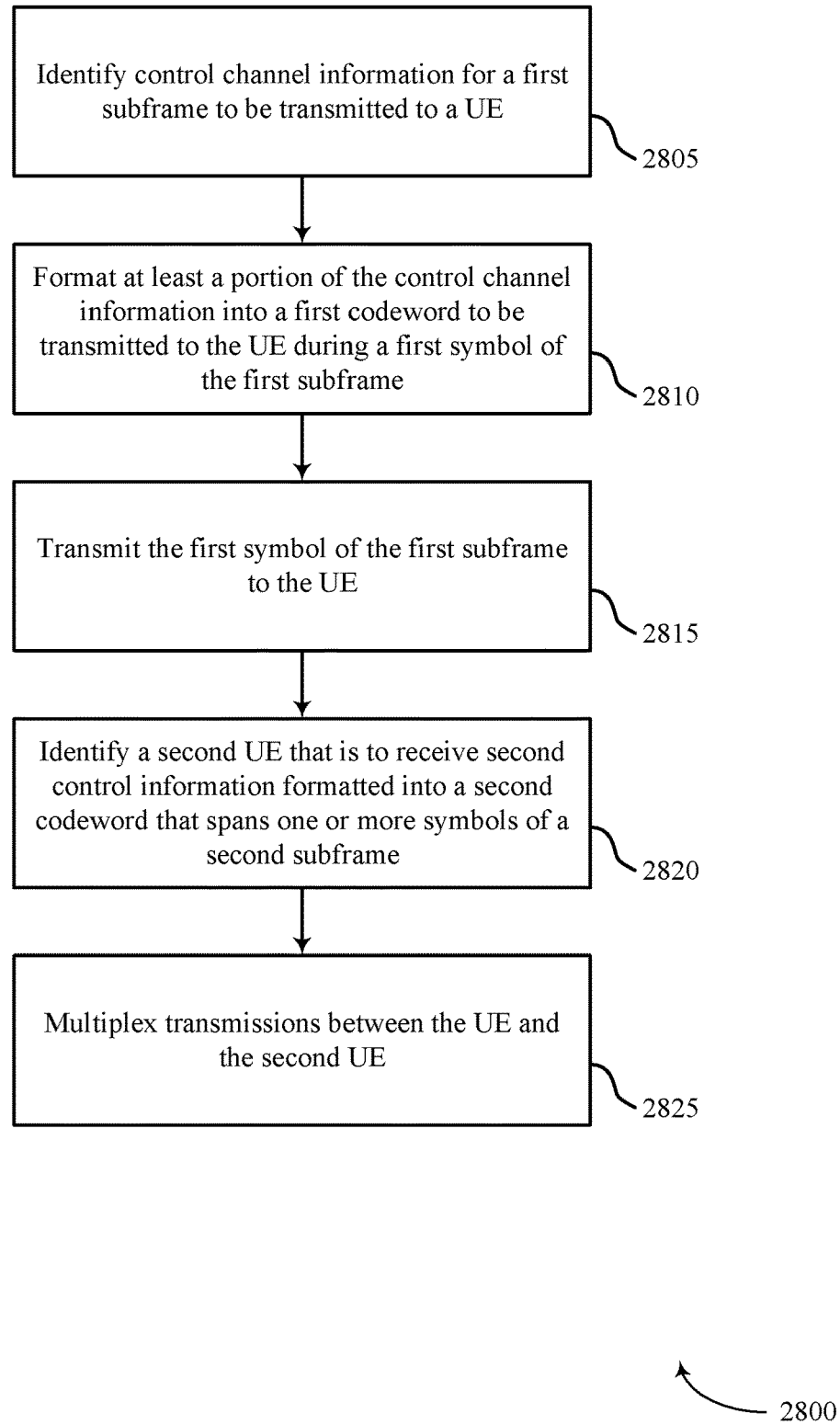

FIG. 28 shows a flowchart illustrating a method 2800 for partitioned control channel techniques for TDD subframe processing in accordance with various aspects of the present disclosure. The operations of method 2800 may be implemented by a device such as a base station 105 or its components as described with reference to FIGS. 1 and 2. For example, the operations of method 2800 may be performed by the base station control channel manager as described herein. In some examples, the base station 105 may execute a set of codes to control the functional elements of the device to perform the functions described below. Additionally or alternatively, the base station 105 may perform aspects the functions described below using special-purpose hardware.

At block 2805, the base station 105 may identify control channel information for a first subframe to be transmitted to a UE as described above with reference to FIGS. 2 through 16. In certain examples, the operations of block 2805 may be performed by the control information component as described with reference to FIGS. 18 and 19.

At block 2810, the base station 105 may format at least a portion of the control channel information into a first codeword to be transmitted to the UE during a first symbol of the first subframe as described above with reference to FIGS. 2 through 16. In certain examples, the operations of block 2810 may be performed by the control channel formatting component as described with reference to FIGS. 18 and 19.

At block 2815, the base station 105 may transmit the first symbol of the first subframe to the UE as described above with reference to FIGS. 2 through 16. In certain examples, the operations of block 2815 may be performed by the codeword communication component as described with reference to FIGS. 18 and 19.

At block 2820, the base station 105 may identify a second UE that is to receive second control information formatted into a second codeword that spans one or more symbols of a second subframe as described above with reference to FIGS. 2 through 16. In certain examples, the operations of block 2820 may be performed by the control information component as described with reference to FIGS. 18 and 19.

At block 2825, the base station 105 may multiplex transmissions between the UE and the second UE as described above with reference to FIGS. 2 through 16. In certain examples, the operations of block 2825 may be performed by the multiplexing component as described with reference to FIGS. 18 and 19.

Figure 29:
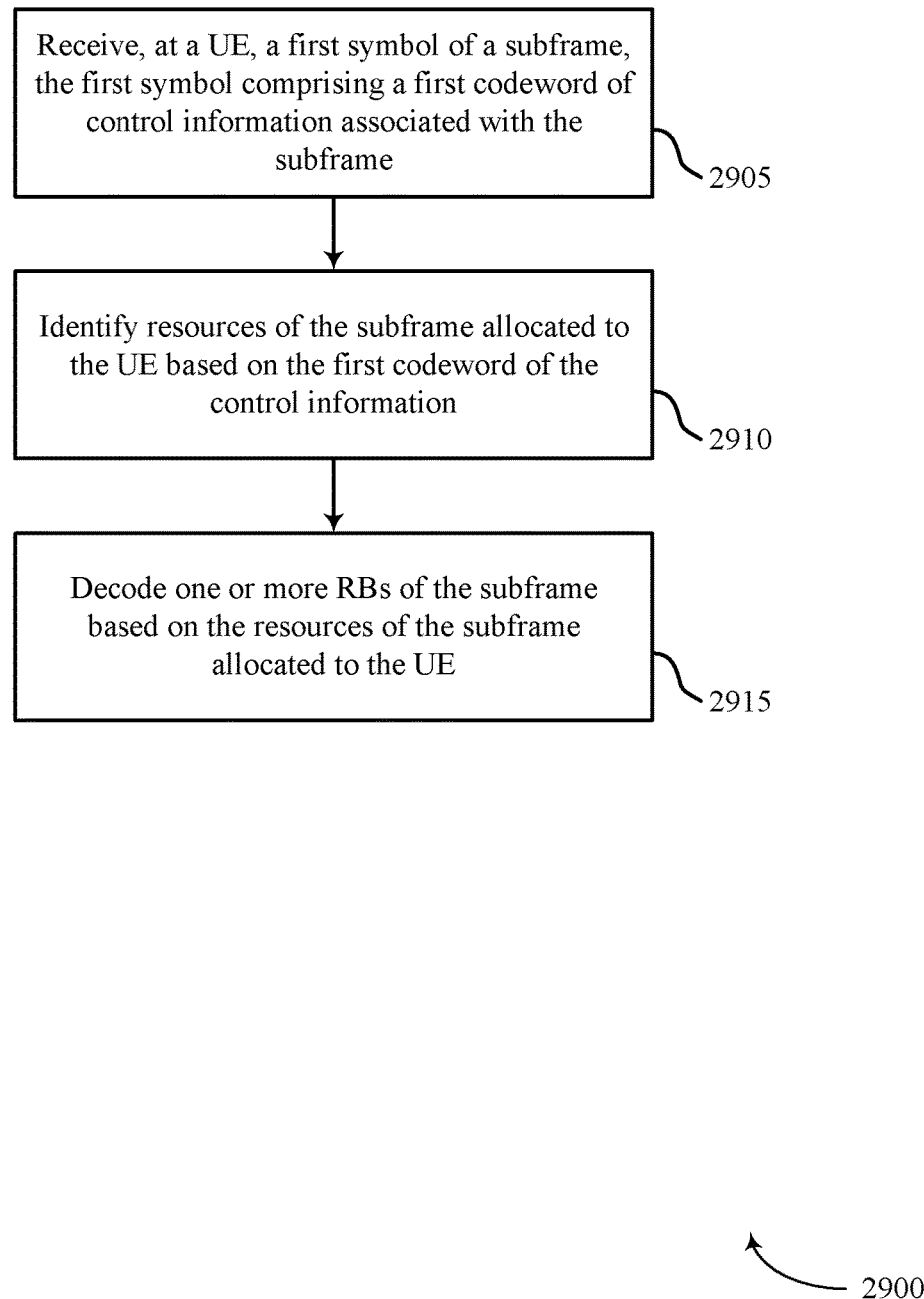

FIG. 29 shows a flowchart illustrating a method 2900 for partitioned control channel techniques for TDD subframe processing in accordance with various aspects of the present disclosure. The operations of method 2900 may be implemented by a device such as a UE 115 or its components as described with reference to FIGS. 1 and 2. For example, the operations of method 2900 may be performed by the UE control channel manager as described herein. In some examples, the UE 115 may execute a set of codes to control the functional elements of the device to perform the functions described below. Additionally or alternatively, the UE 115 may perform aspects the functions described below using special-purpose hardware.

At block 2905, the UE 115 may receive a first symbol of a subframe, the first symbol comprising a first codeword of control information associated with the subframe as described above with reference to FIGS. 2 through 16. In certain examples, the operations of block 2905 may be performed by the control information component as described with reference to FIGS. 22 and 23.

At block 2910, the UE 115 may identify resources of the subframe allocated to the UE based on the first codeword of the control information as described above with reference to FIGS. 2 through 16. In certain examples, the operations of block 2910 may be performed by the resource identifying component as described with reference to FIGS. 22 and 23.

At block 2915, the UE 115 may decode one or more RBs of the subframe based on the resources of the subframe allocated to the UE as described above with reference to FIGS. 2 through 16. In certain examples, the operations of block 2915 may be performed by the decoder as described with reference to FIGS. 22 and 23.

Figure 30:
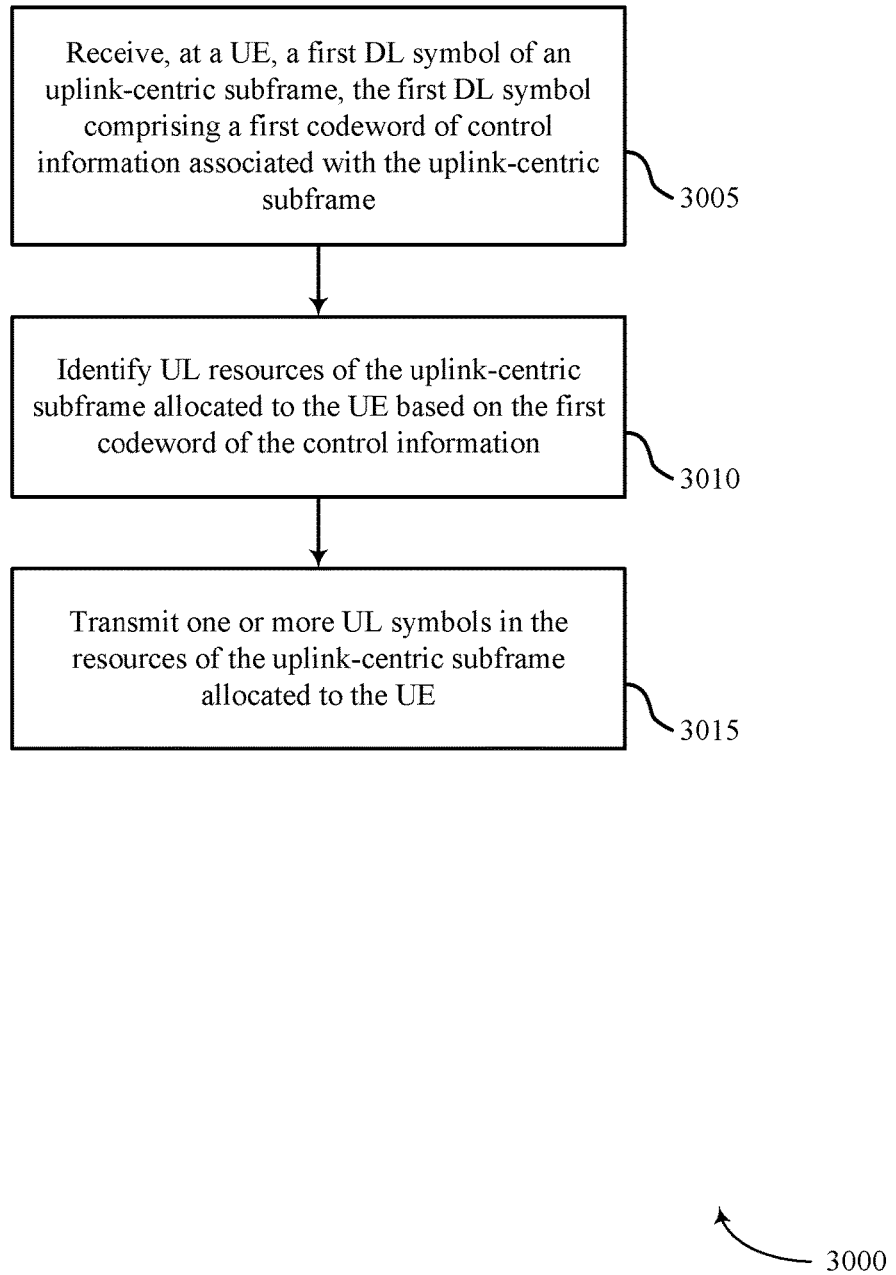

FIG. 30 shows a flowchart illustrating a method 3000 for partitioned control channel techniques for TDD subframe processing in accordance with various aspects of the present disclosure. The operations of method 3000 may be implemented by a device such as a UE 115 or its components as described with reference to FIGS. 1 and 2. For example, the operations of method 3000 may be performed by the UE control channel manager as described herein. In some examples, the UE 115 may execute a set of codes to control the functional elements of the device to perform the functions described below. Additionally or alternatively, the UE 115 may perform aspects the functions described below using special-purpose hardware.

At block 3005, the UE 115 may receive a first DL symbol of an uplink-centric subframe, the first DL symbol comprising a first codeword of control information associated with the uplink-centric subframe as described above with reference to FIGS. 2 through 16. In certain examples, the operations of block 3005 may be performed by the control information component as described with reference to FIGS. 22 and 23.

At block 3010, the UE 115 may identify UL resources of the uplink-centric subframe allocated to the UE based on the first codeword of the control information as described above with reference to FIGS. 2 through 16. In certain examples, the operations of block 3010 may be performed by the resource identifying component as described with reference to FIGS. 22 and 23.

At block 3015, the UE 115 may transmit one or more UL symbols in the resources of the uplink-centric subframe allocated to the UE as described above with reference to FIGS. 2 through 16. In certain examples, the operations of block 3015 may be performed by the uplink communication component as described with reference to FIGS. 22 and 23.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for partitioned control channel techniques for TDD subframe processing.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communication system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for partitioned control channel techniques for TDD subframe processing. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:

1. A method of wireless communication comprising:
identifying control channel information for a first subframe to be transmitted to a user equipment (UE), wherein the control channel information comprises a resource allocation for the UE for the first subframe and one or more processing parameters for data to be transmitted in the first subframe;
formatting at least a first portion of the control channel information into a first codeword to be transmitted to the UE during a first symbol of the first subframe and a second portion of the control channel information into a second codeword to be transmitted to the UE during a second symbol of the first subframe; and
transmitting the first symbol and the second symbol of the first subframe to the UE.

2. The method of claim 1, wherein the processing parameters comprise one or more of a modulation and coding scheme (MCS), a new data indicator (NDI), or redundancy version (RV), and wherein the formatting comprises formatting an indication of the resource allocation into the first codeword and formatting one or more of the MCS, NDI, or RV into the second codeword of control information.

3. The method of claim 1, wherein the formatting comprises formatting a reference signal (RS) pilot signal in the first symbol, formatting the resource allocation in the first codeword, and frequency division multiplexing the RS pilot signal and the first codeword.

4. The method of claim 3, wherein the resource allocation is a pre-scheduled resource allocation that is scheduled prior to receiving an acknowledgement (ACK) or negative acknowledgment (NACK) from the UE indicating successful or unsuccessful receipt of data transmitted in a previous subframe.

5. The method of claim 1, further comprising:
transmitting the second codeword to the UE during the second symbol; and
transmitting one or more data resource blocks (RBs) to the UE during at least a third symbol of the first subframe based at least in part on the resource allocation of the UE.

6. The method of claim 1, further comprising:
receiving, prior to the first symbol, an acknowledgement (ACK) or negative acknowledgment (NACK) from the UE indicating successful or unsuccessful receipt of data transmitted in a previous subframe; and
determining whether the data transmitted in the previous subframe is to be retransmitted in the first subframe based at least in part on the ACK or NACK from the UE, and wherein the one or more processing parameters are identified based at least in part on whether the data transmitted in the previous subframe is to be retransmitted in the first subframe.

7. The method of claim 6, wherein the determining whether the data transmitted in the previous subframe is to be retransmitted in the first subframe is performed at least partially during the first symbol of the first subframe.

8. The method of claim 1, wherein the identifying the resource allocation of the first subframe to be allocated to the UE is performed in a prior subframe to the first subframe.

9. The method of claim 8, wherein the resource allocation is based at least in part on new data being present for transmission to the UE or an assumed retransmission of data transmitted during the prior subframe.

10. The method of claim 9, further comprising:
identifying that no new data is present for transmission to the UE and that the data transmitted during the prior subframe is not to be retransmitted; and
formatting an indication that no data is to be transmitted into the second codeword of control information to be transmitted to the UE.

11. The method of claim 10, further comprising:
identifying a different UE; and
transmitting control channel information comprising the resource allocation for data transmission in the first subframe to the different UE.

12. The method of claim 9, further comprising:
identifying that new data is present for transmission to the UE; and
preprocessing at least a portion of the new data for transmission to the UE during the first subframe during the prior subframe.

13. The method of claim 12, wherein the preprocessing comprises generating a first waveform for transmission of at least the portion of the new data.

14. The method of claim 13, wherein the preprocessing further comprises generating a second waveform for retransmission of the data transmitted during the prior subframe.

15. The method of claim 12, wherein the preprocessing comprises preprocessing the new data up to a rate-matching stage, a tone mapping stage, a modulation stage, a precoding stage, or an inverse fast Fourier transform (IFFT) stage.

16. The method of claim 1, wherein the control channel information includes time-critical control information formatted into the first codeword and less time-critical control information that is formatted into the second codeword.

17. The method of claim 16, wherein the first codeword comprises physical downlink control channel (PDCCH) information, and the second codeword comprises PDRICH information.

18. The method of claim 1, further comprising:
identifying a second UE that is to receive second control information formatted into a third codeword that spans one or more symbols of a second subframe; and
multiplexing transmissions between the UE and the second UE.

19. The method of claim 18, further comprising:
signaling the UE and the second UE indicating whether control information is to be transmitted in the first codeword within the first symbol of the first subframe or in the third codeword that spans the one or more symbols of the second subframe.

20. A method of wireless communication comprising:
receiving, at a UE, a first symbol and a second symbol of a subframe, the first symbol comprising a first codeword of control information associated with the subframe, and the second symbol comprising a second codeword of control information associated with the subframe;
identifying resources of the subframe allocated to the UE based at least in part on the first codeword of the control information;
identifying one or more of a modulation and coding scheme (MCS), a new data indicator (NDI), or redundancy version (RV) for data transmitted in the subframe based at least in part on the second codeword of the control information; and decoding one or more resource blocks (RBs) of the subframe based at least in part on the resources of the subframe allocated to the UE.

21. The method of claim 20, further comprising:
decoding least a third symbol of the subframe based at least in part on the resource allocation, MCS, NDI, or RV;
determining that data of the one or more RBs is successfully received; and
generating an acknowledgment (ACK) of reception of the data based at least in part on the determining.

22. The method of claim 21, further comprising:
transmitting the ACK in an uplink (UL) portion of the subframe.

23. The method of claim 20, wherein identifying the resources of the subframe allocated to the UE comprises:
processing the first codeword during the receiving of the second symbol; and
decoding a demodulation reference signal (DMRS) received in one or more of the first symbol or the second symbol based at least in part on the processing the first codeword.

24. The method of claim 23, further comprising:
processing the DMRS during reception of a third symbol of the subframe; and
processing one or more data RBs received in the third symbol during reception of a fourth symbol of the subframe.

25. The method of claim 20, wherein the first codeword includes time-critical control information and the second codeword includes less time-critical control information than the first codeword.

26. The method of claim 25, wherein the first codeword comprises PDCCH information, and the second codeword comprises PDRICH information.

27. A method of wireless communication comprising:
receiving, at a user equipment (UE), a first downlink (DL) symbol of an uplink-centric subframe, the first DL symbol comprising a first codeword of control information associated with the uplink-centric subframe;
identifying uplink (UL) resources of the uplink-centric subframe allocated to the UE based at least in part on the first codeword of the control information; and
receiving, at the UE, a second DL symbol of the uplink-centric subframe, the second DL symbol comprising a second codeword of the control information associated with the uplink-centric subframe;
identifying one or more of a MCS, a new data indicator (NDI), or redundancy version (RV) for data transmitted in the one or more UL symbols of the uplink-centric subframe based at least in part on the second codeword of the control information; and
transmitting, from the UE, one or more UL symbols in the resources of the uplink-centric subframe allocated to the UE.

28. The method of claim 27, wherein the one or more UL symbols are transmitted after an UL burst symbol that follows the DL symbol of the uplink-centric subframe.

29. The method of claim 27, further comprising:
identifying the UL resources of the uplink-centric subframe allocated to the UE based at least in part on processing the first codeword during a second symbol of the uplink-centric subframe, and wherein a first uplink-symbol of the uplink-centric subframe follows the second symbol.

30. An apparatus for wireless communication comprising:
means for identifying control channel information for a first subframe to be transmitted to a user equipment (UE), wherein the control channel information comprises a resource allocation for the UE for the first subframe and one or more processing parameters for data to be transmitted in the first subframe;
means for formatting at least a first portion of the control channel information into a first codeword to be transmitted to the UE during a first symbol of the first subframe and a second portion of the control channel information into a second codeword to be transmitted to the UE during a second symbol of the first subframe; and
means for transmitting the first symbol and the second symbol of the first subframe to the UE.

31. The apparatus of claim 30, wherein the processing parameters comprise one or more of a modulation and coding scheme (MCS), a new data indicator (NDI), or redundancy version (RV), and wherein the means for formatting formats an indication of the resource allocation into the first codeword and formats one or more of the MCS, NDI, or RV into the second codeword of control information.

32. The apparatus of claim 30, wherein the means for formatting formats a reference signal (RS) pilot signal in the first symbol, formats the resource allocation in the first codeword, and frequency division multiplexes the RS pilot signal and the first codeword.

33. The apparatus of claim 32, wherein the resource allocation is a pre-scheduled resource allocation that is scheduled prior to receiving an acknowledgement (ACK) or negative acknowledgment (NACK) from the UE indicating successful or unsuccessful receipt of data transmitted in a previous subframe.

34. The apparatus of claim 30, further comprising:
means for transmitting the second codeword to the UE during the second symbol; and
means for transmitting one or more data resource blocks (RBs) to the UE during at least a third symbol of the first subframe based at least in part on the resource allocation of the UE.

35. The apparatus of claim 30, further comprising:
means for receiving, prior to the first symbol, an acknowledgement (ACK) or negative acknowledgment (NACK) from the UE indicating successful or unsuccessful receipt of data transmitted in a previous subframe; and
means for determining whether the data transmitted in the previous subframe is to be retransmitted in the first subframe based at least in part on the ACK or NACK from the UE, and wherein the one or more processing parameters are identified based at least in part on whether the data transmitted in the previous subframe is to be retransmitted in the first subframe.

36. The apparatus of claim 35, wherein the determining whether the data transmitted in the previous subframe is to be retransmitted in the first subframe is performed at least partially during the first symbol of the first subframe.

37. The apparatus of claim 30, wherein the identifying the resource allocation of the first subframe to be allocated to the UE is performed in a prior subframe to the first subframe.

38. The apparatus of claim 30, wherein the control channel information includes time-critical control information formatted into the first codeword and less time-critical control information that is formatted into the second codeword.

39. An apparatus for wireless communication comprising:
means for receiving, at a UE, a first symbol and a second symbol of a subframe, the first symbol comprising a first codeword of control information associated with the subframe, and the second symbol comprising a second codeword of control information associated with the subframe;
means for identifying resources of the subframe allocated to the UE based at least in part on the first codeword of the control information; and
means for identifying one or more of a modulation and coding scheme (MCS), a new data indicator (NDI), or redundancy version (RV) for data transmitted in the subframe based at least in part on the second codeword of the control information; and
means for decoding one or more RBs of the subframe based at least in part on the resources of the subframe allocated to the UE.

40. The apparatus of claim 39, further comprising:
means for decoding at least a third symbol of the subframe based at least in part on the resource allocation, MCS, NDI, or RV;
means for determining that data of the one or more RBs is successfully received; and
means for generating an acknowledgment (ACK) of reception of the data based at least in part on the determining.

41. The apparatus of claim 40, further comprising:
means for transmitting the ACK in an uplink (UL) portion of the subframe.

42. The apparatus of claim 39, wherein the means for identifying the resources of the subframe allocated to the UE processes the first codeword during the receiving of the second symbol; and decodes a demodulation reference signal (DMRS) received in one or more of the first symbol or the second symbol based at least in part on the processing the first codeword.

43. The apparatus of claim 39, wherein the first codeword includes time-critical control information and the second codeword includes less time-critical control information than the first codeword.

44. An apparatus for wireless communication comprising:
means for receiving, at a user equipment (UE), a first downlink (DL) symbol of an uplink-centric subframe, the first DL symbol comprising a first codeword of control information associated with the uplink-centric subframe;
means for identifying uplink (UL) resources of the uplink-centric subframe allocated to the UE based at least in part on the first codeword of the control information; and
means for receiving, at the UE, a second DL symbol of the uplink-centric subframe, the second DL symbol comprising a second codeword of the control information associated with the uplink-centric subframe; and
means for identifying one or more of a MCS, a new data indicator (NDI), or redundancy version (RV) for data transmitted in the one or more UL symbols of the uplink-centric subframe based at least in part on the second codeword of the control information; and
means for transmitting, from the UE, one or more UL symbols in the resources of the uplink-centric subframe allocated to the UE.

45. The apparatus of claim 44, wherein the one or more UL symbols are transmitted after an UL burst symbol that follows the DL symbol of the uplink-centric subframe.

46. The apparatus of claim 44, wherein the means for identifying processes the first codeword during a second symbol of the uplink-centric subframe, and wherein a first uplink-symbol of the uplink-centric subframe follows the second symbol.

47. An apparatus for wireless communication, comprising:
a processor;
memory in electronic communication with the processor; and
instructions stored in the memory and operable, when executed by the processor, to cause the apparatus to:
identify control channel information for a first subframe to be transmitted to a user equipment (UE), wherein the control channel information comprises a resource allocation for the UE for the first subframe and one or more processing parameters for data to be transmitted in the first subframe;
format at least a first portion of the control channel information into a first codeword to be transmitted to the UE during a first symbol of the first subframe and a second portion of the control channel information into a second codeword to be transmitted to the UE during a second symbol of the first subframe; and
transmit the first symbol and the second symbol of the first subframe to the UE.

48. The apparatus of claim 47, wherein the processing parameters comprise one or more of a modulation and coding scheme (MCS), a new data indicator (NDI), or redundancy version (RV), and wherein the formatting comprises formatting an indication of the resource allocation into the first codeword and formatting one or more of the MCS, NDI, or RV into the second codeword of control information.

49. The apparatus of claim 47, wherein the instructions are further executable by the processor to:
format a reference signal (RS) pilot signal in the first symbol, format the resource allocation in the first codeword, and frequency division multiplex the RS pilot signal and the first codeword.

50. The apparatus of claim 49, wherein the resource allocation is a pre-scheduled resource allocation that is scheduled prior to receiving an acknowledgement (ACK) or negative acknowledgment (NACK) from the UE indicating successful or unsuccessful receipt of data transmitted in a previous subframe.

51. The apparatus of claim 47, wherein the instructions are further executable by the processor to:
transmit the second codeword to the UE during the second symbol; and
transmit one or more data resource blocks (RBs) to the UE during at least a third symbol of the first subframe based at least in part on the resource allocation of the UE.

52. The apparatus of claim 47, wherein the instructions are further executable by the processor to:
receive, prior to the first symbol, an acknowledgement (ACK) or negative acknowledgment (NACK) from the UE indicating successful or unsuccessful receipt of data transmitted in a previous subframe; and
determine whether the data transmitted in the previous subframe is to be retransmitted in the first subframe based at least in part on the ACK or NACK from the UE, and wherein the one or more processing parameters are identified based at least in part on whether the data transmitted in the previous subframe is to be retransmitted in the first subframe.

53. The apparatus of claim 52, wherein the determination of whether the data transmitted in the previous subframe is to be retransmitted in the first subframe is performed at least partially during the first symbol of the first subframe.

54. The apparatus of claim 47, wherein the resource allocation of the first subframe to be allocated to the UE is identified in a prior subframe to the first subframe.

55. The apparatus of claim 54, wherein the resource allocation is based at least in part on new data being present for transmission to the UE or an assumed retransmission of data transmitted during the prior subframe.

56. The apparatus of claim 55, wherein the instructions are further executable by the processor to:
identify that no new data is present for transmission to the UE and that the data transmitted during the prior subframe is not to be retransmitted; and
format an indication that no data is to be transmitted into the second codeword of control information to be transmitted to the UE.

57. The apparatus of claim 56, wherein the instructions are further executable by the processor to:
identify a different UE; and
transmit control channel information comprising the resource allocation for data transmission in the first subframe to the different UE.

58. The apparatus of claim 55, wherein the instructions are further executable by the processor to:
identify that new data is present for transmission to the UE; and
preprocess at least a portion of the new data for transmission to the UE during the first subframe during the prior subframe.

59. The apparatus of claim 58, wherein the preprocessing comprises generating a first waveform for transmission of at least the portion of the new data.

60. The apparatus of claim 59, wherein the preprocessing further comprises generating a second waveform for retransmission of the data transmitted during the prior subframe.

61. The apparatus of claim 58, wherein the preprocessing comprises preprocessing the new data up to a rate-matching stage, a tone mapping stage, a modulation stage, a precoding stage, or an inverse fast Fourier transform (IFFT) stage.

62. The apparatus of claim 47, wherein the control channel information includes time-critical control information formatted into the first codeword and less time-critical control information that is formatted into the second codeword.

63. The apparatus of claim 62, wherein the first codeword comprises physical downlink control channel (PDCCH) information, and the second codeword comprises PDRICH information.

64. The apparatus of claim 57, wherein the instructions are further executable by the processor to:
identify a second UE that is to receive second control information formatted into a third codeword that spans one or more symbols of a second subframe; and
multiplex transmissions between the UE and the second UE.

65. The apparatus of claim 64, wherein the instructions are further executable by the processor to:
signal the UE and the second UE indicating whether control information is to be transmitted in the first codeword within the first symbol of the first subframe or in the third codeword that spans the one or more symbols of the second subframe.

66. An apparatus for wireless communication, comprising:
a processor;
memory in electronic communication with the processor; and
instructions stored in the memory and operable, when executed by the processor, to cause the apparatus to:
receive, at a UE, a first symbol and a second symbol of a subframe, the first symbol comprising a first codeword of control information associated with the subframe, and the second symbol comprising a second codeword of control information associated with the subframe;
identify resources of the subframe allocated to the UE based at least in part on the first codeword of the control information; and
identify one or more of a modulation and coding scheme (MCS), a new data indicator (NDI), or redundancy version (RV) for data transmitted in the subframe based at least in part on the second codeword of the control information; and
decode one or more RBs of the subframe based at least in part on the resources of the subframe allocated to the UE.

67. The apparatus of claim 66, wherein the instructions are further executable by the processor to:
decode least a third symbol of the subframe based at least in part on the resource allocation, MCS, NDI, or RV;
determine that data of the one or more RBs is successfully received; and
generate an acknowledgment (ACK) of reception of the data based at least in part on the determining.

68. The apparatus of claim 67, wherein the instructions are further executable by the processor to:
transmit the ACK in an uplink (UL) portion of the subframe.

69. The apparatus of claim 66, wherein the instructions are further executable by the processor to:
process the first codeword during the receiving of the second symbol; and
decode a demodulation reference signal (DMRS) received in one or more of the first symbol or the second symbol based at least in part on the processing the first codeword.

70. The apparatus of claim 69, wherein the instructions are further executable by the processor to:
process the DMRS during reception of a third symbol of the subframe; and
process one or more data RBs received in the third symbol during reception of a fourth symbol of the subframe.

71. The apparatus of claim 66, wherein the first codeword includes time-critical control information and the second codeword includes less time-critical control information than the first codeword.

72. The apparatus of claim 71, wherein the first codeword comprises PDCCH information, and the second codeword comprises PDRICH information.

73. An apparatus for wireless communication, comprising:
a processor;
memory in electronic communication with the processor; and
instructions stored in the memory and operable, when executed by the processor, to cause the apparatus to:
receive, at a user equipment (UE), a first downlink (DL) symbol of an uplink-centric subframe, the first DL symbol comprising a first codeword of control information associated with the uplink-centric subframe;

identify uplink (UL) resources of the uplink-centric subframe allocated to the UE based at least in part on the first codeword of the control information; and receive, at the UE, a second DL symbol of the uplink-centric subframe, the second DL symbol comprising a second codeword of the control information associated with the uplink-centric subframe;

identify one or more of a MCS, a new data indicator (NDI), or redundancy version (RV) for data transmitted in the one or more UL symbols of the uplink-centric subframe based at least in part on the second codeword of the control information; and transmit, from the UE, one or more UL symbols in the resources of the uplink-centric subframe allocated to the UE.

74. The apparatus of claim 73, wherein the one or more UL symbols are transmitted after an UL burst symbol that follows the DL symbol of the uplink-centric subframe.

75. The apparatus of claim 73, wherein the instructions are further executable by the processor to:

process the first codeword during a second symbol of the uplink-centric subframe, and wherein a first uplink-symbol of the uplink-centric subframe follows the second symbol.

76. A non-transitory computer-readable medium storing code for wireless communication, the code comprising instructions executable to:

identify control channel information for a first subframe to be transmitted to a user equipment (UE), wherein the control channel information comprises a resource allocation for the UE for the first subframe and one or more processing parameters for data to be transmitted in the first subframe;

format at least a first portion of the control channel information into a first codeword to be transmitted to the UE during a first symbol of the first subframe and a second portion of the control channel information into a second codeword to be transmitted to the UE during a second symbol of the first subframe; and transmit the first symbol and the second symbol of the first subframe to the UE.

77. The non-transitory computer-readable medium of claim 76, wherein the processing parameters comprise one or more of a modulation and coding scheme (MCS), a new data indicator (NDI), or redundancy version (RV), and wherein the wherein the instructions are further executable by the processor to format an indication of the resource allocation into the first codeword and format one or more of the MCS, NDI, or RV into the second codeword of control information.

78. The non-transitory computer-readable medium of claim 76, wherein the instructions are further executable by the processor to:

format a reference signal (RS) pilot signal in the first symbol, format the resource allocation in the first codeword, and frequency division multiplex the RS pilot signal and the first codeword.

79. The non-transitory computer-readable medium of claim 78, wherein the resource allocation is a pre-scheduled resource allocation that is scheduled prior to receiving an acknowledgement (ACK) or negative acknowledgment (NACK) from the UE indicating successful or unsuccessful receipt of data transmitted in a previous subframe.

80. The non-transitory computer-readable medium of claim 76, wherein the instructions are further executable by the processor to:

transmit the second codeword to the UE during the second symbol; and transmit one or more data resource blocks (RBs) to the UE during at least a third symbol of the first subframe based at least in part on the resource allocation of the UE.

81. The non-transitory computer-readable medium of claim 76, wherein the instructions are further executable by the processor to:

receive, prior to the first symbol, an acknowledgement (ACK) or negative acknowledgment (NACK) from the UE indicating successful or unsuccessful receipt of data transmitted in a previous subframe; and determine whether the data transmitted in the previous subframe is to be retransmitted in the first subframe based at least in part on the ACK or NACK from the UE, and wherein the one or more processing parameters are identified based at least in part on whether the data transmitted in the previous subframe is to be retransmitted in the first subframe.

82. The non-transitory computer-readable medium of claim 76, wherein the control channel information includes time-critical control information formatted into the first codeword and less time-critical control information that is formatted into the second codeword.

83. A non-transitory computer-readable medium storing code for wireless communication, the code comprising instructions executable to:

receive, at a UE, a first symbol and a second symbol of a subframe, the first symbol comprising a first codeword of control information associated with the subframe, and the second symbol comprising a second codeword of control information associated with the subframe;

identify resources of the subframe allocated to the UE based at least in part on the first codeword of the control information; and identify one or more of a modulation and coding scheme (MCS), a new data indicator (NDI), or redundancy version (RV) for data transmitted in the subframe based at least in part on the second codeword of the control information; and decode one or more RBs of the subframe based at least in part on the resources of the subframe allocated to the UE.

84. The non-transitory computer-readable medium of claim 83, wherein the instructions are further executable by the processor to:

decode least a third symbol of the subframe based at least in part on the resource allocation, MCS, NDI, or RV;

determine that data of the one or more RBs is successfully received; and generate an acknowledgment (ACK) of reception of the data based at least in part on the determining.

85. The non-transitory computer-readable medium of claim 84, wherein the instructions are further executable by the processor to:

transmit the ACK in an uplink (UL) portion of the subframe.

86. The non-transitory computer-readable medium of claim 83, wherein the instructions are further executable to decode a demodulation reference signal (DMRS) received in one or more of the first symbol or the second symbol based at least in part on the processing the first codeword.

87. The non-transitory computer-readable medium of claim 86, wherein the instructions are further executable by the processor to:

process the DMRS during reception of a third symbol of the subframe; and process one or more data RBs received in the third symbol during reception of a fourth symbol of the subframe.

88. The non-transitory computer-readable medium of claim 83, wherein the first codeword includes time-critical control information and the second codeword includes less time-critical control information than the first codeword.

89. A non-transitory computer-readable medium storing code for wireless communication, the code comprising instructions executable to:

receive, at a user equipment (UE), a first downlink (DL) symbol of an uplink-centric subframe, the first DL symbol comprising a first codeword of control information associated with the uplink-centric subframe;

identify uplink (UL) resources of the uplink-centric subframe allocated to the UE based at least in part on the first codeword of the control information; and receive, at the UE, a second DL symbol of the uplink-centric subframe, the second DL symbol comprising a second codeword of the control information associated with the uplink-centric subframe;

identify one or more of a MCS, a new data indicator (NDI), or redundancy version (RV) for data transmitted in the one or more UL symbols of the uplink-centric subframe based at least in part on the second codeword of the control information; and transmit, from the UE, one or more UL symbols in the resources of the uplink-centric subframe allocated to the UE.

90. The non-transitory computer-readable medium of claim 89, wherein the one or more UL symbols are transmitted after an UL burst symbol that follows the DL symbol of the uplink-centric subframe.

91. The non-transitory computer-readable medium of claim 89, wherein the instructions are further executable by the processor to:

process the first codeword during a second symbol of the uplink-centric subframe, and wherein a first uplink-symbol of the uplink-centric subframe follows the second symbol.

* * * * *